US006414677B1

(12) United States Patent
Robertson et al.

(10) Patent No.: US 6,414,677 B1
(45) Date of Patent: Jul. 2, 2002

(54) METHODS, APPARATUS AND DATA STRUCTURES FOR PROVIDING A USER INTERFACE, WHICH EXPLOITS SPATIAL MEMORY IN THREE-DIMENSIONS, TO OBJECTS AND WHICH VISUALLY GROUPS PROXIMALLY LOCATED OBJECTS

(75) Inventors: George G. Robertson; Daniel C. Robbins; Maarten Roderik Van Dantzich, all of Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 09/152,712

(22) Filed: Sep. 14, 1998

(51) Int. Cl.[7] .............................................. G06T 15/00
(52) U.S. Cl. ........................ 345/419; 345/848; 345/764
(58) Field of Search .................................. 345/419, 425, 345/334, 335, 339, 348, 355, 149, 967, 977, 716, 751, 752, 753, 694, 762, 763, 764, 765, 766, 767, 768, 769, 810, 812, 825, 835–839, 848

(56) References Cited

U.S. PATENT DOCUMENTS

| | | | |
|---|---|---|---|
| 5,276,785 A | 1/1994 | Mackinlay et al. | 395/127 |
| 5,295,243 A | 3/1994 | Robertson et al. | 395/160 |
| 5,333,254 A | 7/1994 | Robertson | 395/155 |
| 5,339,390 A | 8/1994 | Robertson et al. | 395/157 |
| 5,359,703 A | 10/1994 | Robertson et al. | 395/119 |
| 5,384,908 A | 1/1995 | Mackinlay et al. | 395/152 |
| 5,513,303 A | 4/1996 | Robertson et al. | 395/119 |
| 5,530,235 A | 6/1996 | Stefik et al. | 389/670 |
| 5,608,850 A | 3/1997 | Robertson | 395/127 |
| 5,670,984 A | 9/1997 | Robertson et al. | 345/139 |
| 5,689,287 A | 11/1997 | Mackinlay et al. | 345/427 |
| 5,689,628 A | 11/1997 | Robertson | 395/127 |
| 5,767,826 A | 6/1998 | Sheridon et al. | 345/84 |

OTHER PUBLICATIONS

Fahlen et al ("A Space Based Model for User Interaction in Shared Synthetic Environments": 1993 ACM 0–89791–575–5/93/0004/0043, Apr. 1993.*
"Dynamic Diagrams", *Products Introducing MAPA*, MAPA™, download from http://www.dynamicdiagrams.com/products.html.
"Maya Design Group", *Our Portfolio: Case Study: Case Study*, Digital Equipment Corporation—Workscape™, downloaded from http://www.maya.com/Portfolio/workscape.html on Jul. 7, 1998.
M. Heydt, "Incorporating the Webbrowser Control into your Program", *Microsoft Interactive Developer, The Microsoft Magazine for Web Developers*, vol. 3, No. 7, pp. 42–51 (Jul. 1998).
R.R. Hightower et al, "Graphical Multiscale Web Histories: A Study of PadPrints", *Hyper Text 98*, pp. 58–65.
S.K. Card et al, "The WebBook and the Web Forager: An Information Workspace for the World–Wide Web".
R.L. Kullberg, "Dynamic Timelines Visualizing Historical information in Three Dimensions", Masters Thesis, B.S. Environmental Science, Massachusetts Institute of Technology, Cambridge, MA (1995).

(List continued on next page.)

*Primary Examiner*—Mark Zimmerman
*Assistant Examiner*—Mano Padmanabhan
(74) *Attorney, Agent, or Firm*—Michaelson & Wallace; Peter L. Michaelson

(57) ABSTRACT

A graphical user interface in which object thumbnails are rendered on a simulated three-dimensional surface which (i) exploits spatial memory and (ii) allows more objects to be rendered on a given screen. The objects may be moved, continuously, on the surface with a two-dimensional input device.

17 Claims, 62 Drawing Sheets

(43 of 62 Drawing Sheet(s) Filed in Color)

OTHER PUBLICATIONS

J.E. Ball et al, "ReActor: A System for Real–Time, Reactive Animations", *Conference Companion, CHI '94*, Boston, MA, pp. 39–40 (Apr. 24–28, 1994).

J.M. Ballay, MAYA Design Group, "Designing Workspace™: An Interdisciplinary Experience", *Human Factors in Computing Systems*, CHI '94—"Celebrating Interdepence", pp. 10–15 (Apr. 24–28, 1994).

G.G. Robertson et al, "Information Visualization Using 3D Interactive Animation", *Communications of the ACM*, vol. 36, No. 4, pp. 59–71 (Apr. 1993).

R. Mander et al, Human Interface Group, Advanced Technology, Apple Computer, Inc., A 'Pile' Metaphor for Supporting Casual Organization of Information, *CHI '92*, pp. 627–634 (May 3–7, 1992).

* cited by examiner

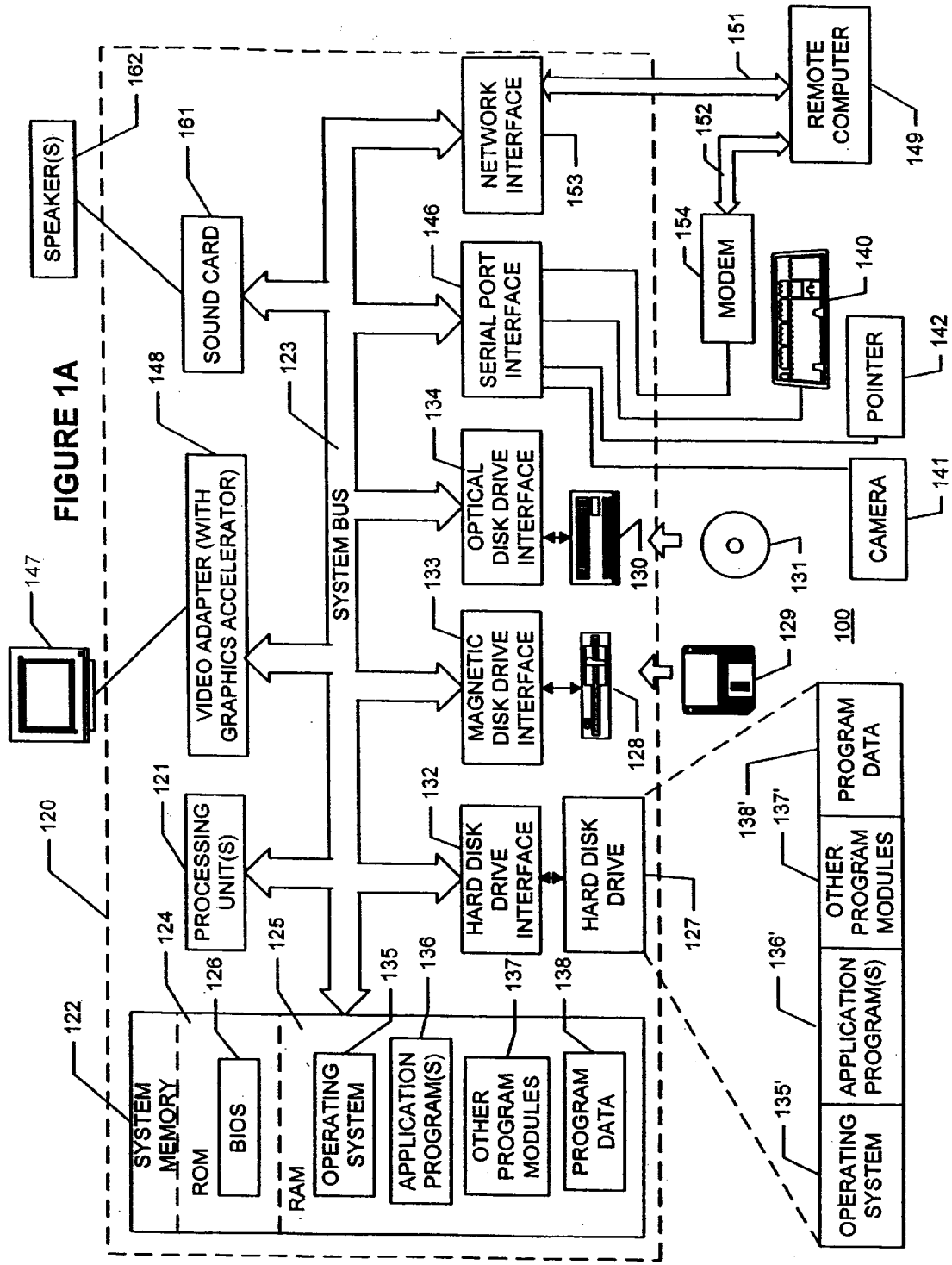

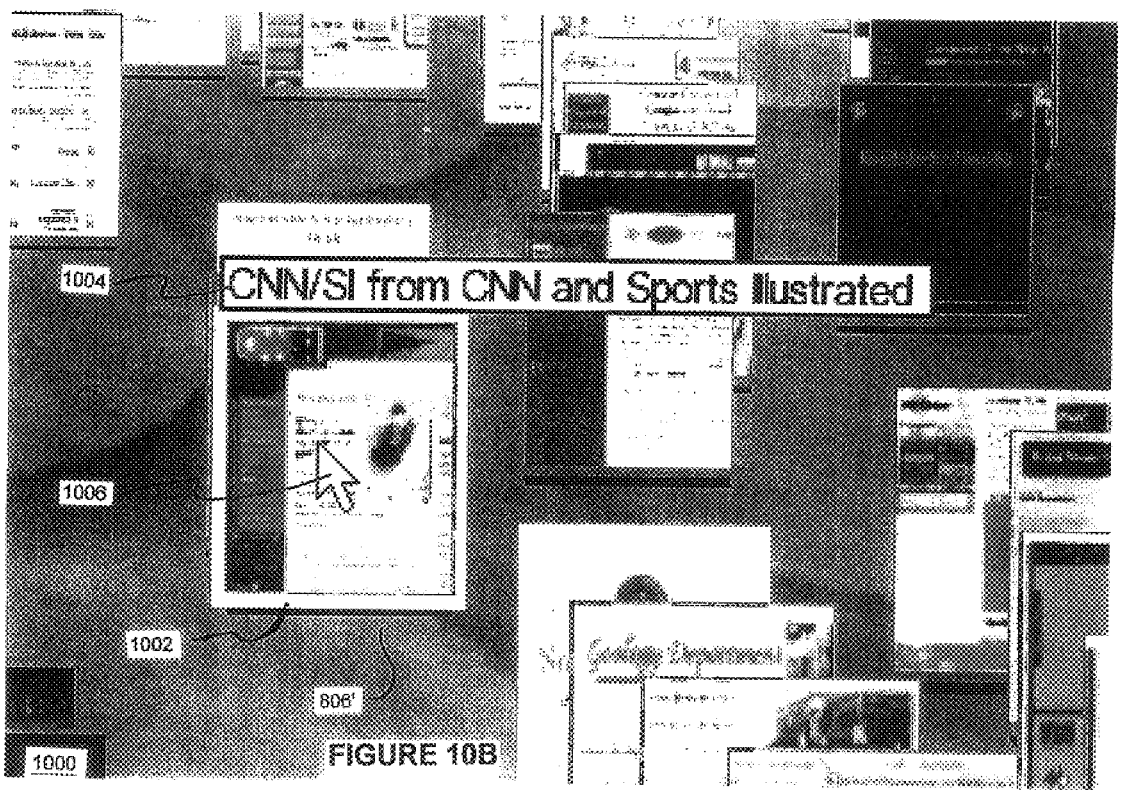

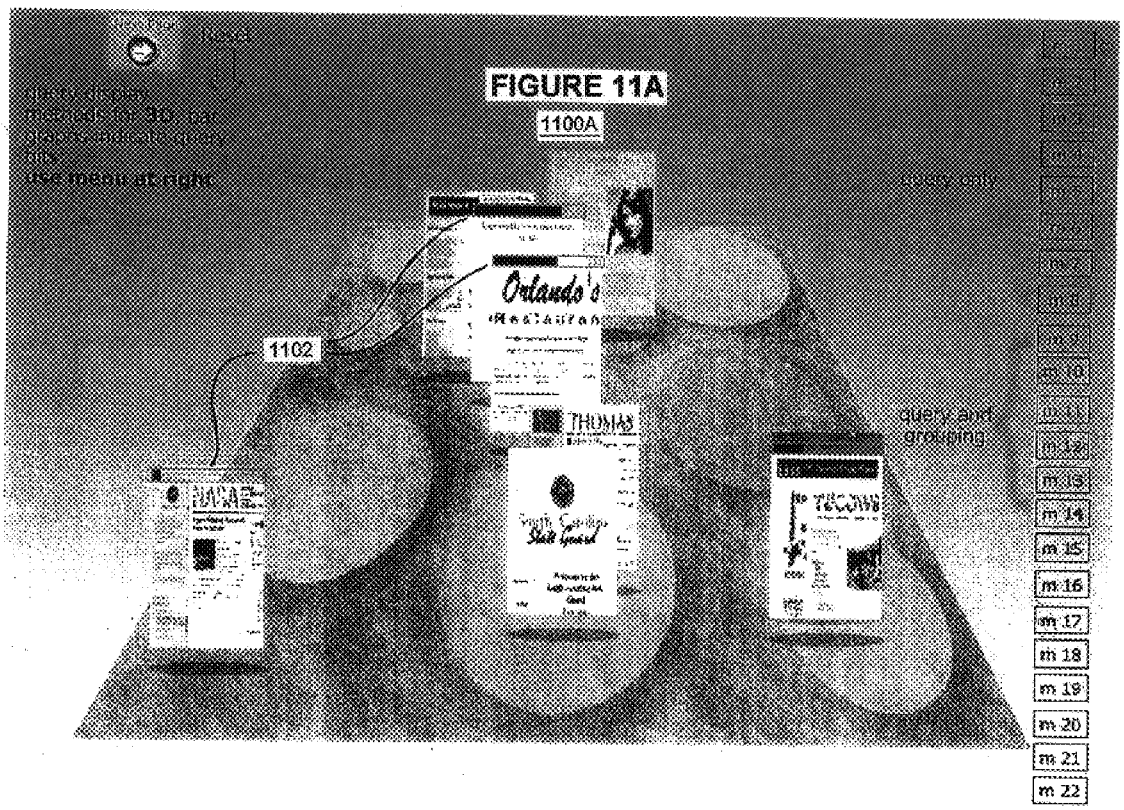

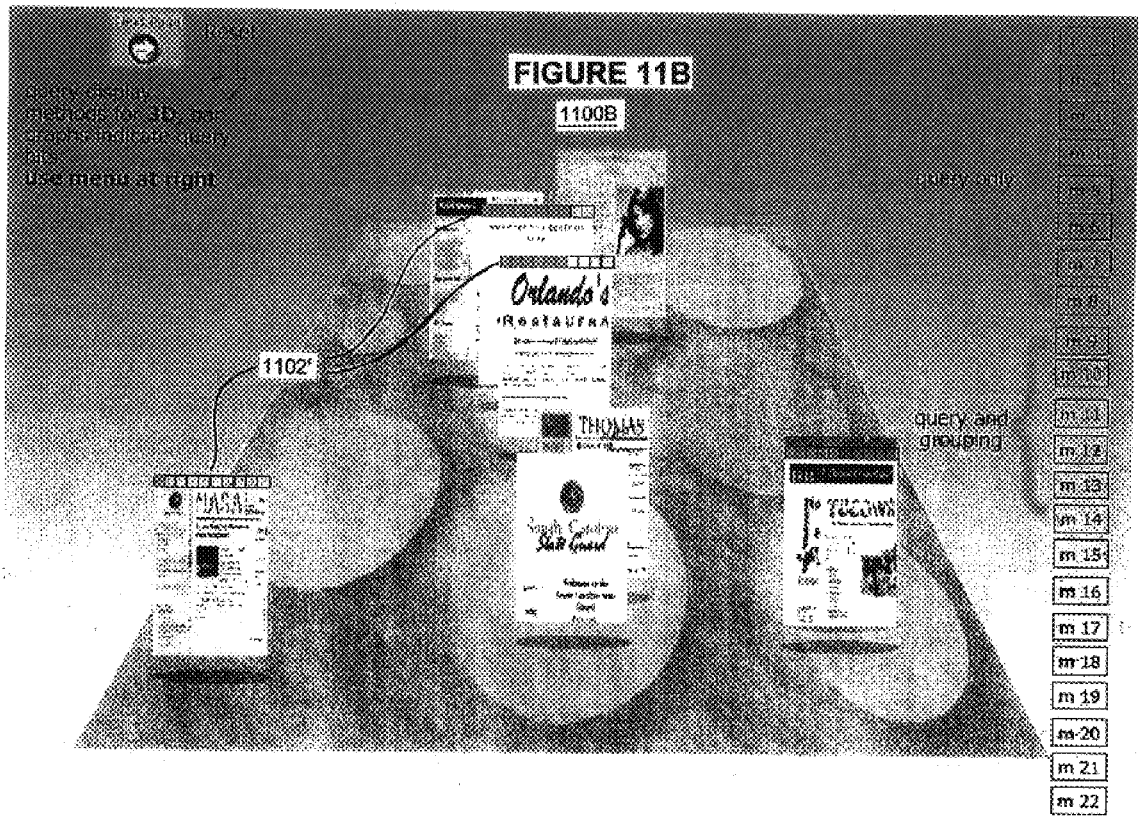

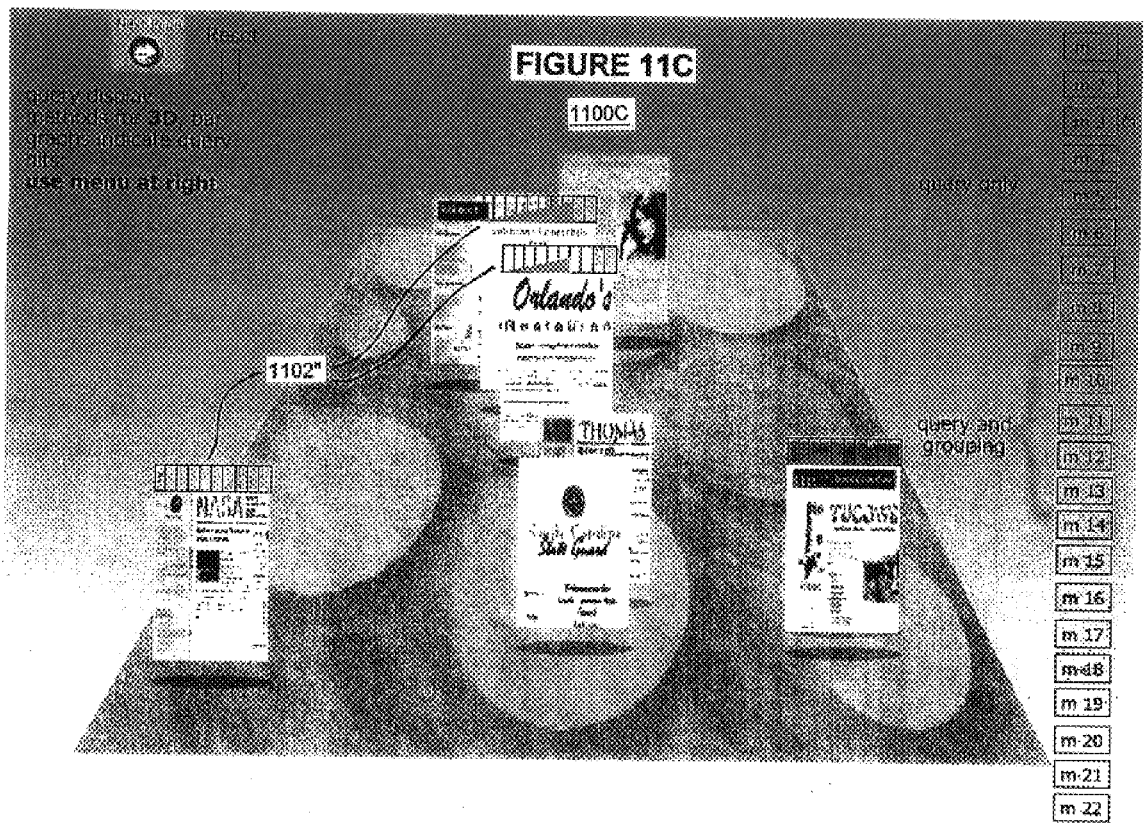

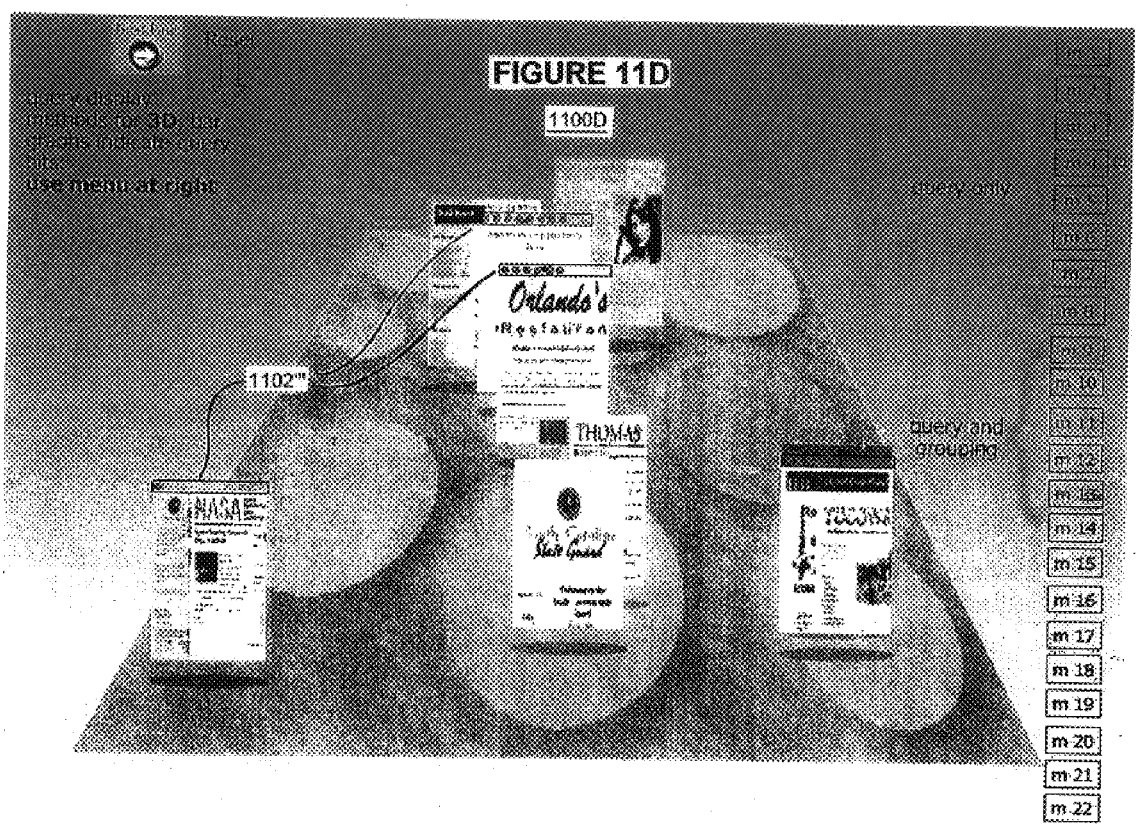

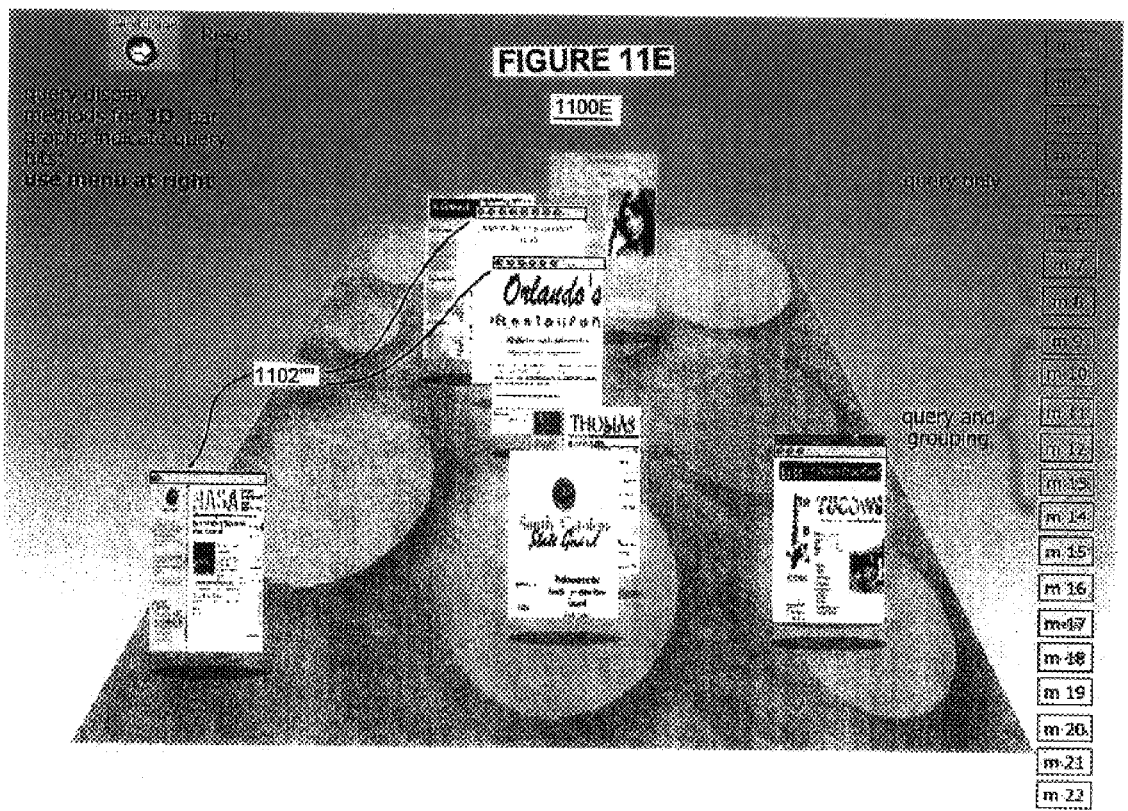

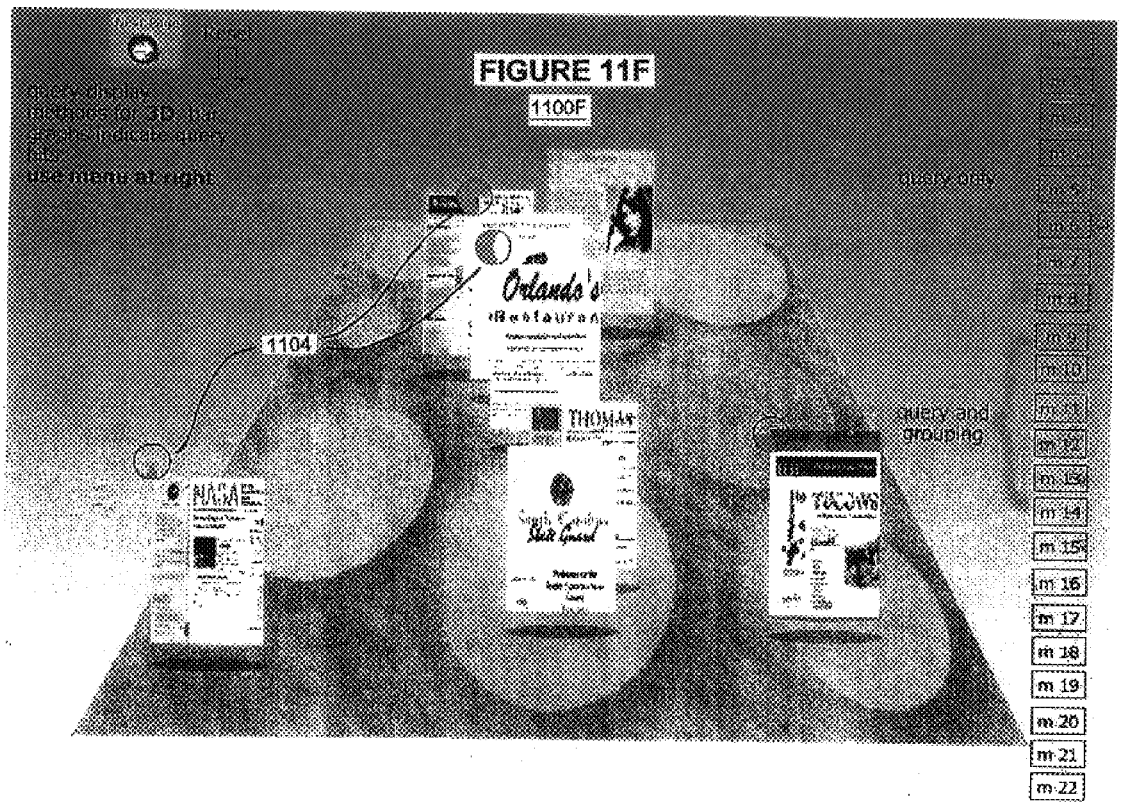

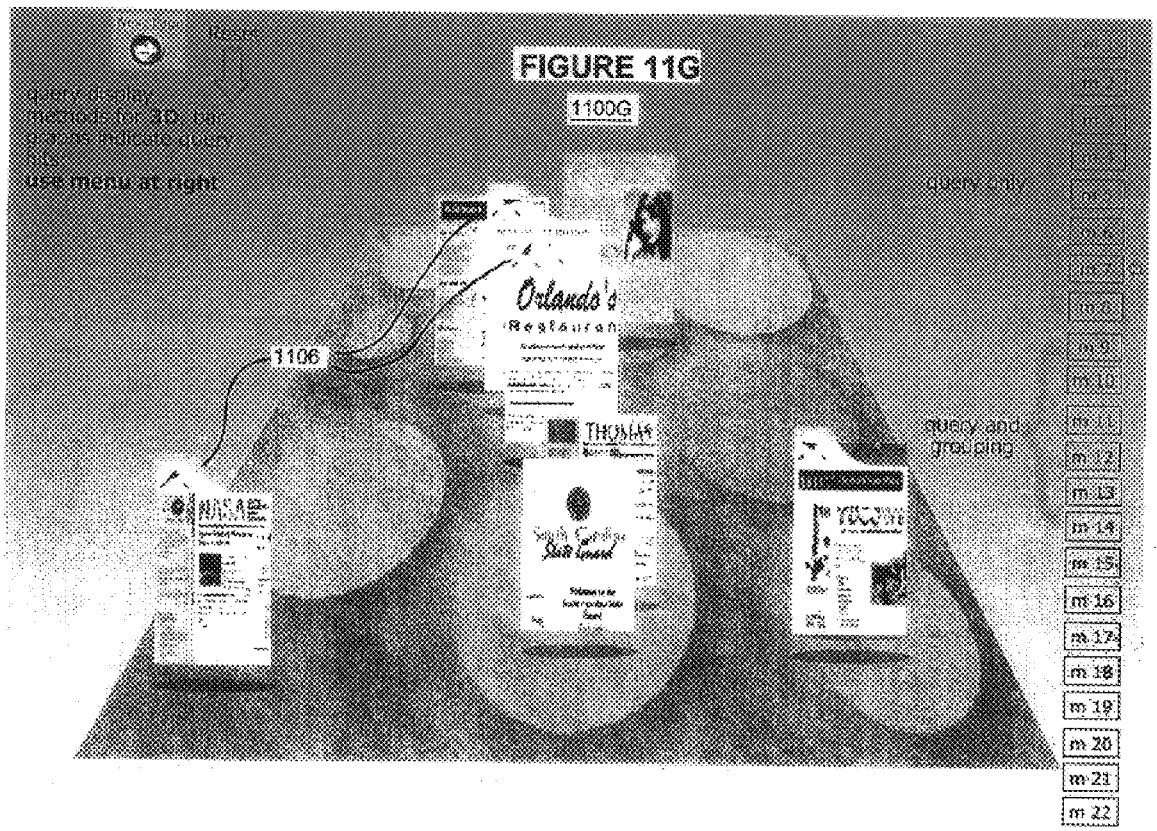

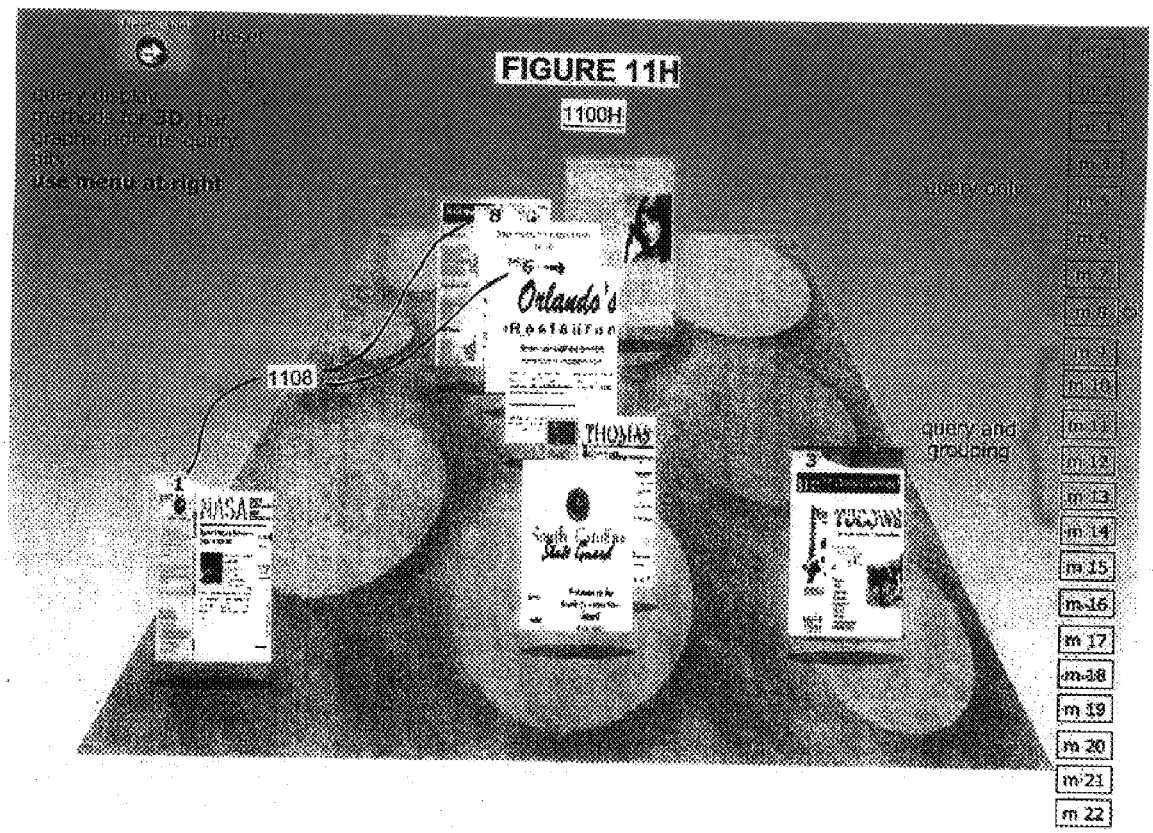

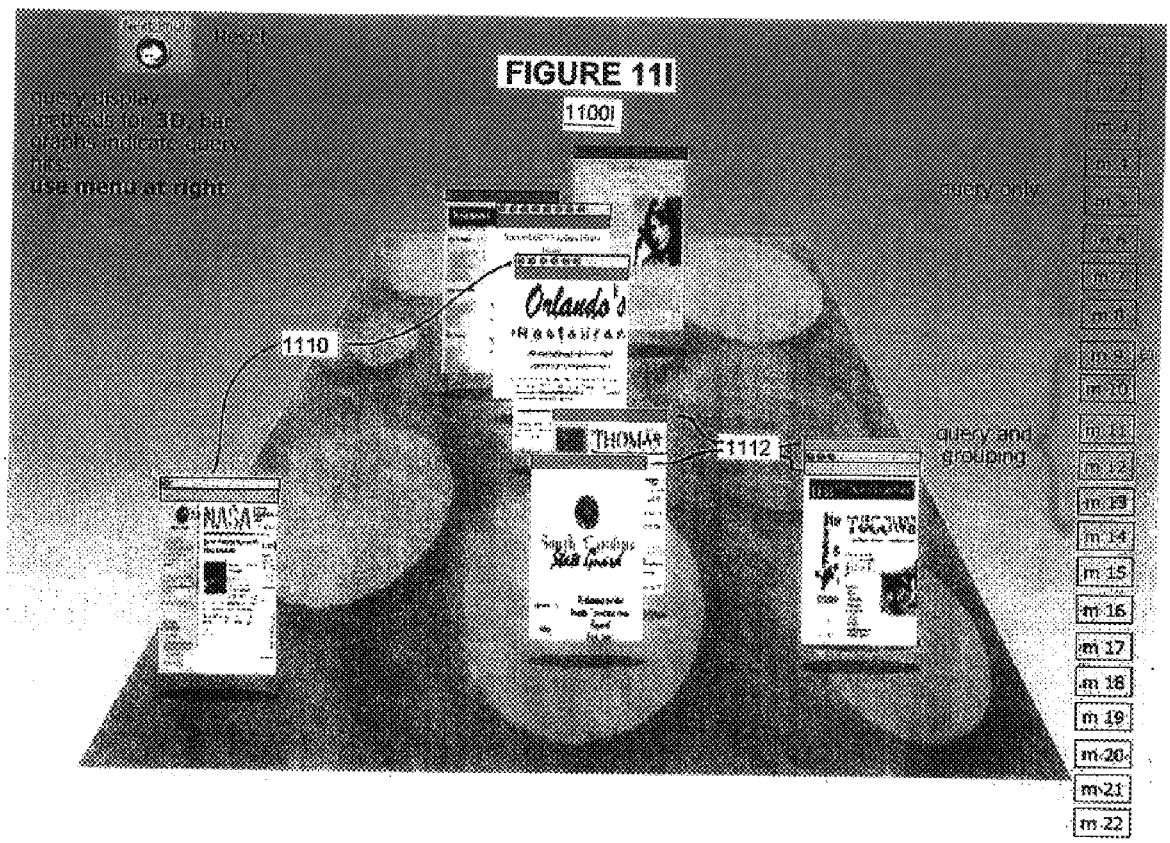

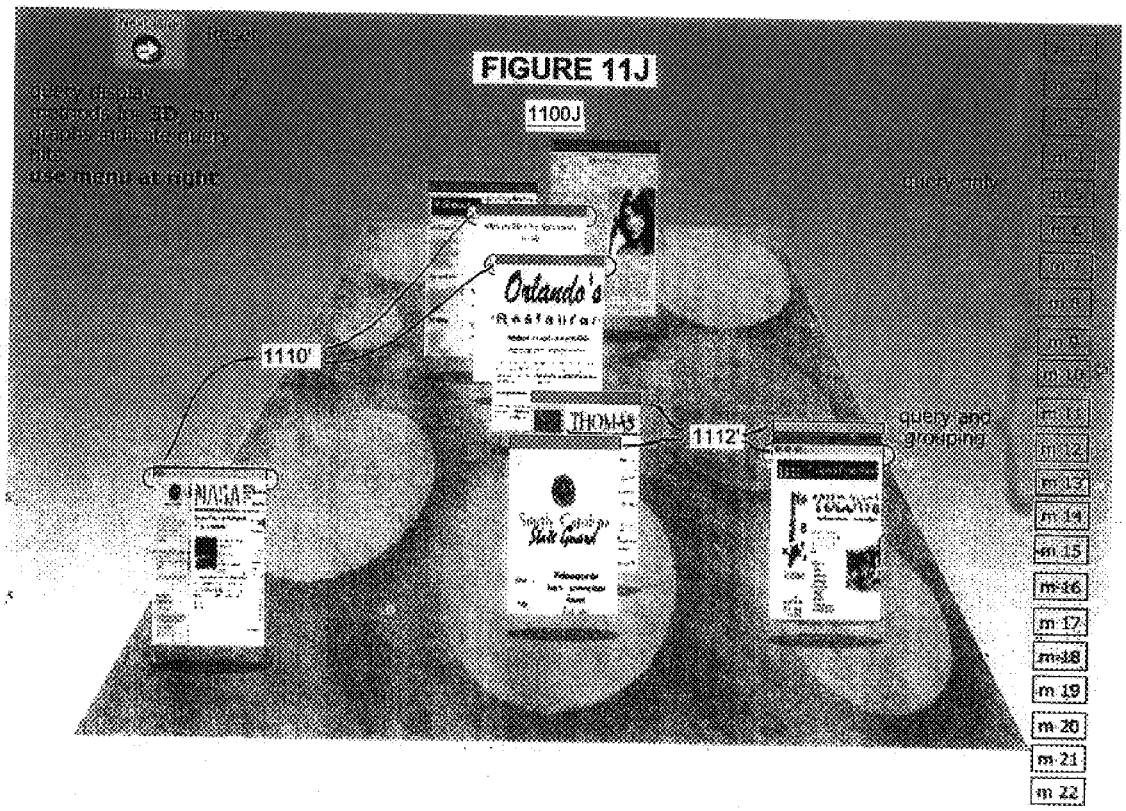

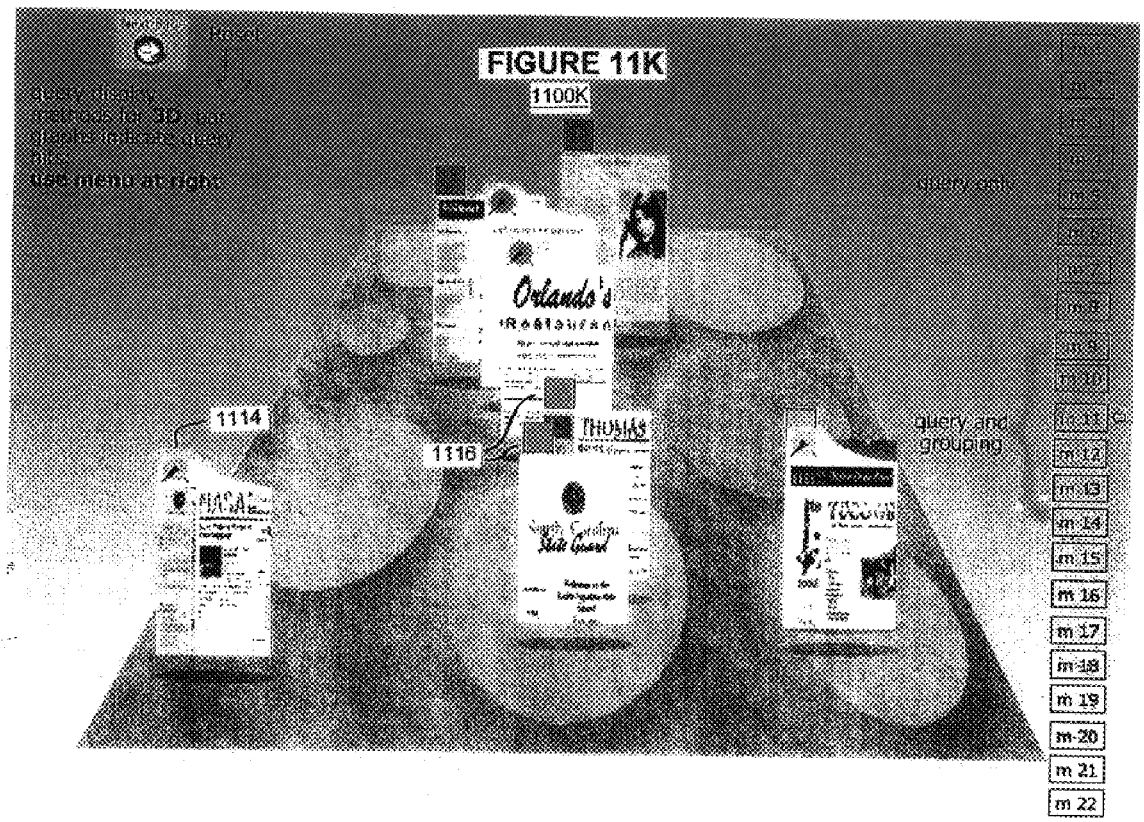

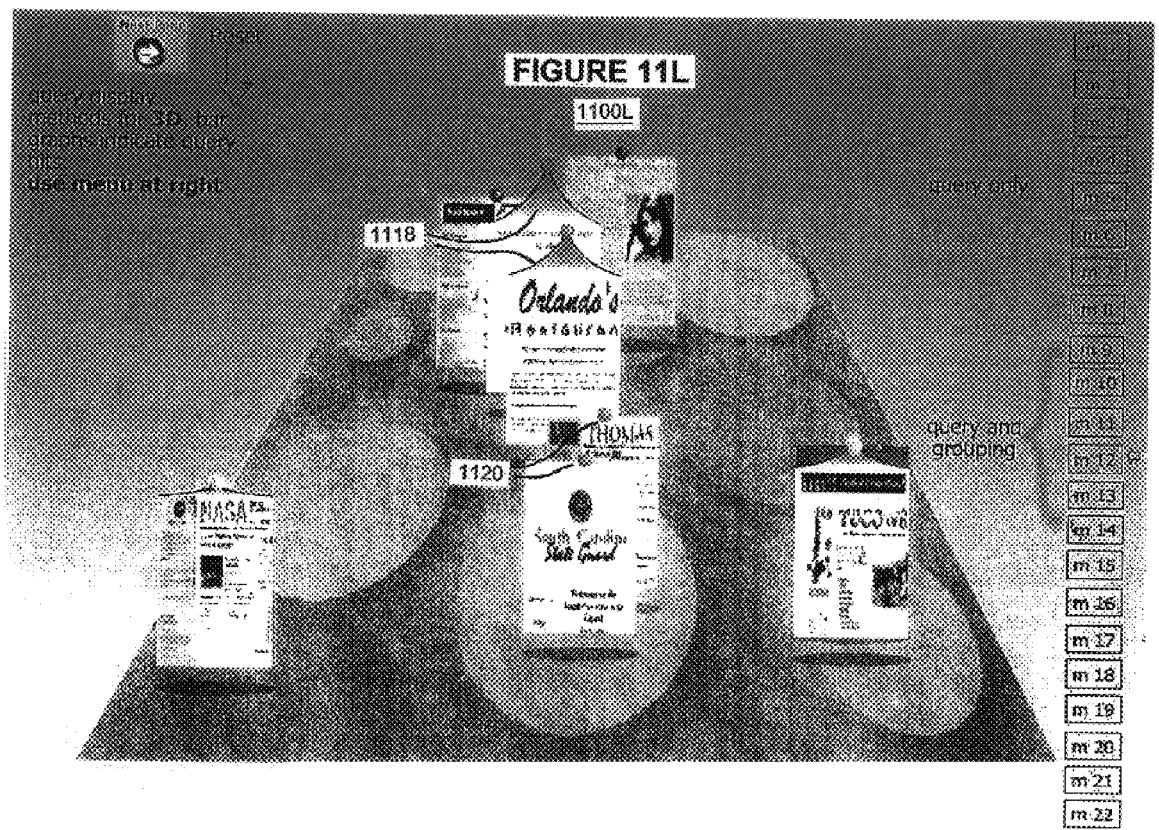

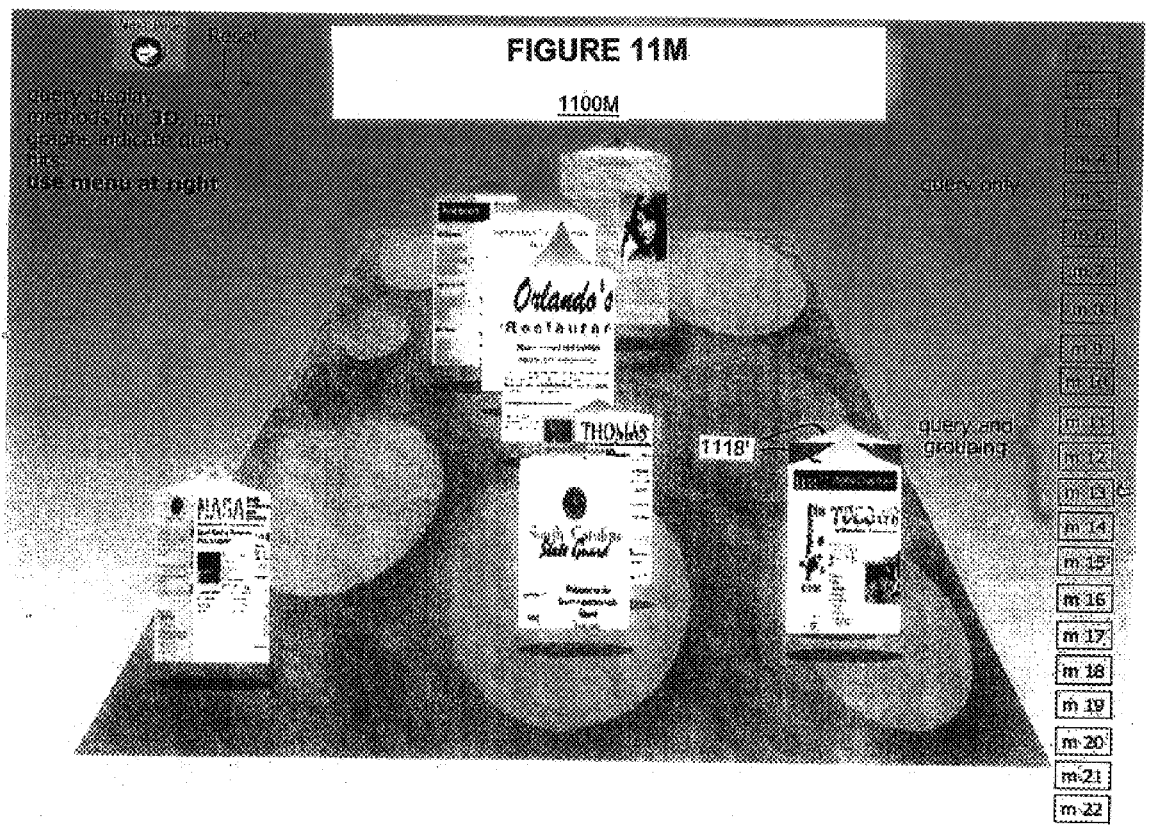

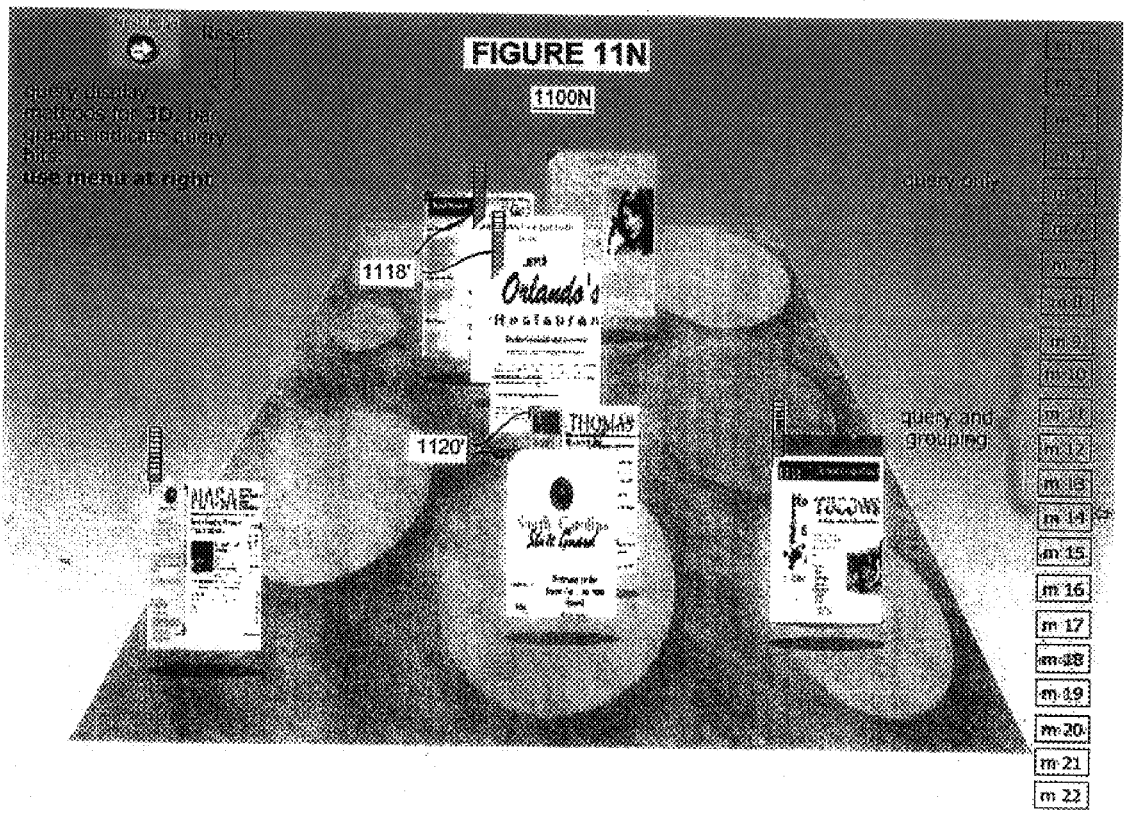

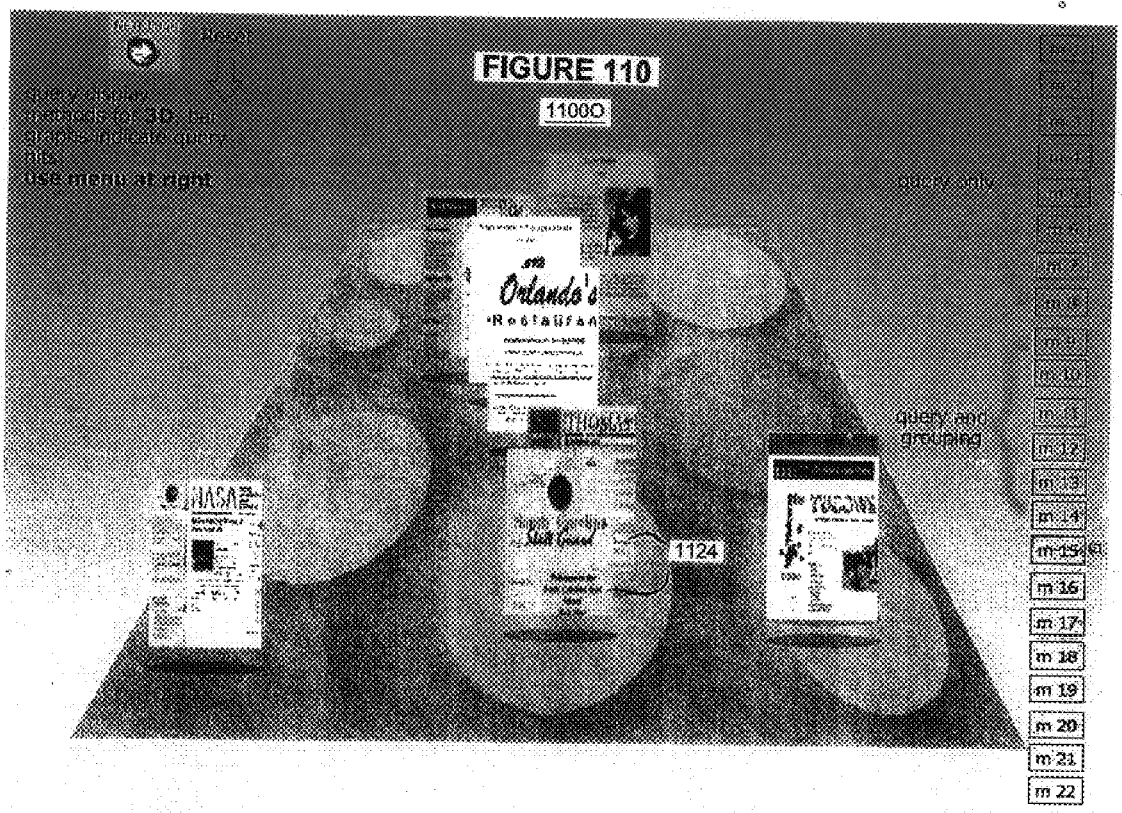

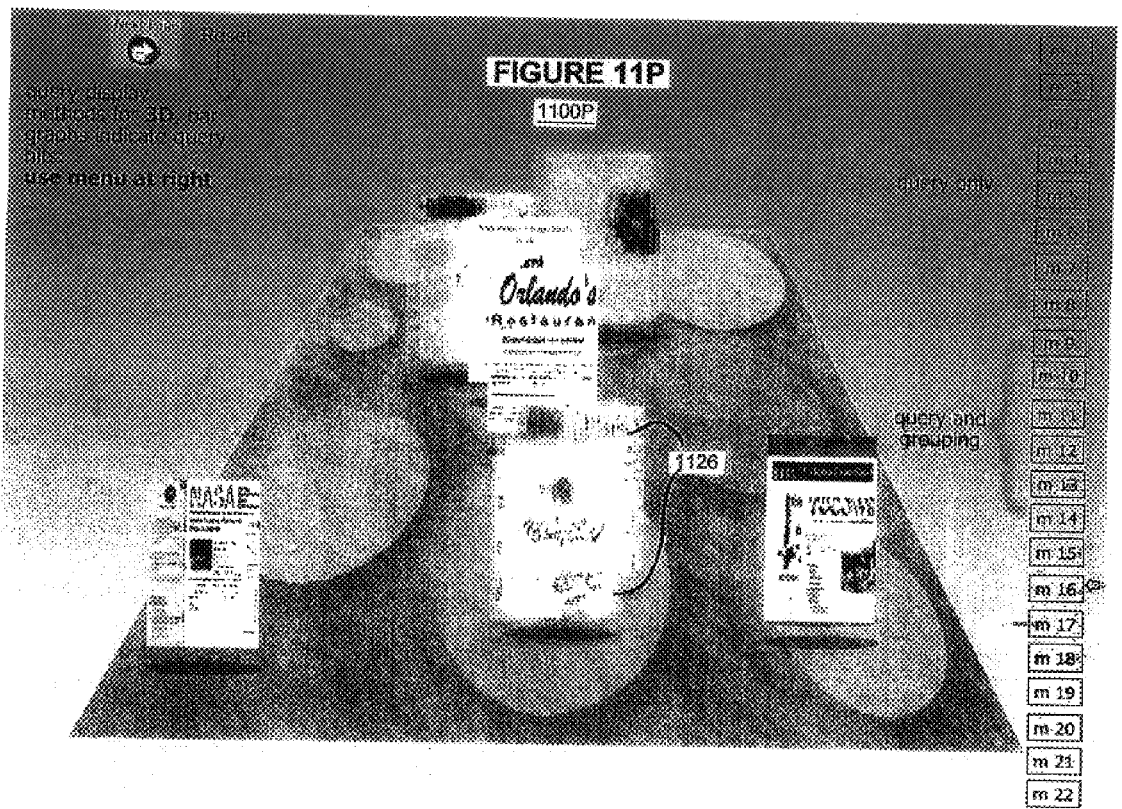

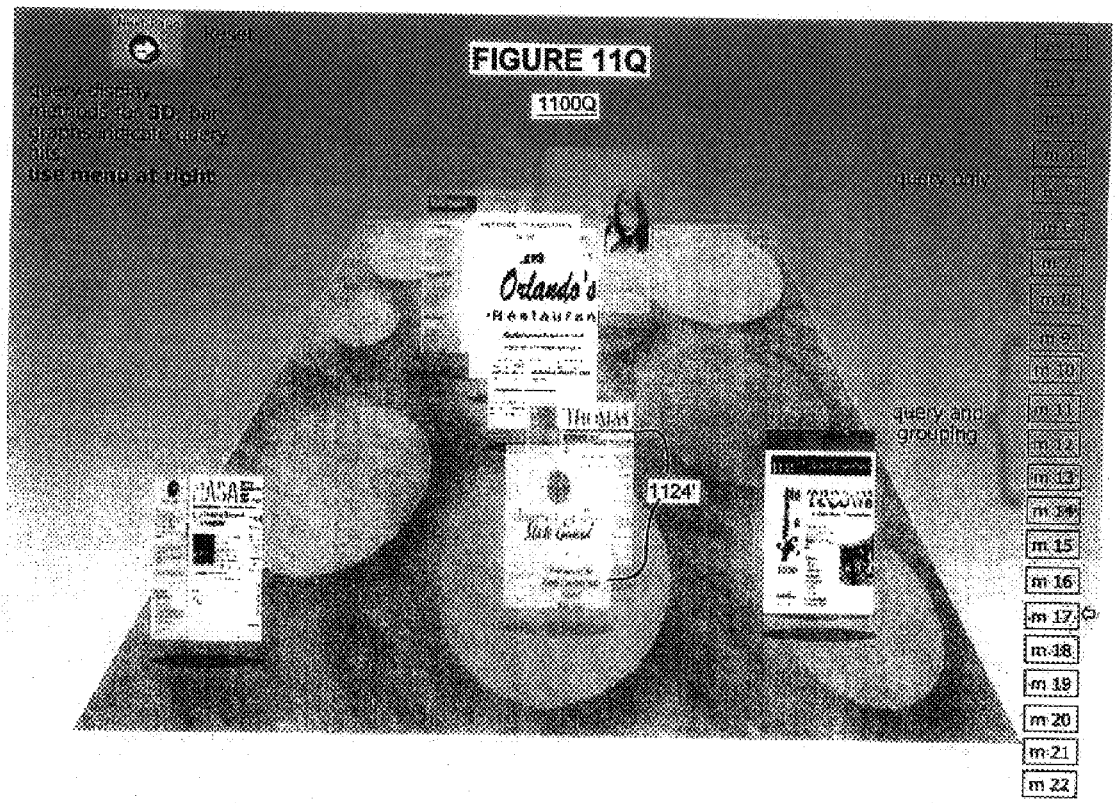

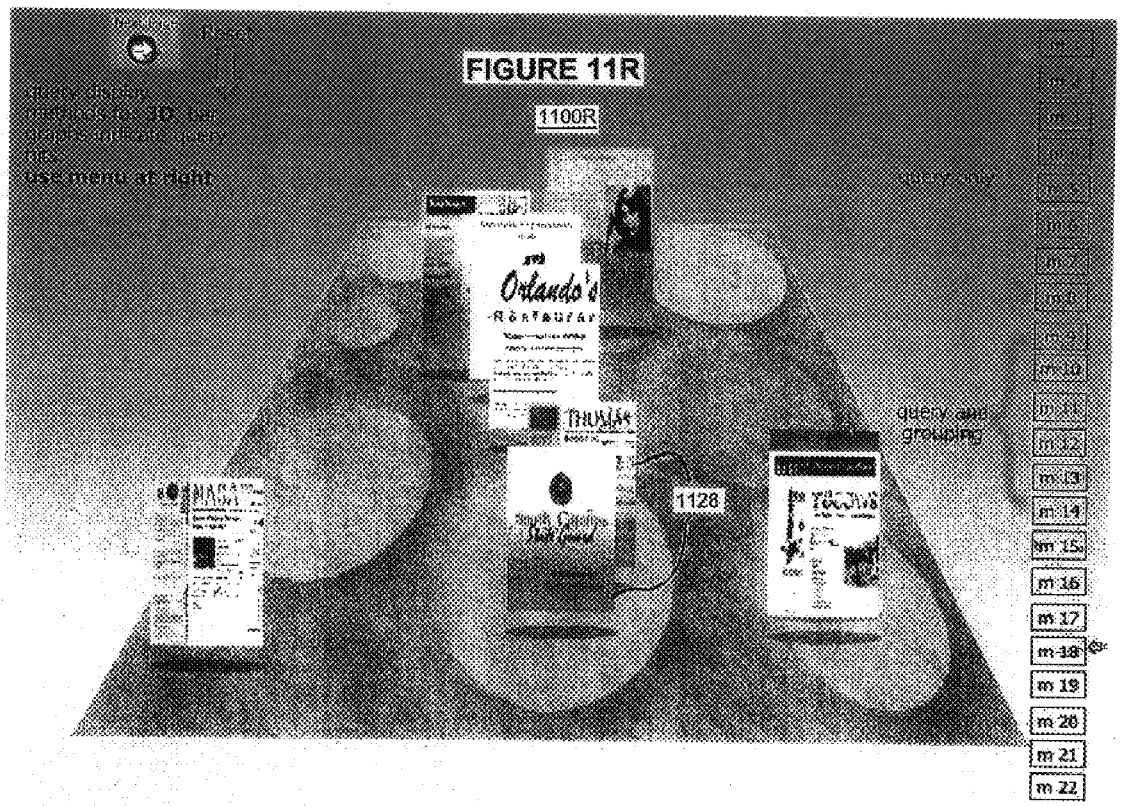

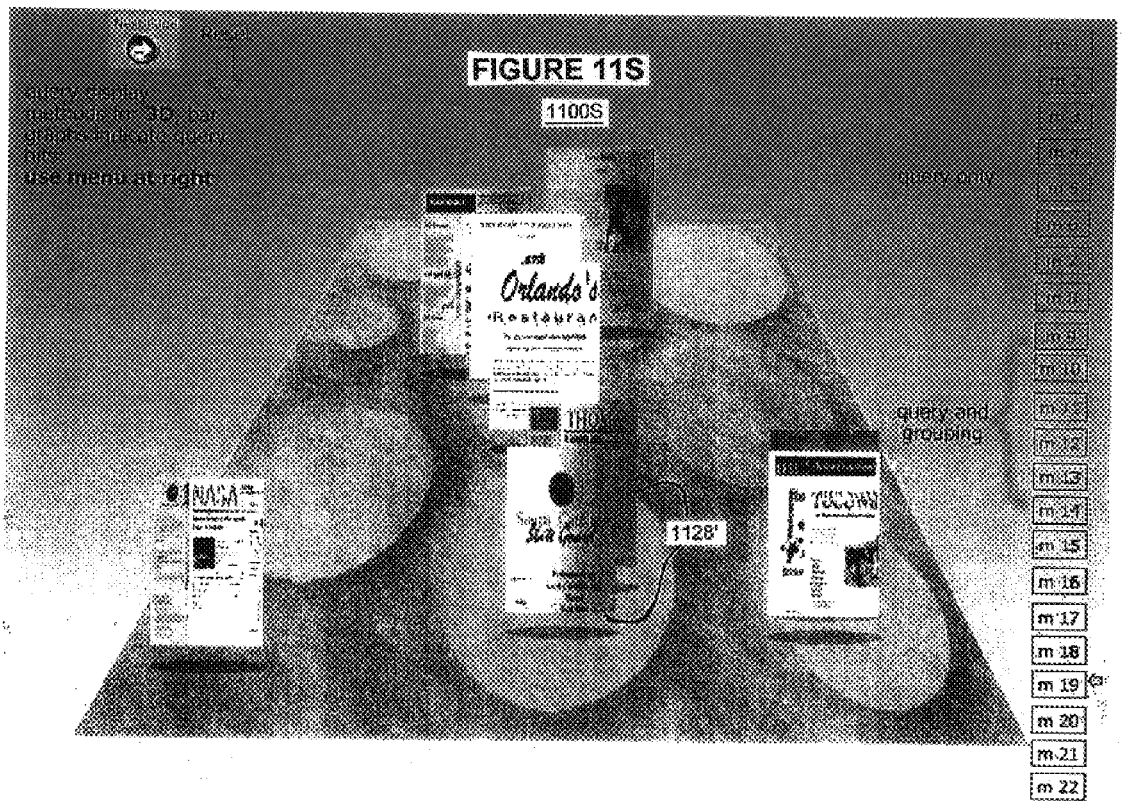

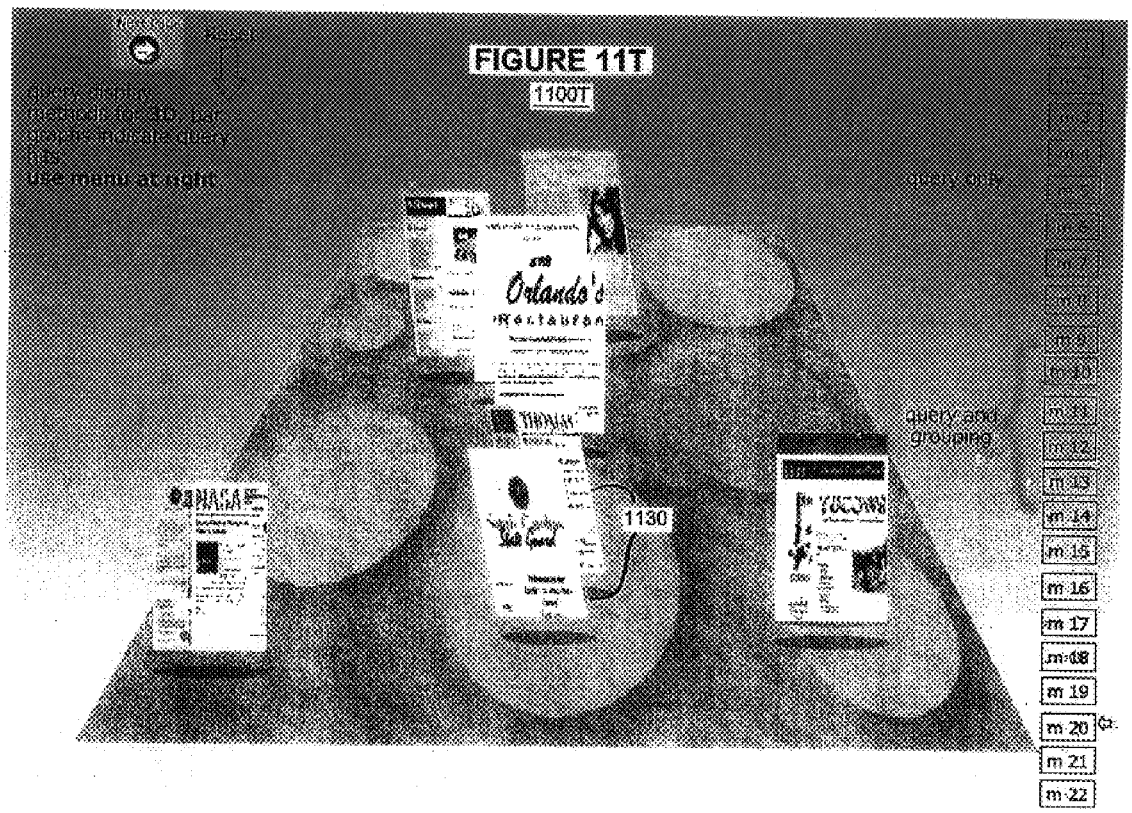

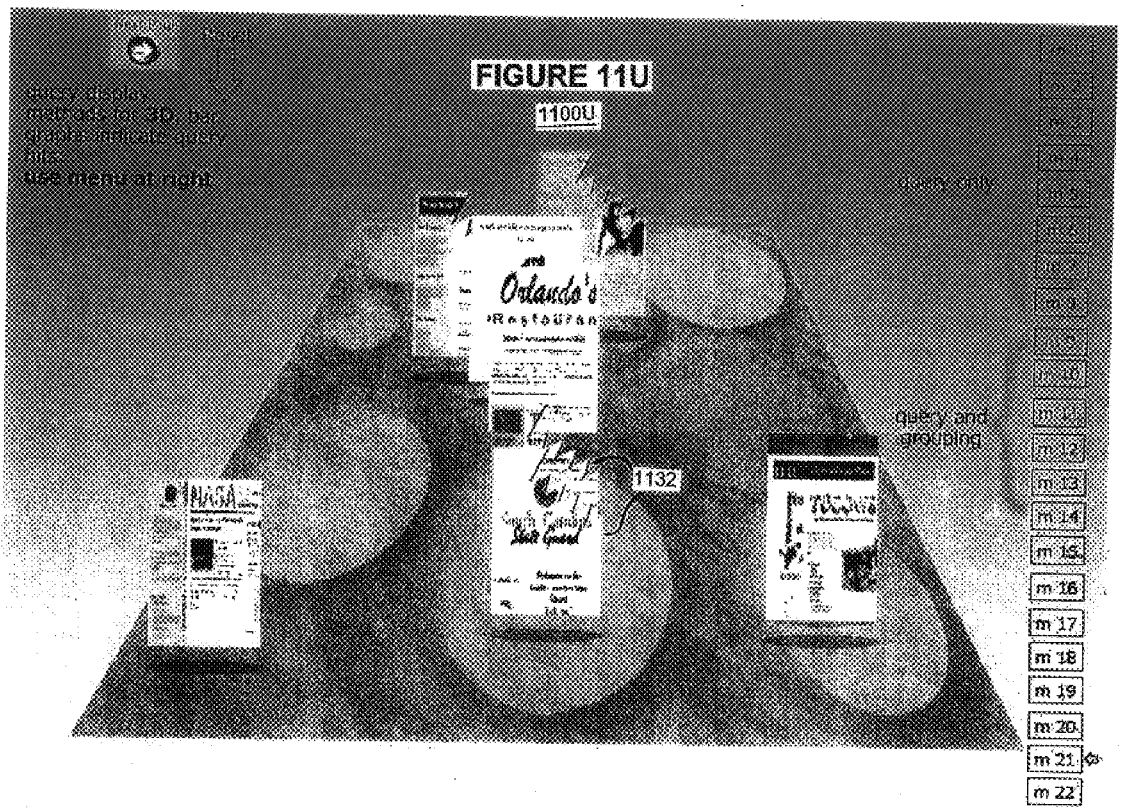

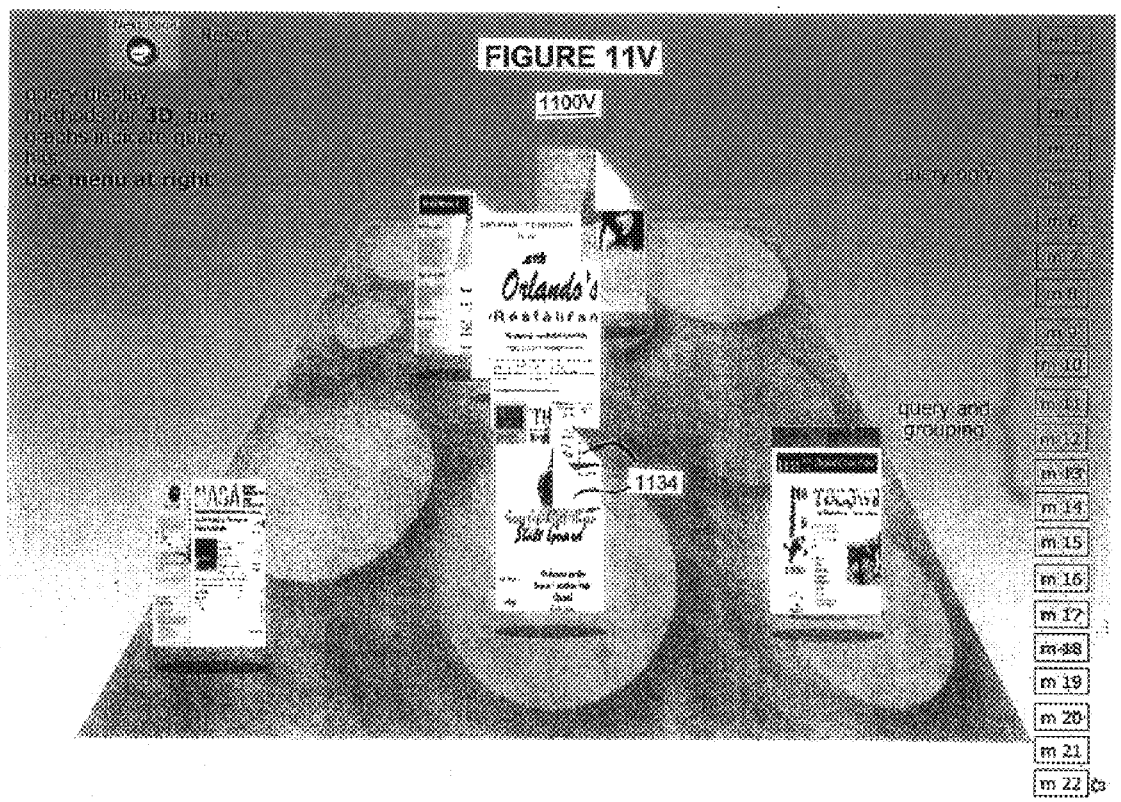

1200

1200'

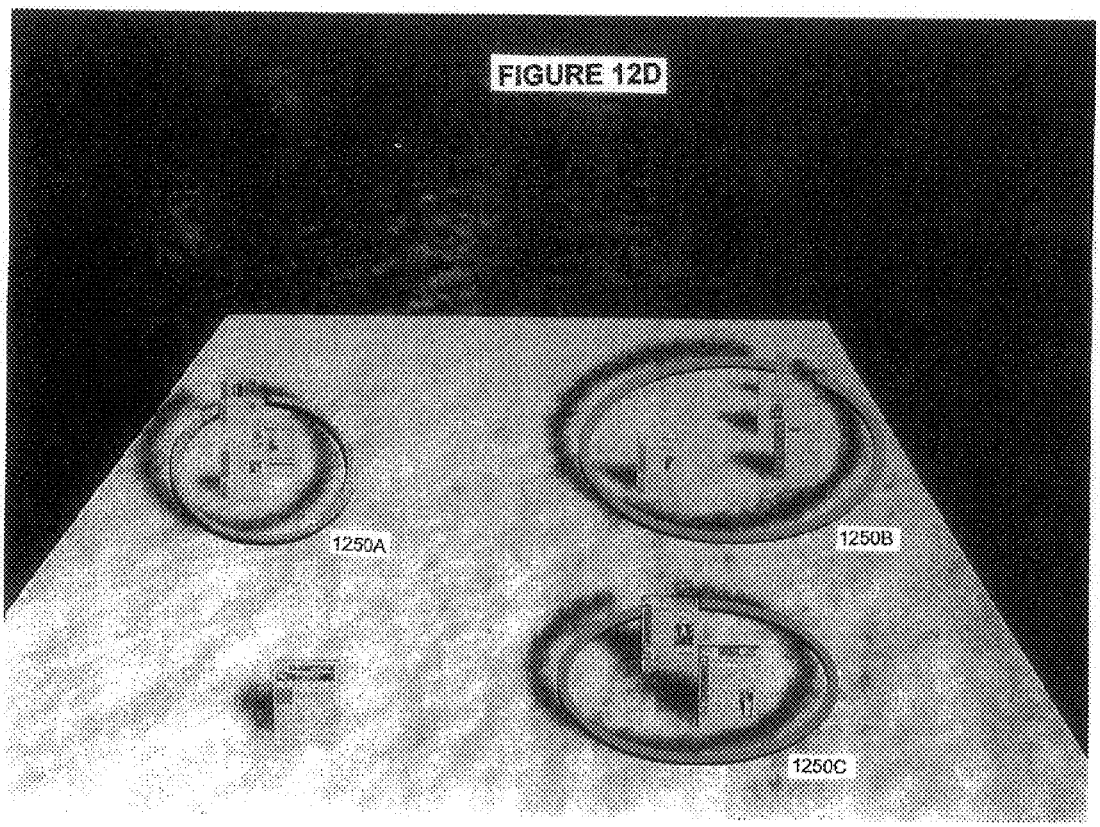

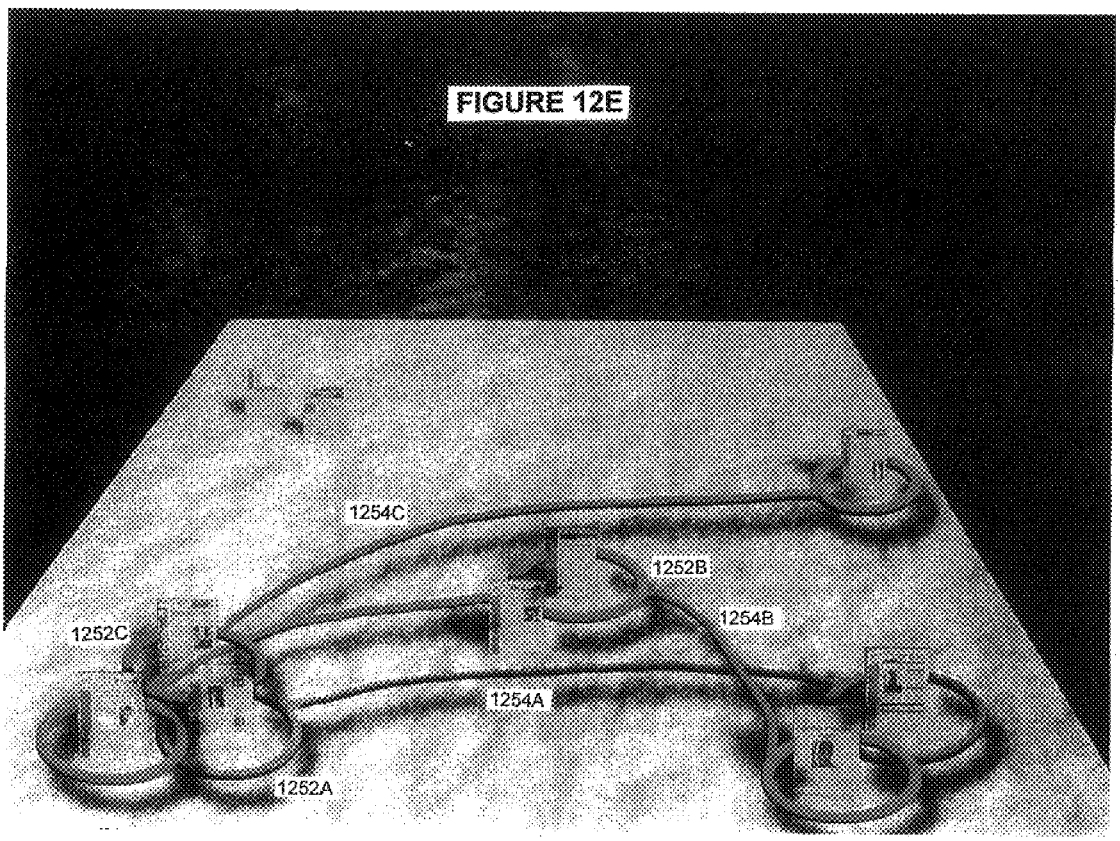

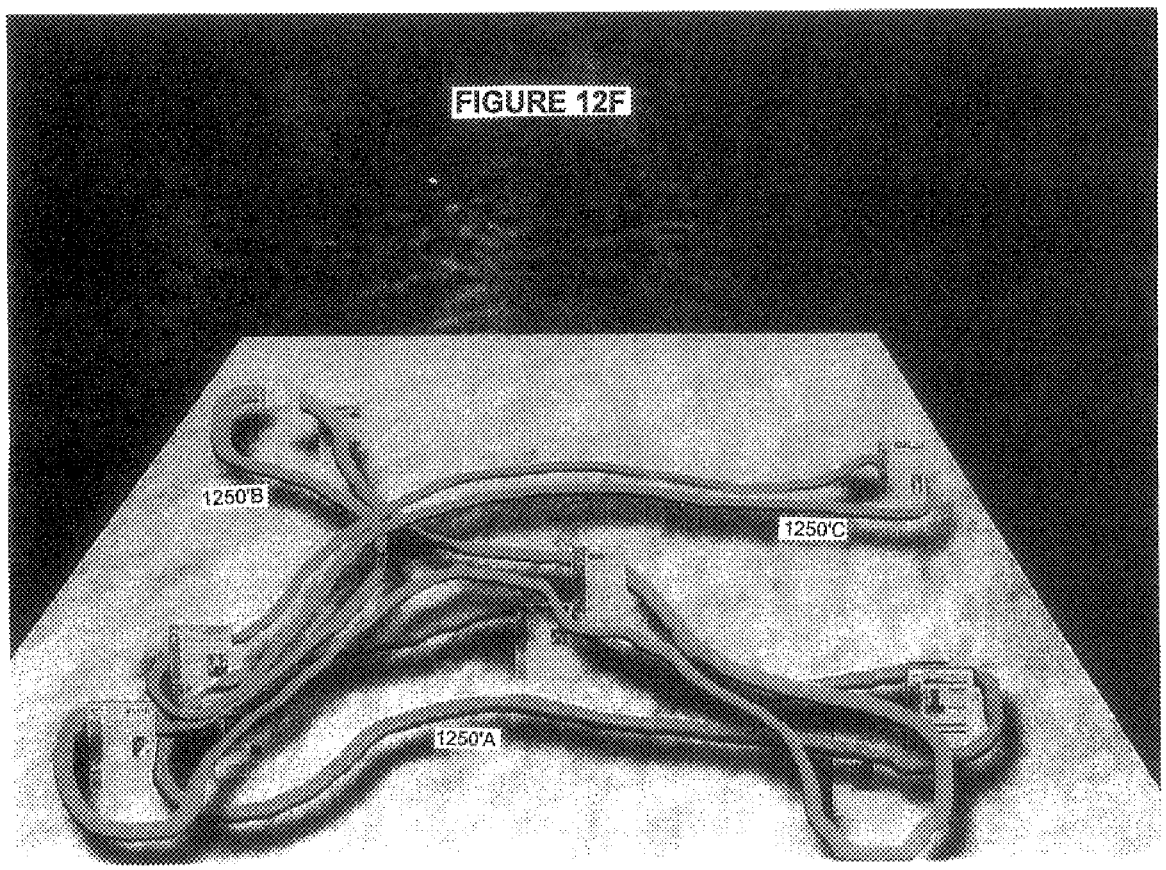

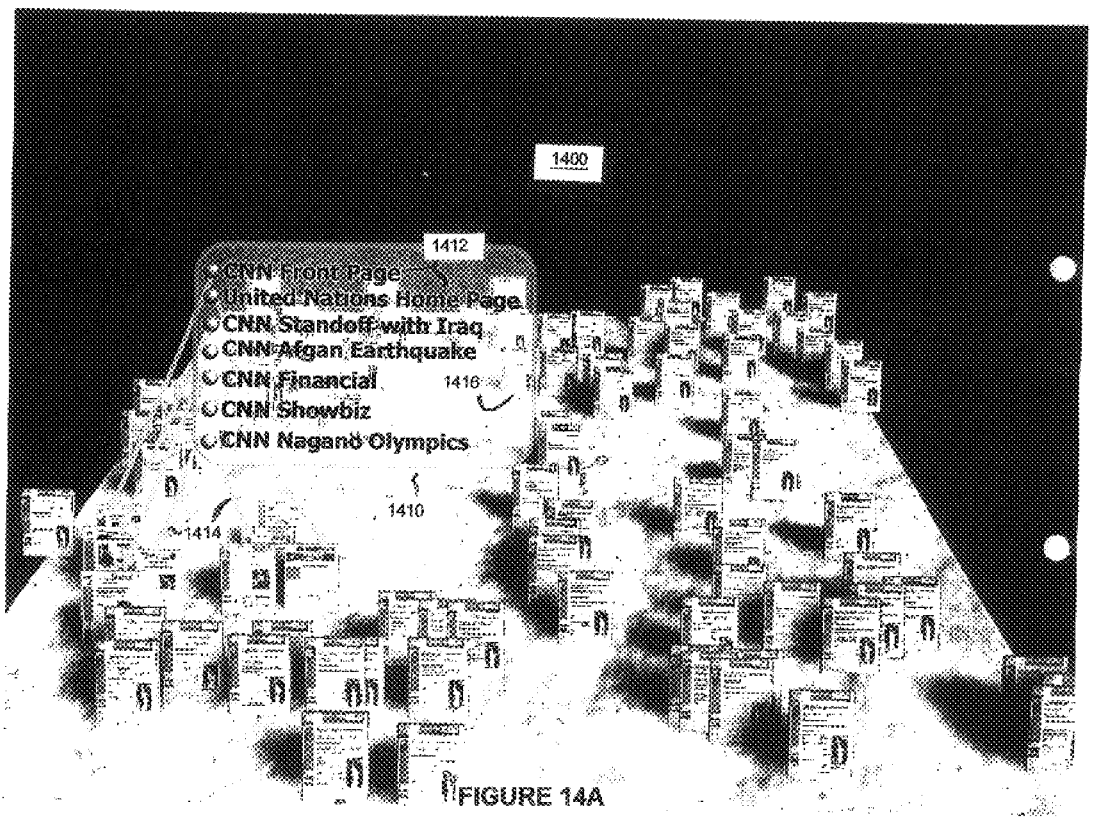

1500'

1700

1800

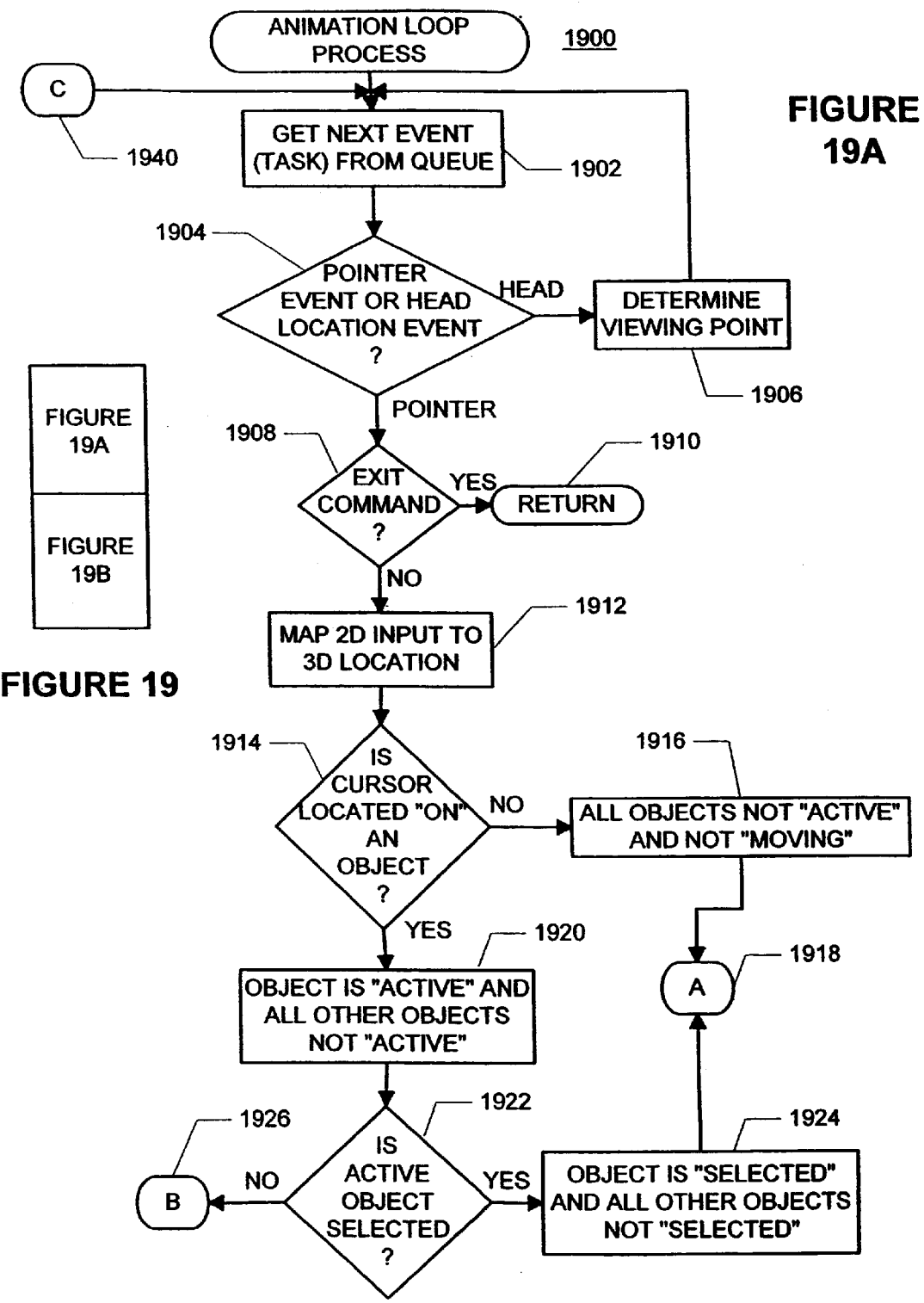

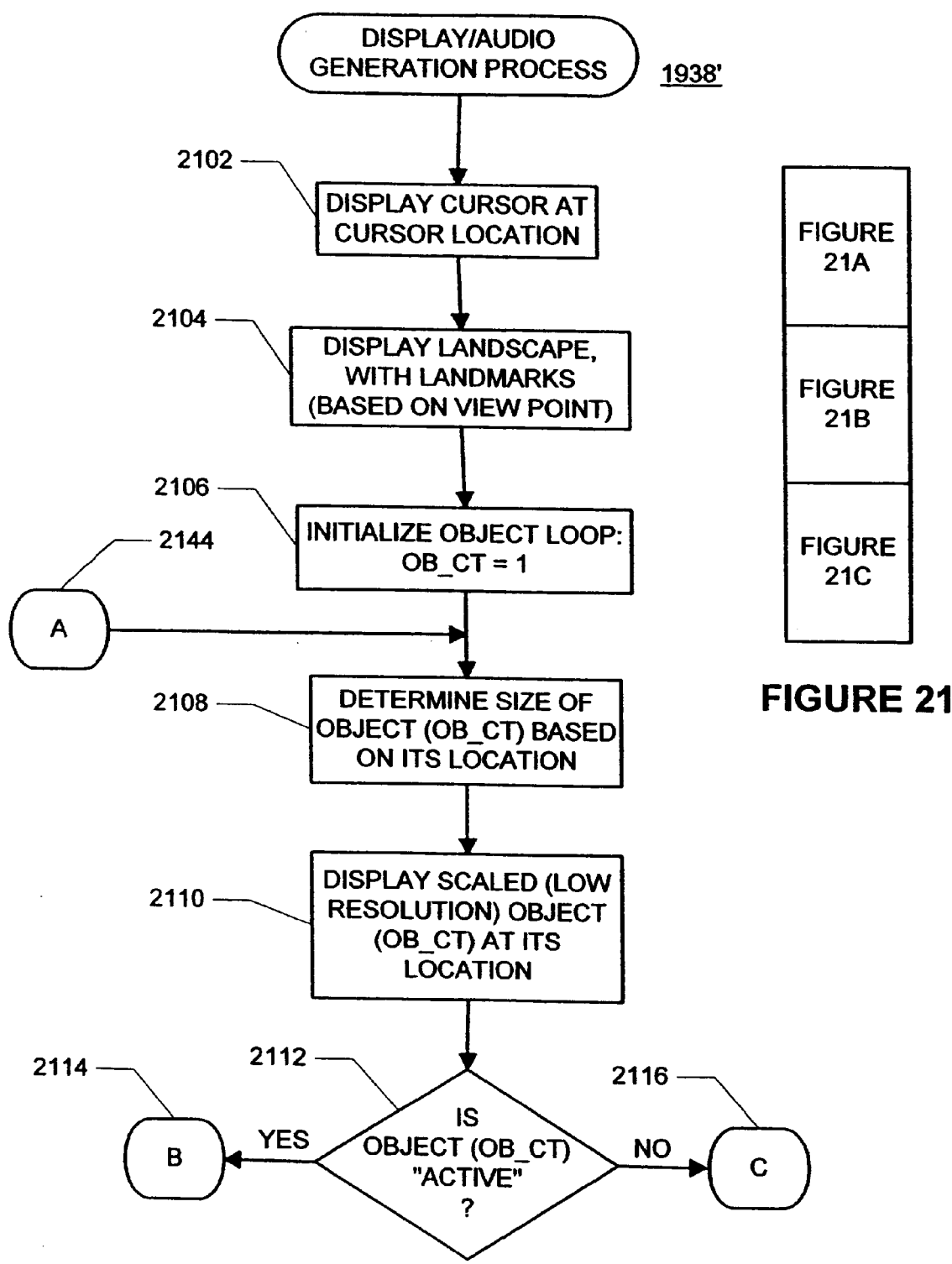
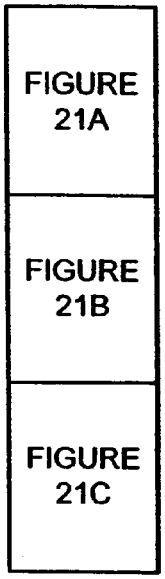
FIGURE 21
FIGURE 21A

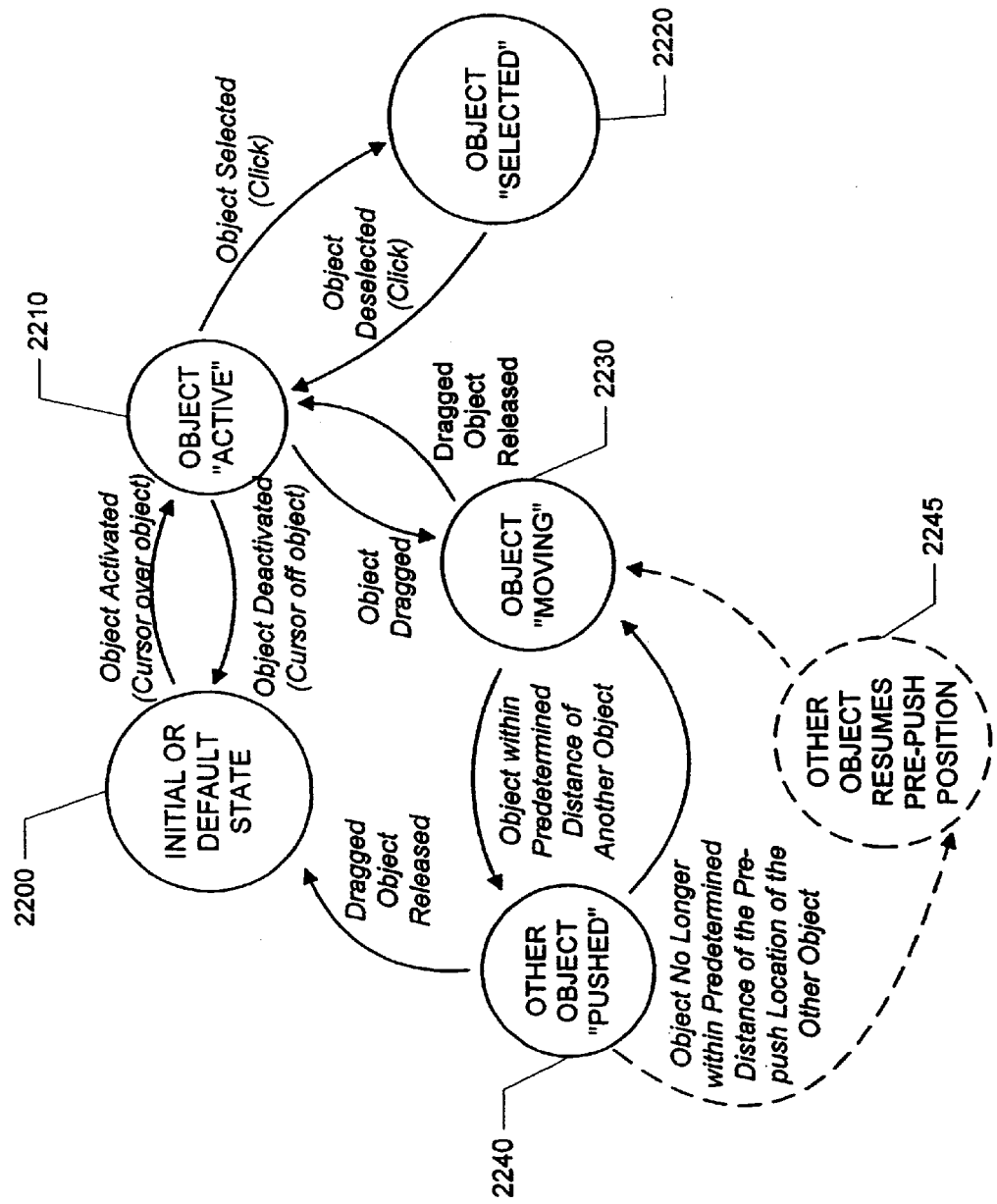

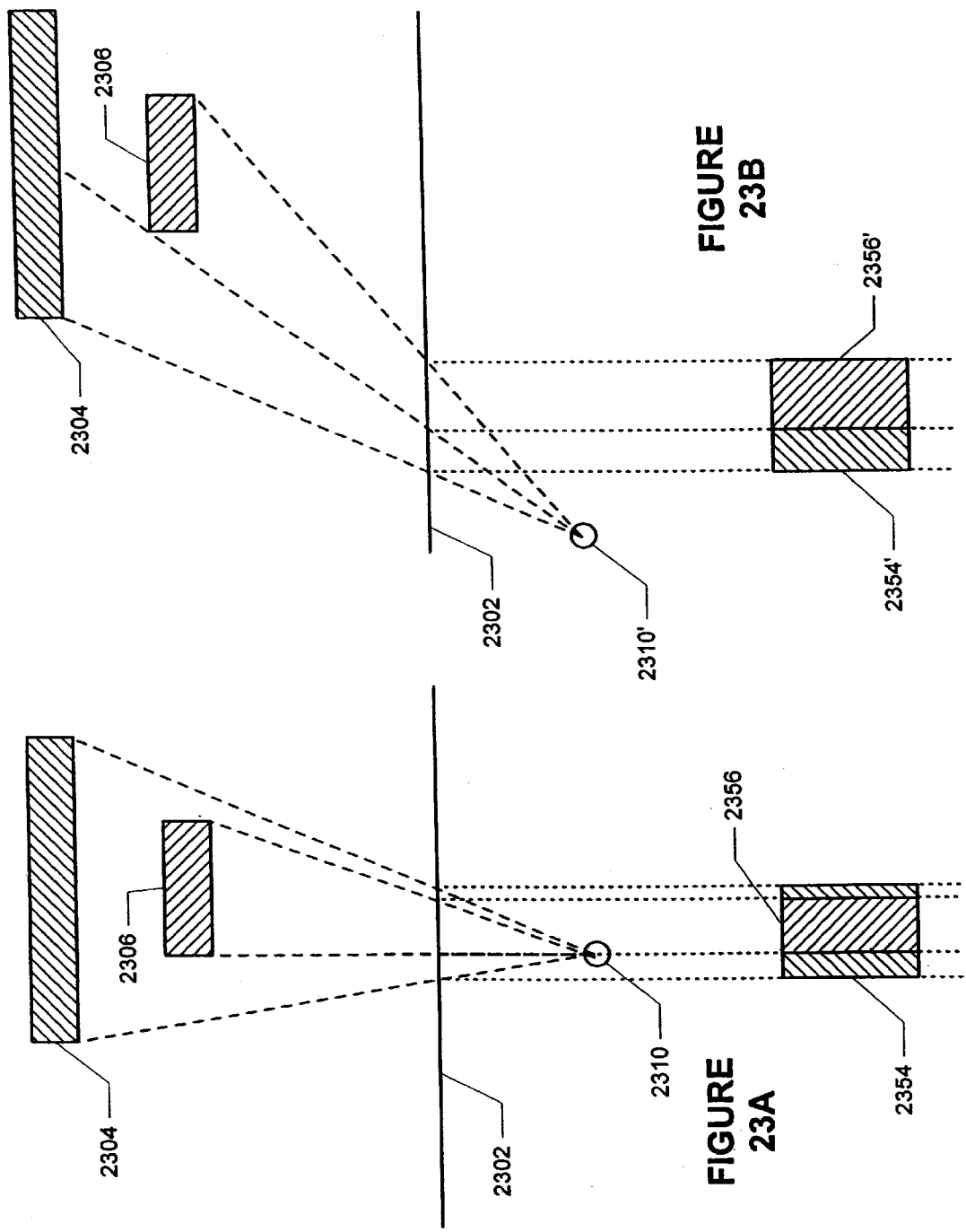

| OBJECT ID | ANIMATION TYPE | START POSITION | END POSITION | RATE | PERCENT COMPLETE |
|---|---|---|---|---|---|
| : | : | : | : | : | : |
| | | | | | |

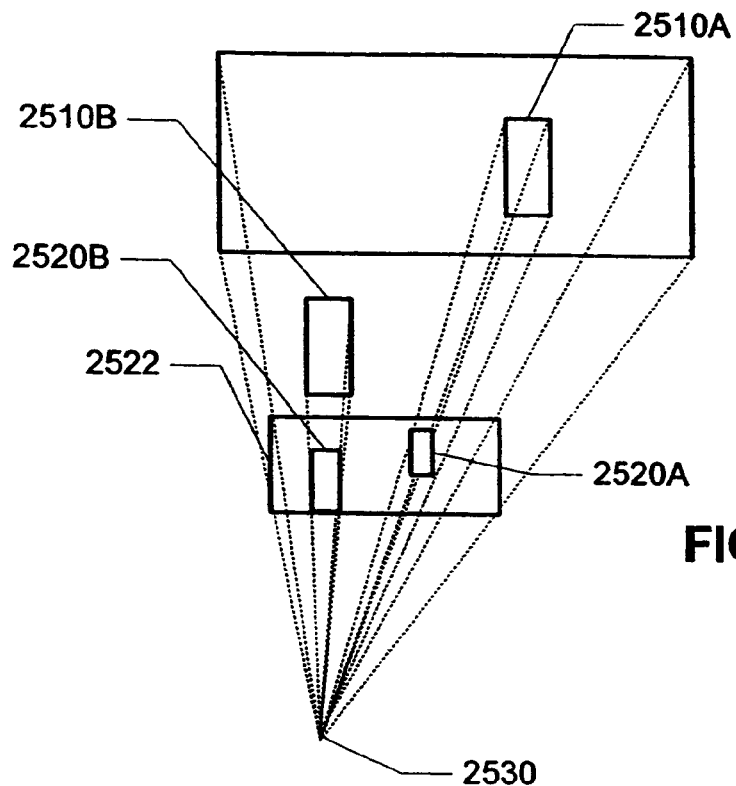
FIGURE 25
FIGURE 26
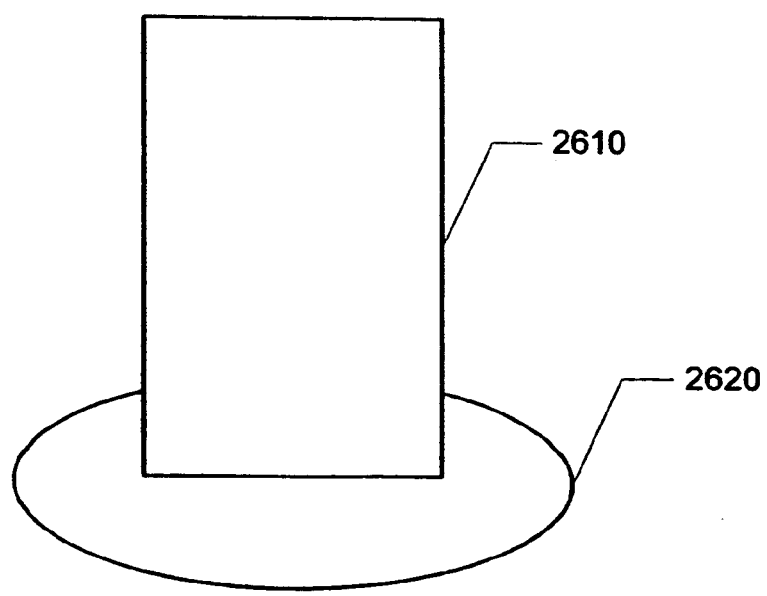

METHODS, APPARATUS AND DATA STRUCTURES FOR PROVIDING A USER INTERFACE, WHICH EXPLOITS SPATIAL MEMORY IN THREE-DIMENSIONS, TO OBJECTS AND WHICH VISUALLY GROUPS PROXIMALLY LOCATED OBJECTS

§1. BACKGROUND OF THE INVENTION

§1.1 Field of the Invention

The present invention concerns a user interface to objects, such as informational objects for example, which are stored on, or accessed via, a machine such as a computer for example. The present invention exploits the spatial memory of people.

§1.2 Related Art

A brief history of user interfaces is provided below. First, known user interfaces are introduced in §1.2.1. Then, user interfaces which facilitate information access, rather than information processing, are introduced in §1.2.2. Finally, needs of users which have not yet been met by user interfaces are listed in §1.2.3.

§1.2.1 Known User Interfaces

The way in which people interact with computing machines has evolved over the last 50 or so years. Initially, these machines were typically used as information processors, and in particular, for performing mathematical operations on numbers. People interacted with such early computing machines by punching and ordering cards to effect a sequence of commands. In later computing machines, also typically used to perform mathematical operations on numbers, people interacted with such computing machines by setting switches and viewing light emitting diodes to enter commands. With the advent of the desktop personal computer, people-machine interaction evolved from the use of a keyboard to enter lines of commands, discussed in §1.2.1.1 below, to the use of a keyboard and mouse to manipulate icon metaphors of the real world, discussed in §1.2.1.2 below. cl §1.2.1.1 Command Lines Early personal computers were also used to perform mathematical operations, from engineering applications to accounting applications (e.g., spreadsheets). In addition, such early personal computers were used to enter, store, and manipulate information, such as with word processing applications for example, and to effectively access stored information, such as with relational database applications for example. People typically interacted with such computers by entering commands, in accordance with fairly rigid syntactical rules, or by entering data via a keyboard and viewing results via a video monitor. Unfortunately, since the syntactical rules for interacting with a personal computer were typically not intuitive, people would have to invest a fairly substantial amount of time to master effective interaction with the computer. Until they mastered the syntactical rules, people would often become frustrated when using computers. Casual users would often conclude that learning to interact with computers would not be worth their time. Thus, computer use was usually limited to professionals (e.g., accountants, engineers, and scientists), who needed the computational power of personal computers, and to hobbyists.

§1.2.1.2 Graphical User Interfaces

The advent of graphical user interfaces (or "GUIs") provided a more intuitive way for people to interact with computers. The casual user no longer needed to learn syntactical rules and enter sequences of commands. As personal computers penetrated business to an ever greater degree, probably due to popular and time saving word processing and spreadsheet applications, operating systems began to employ user interfaces which used a office metaphor which included documents, folders, filing cabinets, trash cans, telephone directories, etc. These so-called desktop GUIs have served their users well over the past decade or so. However, in addition to using computers for data entry, storage and manipulation, people are using computers for access to information to an ever increasing degree. This recent trend is discussed in §1.2.2 below.

§1.2.2 Migration From Information Processing And Desktop Metaphor to Information Access In recent decades, and in the past five (5) to ten (10) years in particular, computers have become interconnected by networks by an ever increasing extent; initially, via local area networks (or "LANs"), and more recently via LANs, private wide area networks (or "WANs") and the Internet. The proliferation of networks, in conjunction with the increased availability of inexpensive data storage means, has afforded computer users unprecedented access to a wealth of content. Such content may be presented to a user (or "rendered") in the form of text, images, audio, video, etc.

The Internet is one means of inter-networking local area networks and individual computers. The popularity of the Internet has exploded in recent years. Many feel that this explosive growth was fueled by the ability to link (e.g., via Hyper-text links) resources (e.g., World Wide Web pages) so that users could seamlessly transition from various resources, even when such resources were stored at geographically remote resource servers. More specifically, the Hyper-text markup language (or "HTML") permits documents to include hyper-text links. These hyper-text links, which are typically rendered in a text file as text in a different font or color, include network address information to related resources. More specifically, the hyper-text link has an associated uniform resource locator (or "URL") which is an Internet address at which the linked resource is located. When a user activates a hyper-text link, for example by clicking a mouse when a displayed cursor coincides with the text associated with the hyper-text link, the related resource is accessed, downloaded and rendered to the user. The related resource may be accessed by the same resource server that provided the previously rendered resource, or may be accessed by a geographically remote resource server. Such transiting from resource to resource, by activating hyper-text links for example, is commonly referred to as "surfing".

Although people continue to use computers to enter information, manipulate information, and store information, in view of the foregoing developments people are using computers to access information to an ever increasing extent. In a departure from the past, the information people want to access is often not created by them (which would typically reside on the person's desktop computer), or even by a company or group to which that person belongs (which would typically reside on a storage server, accessible via a local area network). Rather, given the world wide breadth of the Internet, the information people want to access is usually created by unrelated third parties (or content providers). Unfortunately, GUIs using a desktop metaphor are not particularly well suited for such information access.

New GUIs should therefore help people find information that they want, or that they might want. Unfortunately, the very vastness of available data can overwhelm a user; desired data can become difficult to find and search heuristics employed to locate desired data often return unwanted data (also referred to as "noise").

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through a predetermined hierarchy of menus. If a user mistakenly believes that a category will be of interest or include what they were looking for, but the category turns out to be irrelevant, the user must backtrack through one or more hierarchical levels of categories.

Again in the context of the Internet for example, some services provide "search engines" which search database content or "web sites" pursuant to a user query. In response to a user's query, a rank ordered list, which includes brief descriptions of the uncovered content, as well as a hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content (or "noise") to be returned in response to a query. Again, unfortunately, the very wealth of available content impairs the efficacy of these search engines since it is difficult to separate irrelevant content from relevant content.

The foregoing means permit users to find content of interest to them, or to deliver content that may be of interest to a user. Unfortunately, neither of the foregoing means is particularly well suited when the user wants to "go back" to (or "relocate") information (or content), to revisit that information or to revisit a familiar content provider to view new information (or content). More specifically, a person typically does not want to go through steps of navigating through a hierarchy of menus, or entering a search query to get to favored content or favored content providers.

§1.2.2.1 Information Access User Interfaces and Their Limitations

In view of the shift towards using computers to access information, a number of user interfaces has been developed to help people revisit or relocate information or content providers. A sample of these user interfaces, as well as perceived limitations of such user interfaces, is presented below.

§1.2.2.1.1 Bookmarks and Favorites Lists

Some so-called "Internet browser" program services, such as Microsoft's Internet Explorer™ for example, permit people to create lists of favorite Internet locations (as located by a Uniform Resource Locator or "URL") represented by bookmarks. Unfortunately, as the number of bookmarks in a list increases, a person's ability to find a desired bookmark becomes more difficult. Although people can arrange and organize such lists of bookmarks into hierarchies, this requires some effort (mental effort is also referred to as "cognitive load") to organize and maintain the hierarchy. Moreover, the use of hierarchies does not fully exploit the spatial memory (This concept has also been referred to as "where it is is what it is".) of people.

§1.2.2.1.2 Information Visualizer

Recognizing the trend towards the use of computers for information access, the article: Robertson, et al., "The Next Generation GUIs: Information Visualization Using 3D Interactive Animation," *Communications of the ACM*, Vol. 35, No. 4, pages 57–71 (April 1993) (hereinafter referred to as "the Information Visualizer article") discusses various proposals for an "Information Workspace". More specifically, a three-dimensional rooms metaphor, three dimensional hierarchical cone trees, and perspective walls are discussed as means to present information to users. Each of these techniques is introduced below.

Although the three-dimensional room metaphor exploits, at least to some degree, a person's spatial memory, the person has to manipulate objects or move to disambiguate images and reveal hidden information.

Although the three-dimensional hierarchical cone trees are useful for visualizing large amounts (e.g., 600 directories of 10,000 files) of hierarchical data, they lend themselves to predetermined hierarchies such as file directories, organizational structure, etc. That is, it is believed that the strength of three-dimensional hierarchical cone trees lies in presenting information, not building or updating hierarchies of information.

The perspective wall permits information, having some sort of linear relationship or thread, to be presented in the relatively narrow aspect ratio of a typical video monitor. When an item is selected, the wall moves the item to a center portion of the wall as if it were a sheet in a player piano reel. Its intuitive three-dimensional metaphor allows smooth transitions among views, thereby helping a user to perceive object consistency. Files may be classified by their modification date. Although the perspective wall technique lends itself to information having a linear (e.g., timeline) thread, this technique is less useful for other types of information, or for information in which a linear thread is unimportant. In fact, to have maximum impact, the perspective wall should be combined with an information retrieval technique for highlighting similar or related items to a selected item. Moreover, a user is confined to relating information to some type of a linear thread.

Apart from the limitations of the three-dimensional hierarchical cone tree and perspective wall techniques introduced above, in these techniques, there is little user choice about where an informational object is located in the user interface—it either has a spot in a hierarchy or a spot on a linear thread. Although it is true that a user can define a hierarchical structure or determine what linear thread the informational objects are to be related, once the structure or thread is determined, user choice about where to locate the information object is removed.

§1.2.2.1.3 Web Book/Web Forager

Another article, Card, et al., "The WebBook and Web Forager: An Information Workspace for the World-Wide Web," *Proceedings of CHI '96*, pp. 111–117 (Apr. 13–18, 1996) (hereafter referred to as "the WebBook article") also recognized the trend towards the use of computers for information access. Focusing on the use of the Internet, the WebBook article noted, among other things, that web pages are often hard to find, users get lost and have difficulty relocating pages, and users have difficulty organizing found pages. The article then discussed a WebBook™ type electronic book which simulates, in three dimensions, a physical book and includes pages, each of which correspond to a web page. Hypertext links are color coded to indicate whether the referenced web page is within the currently opened book or not. If the web page referenced by the link is in the book, activating the hypertext link will effect an animation of flipping pages to the desired web page. If the web page referenced by the link is not in the book, activating the hypertext link will close the currently opened WebBook type book and, if the web page is in another WebBook type book on a simulated bookshelf, will open that WebBook type book to the selected web page. The user can flip or ruffle through the pages of the WebBook type book using various input techniques. Portions of interest on a web page may be inspected with panning and zooming operations. The Document Lens feature described in the WebBook article is related to U.S. Pat. No. 5,670,984 to Robertson (incorporated herein by reference).

Although the WebBook type book uses screen space efficiently and uses a familiar metaphor, it has a number of limitations. First, the book metaphor limits the number of web pages that can be seen at one time—most pages are occluded. Second, the book metaphor does not exploit spatial memory. That is, it is believed that user will only remember the ordered pages in a linear (or one-dimensional) manner.

The WebBook article also discusses a Web Forager which embeds the WebBook type book and other objects in a hierarchical three-dimensional workspace. The workspace includes four (4) hierarchical levels; namely a focus place, an immediate memory space, a secondary storage area, and a tertiary storage area. In the focus place, objects are rendered in full size and can be acted upon by the user. The immediate memory space uses the metaphor of a desk top. The secondary storage area uses several tiers in Z-space, in which objects can be moved. Finally the tertiary storage area uses a bookshelf metaphor. A book selected from the bookshelf will come up to the focus place and an object then in the focus place will be moved into the intermediate memory space.

Although the Web Forager exploits, at least to some extent, spatial memory, particularly in the secondary storage area, the interaction between the focus place, immediate memory place, secondary storage area, and tertiary storage area may not be immediately obvious to new users. Further, if more than about 30 objects are placed in the secondary storage place, objects may become occluded. Finally, the use of tiers in the Z-dimension of the secondary storage place limits the exploitation of a user's spatial memory.

§1.2.2.1.4 Workscape

Noting the concept of "what it is is where it is", the article, Ballay, "Designing Workscape™: An Interdisciplinary Experience", *Human Factors in Computing Systems, CHI '94*, pp. 10–15 (April 1994) (hereafter referred to as "the Workscape article"), discusses a three-dimensional user interface for managing documents. Workscape permits users to drag documents in the X-Y plane, and also push and pull documents in the Z-dimension.

Although Workscape exploits spatial memory, it is apparently not concerned with the problem of object occlusion. Furthermore, it is believed that separate user operations for (i) dragging an object in the X-Y plane, and (ii) pushing and pulling documents in the Z dimension will be cumbersome for users in practice.

§1.2.2.1.5 MAPA

The product MAPA, offered by Dynamic Diagrams of Providence, R.I., uses a three-dimensional display to show the organization of web pages at a web site. As a web page is selected, its children in the web site hierarchy are displayed. The pages are represented by sheets. As a user's cursor hovers over a page, a pop-up title is provided. Like the hierarchical cone trees discussed in §1.2.2.1.2 above, although MAPA may be useful for visualizing large amounts of hierarchical data, it lends itself to predetermined hierarchies (i.e., web pages of a web site). That is, it is believed that the strength of MAPA is presenting information, not building or updating hierarchies of information.

§1.2.3 Unmet Needs

As discussed above, there exists a need for a user interface, and in particular a graphical user interface, to information or content. Such a user interface should exploit spatial memory. For example, the user interface should simulate three dimensions, and should permit continuous movement in the simulated space, to exploit spatial memory to the fullest extent. Other means or cues for reinforcing the three-dimensional environment queues should be used. The user interface should also be intuitive to minimize the time needed for a user to become familiar with it. For example, the user interface should not be cumbersome or require too many different types of inputs to manipulate objects. Finally, the user interface should provide intelligent help to the user.

§2. SUMMARY OF THE INVENTION

The present invention provides a user interface, and in particular a graphical user interface, to organize and access information or content (also referred to as an "object"). The present invention permits a user to view and organize all objects and to edit or otherwise work on a selected object by, for example, representing, graphically, objects or content with a low resolution image which can be added, moved, or deleted from a simulated three-dimensional environment on the user's video monitor. The present invention may use pop-up title or information bars for permitting a user to discern more about the object represented by a low resolution image. The present invention may use higher resolution image representations of objects, or "live" objects loaded within an associated application, for editing or otherwise working on a selected object. Other visual representations of objects may be used, such as schematic or iconic representations of the content of each object for example. Any and all visual representations of objects may be referred to as "thumbnails" in the following.

The user interface of the present invention exploits spatial memory by, for example, simulating a plane located and oriented in three-dimensional space, or other three-dimensional landscape on which the object thumbnails may be manipulated. The plane or landscape may include visual landmarks for enhancing a user's spatial memory. As the object thumbnails are moved about the landscape, the present invention may employ perspective views (perceived image scaling with distance), partial image occlusion, shadows, and/or spatialized audio to reinforce the simulated three-dimensional plane or landscape. Other audio cues may be used to indicate proximal relationships between object thumbnails, such as when an object thumbnail being "moved" is close to a pre-existing cluster of object thumbnails. An ancillary advantage of using a simulated three-dimensional landscape is that more objects can be represented, at one time, on a single display screen.

The user interface of the present invention is intuitive and minimizes the time needed for a user to become familiar with it. The user interface of the present invention is neither cumbersome, nor does it require too many different types of inputs to manipulate the object "thumbnails". For example, the present invention may use inputs from a familiar input device such as a mouse or pointer to manipulate the object thumbnails. To minimize the number of different types of inputs required to manipulate the object thumbnails, the present invention may map two-dimensional inputs, such as moving a mouse on a mouse pad, to a three-dimensional movement on the simulated three-dimensional display. The location of the objects may be constrained to the plane or landscape. The present invention may also prevent one object thumbnail (or landscape feature) from totally occluding another object thumbnail so that the latter is not totally hidden from the user. To further reinforce the simulated three-dimensional environment, the present invention may simulate head motion parallax. In this regard, the present invention may use a camera (or head or body mounted equipment) to detect the position or, alternatively, the orientation, of a user's head relative to a video monitor on which the user interface is rendered.

Finally, the user interface of the present invention can provide intelligent help to the user. For example, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user or based on a property (e.g., age, storage location, etc.) of an object. The present invention may employ some type of visual indication, such as a colored halo around thumbnails of related objects. This visual indication may be rendered continuously or, alternatively, upon an event, such as when an object thumbnail is made "active". Audio indications may also be used to indicate when a thumbnail being manipulated by a user is in close proximity to a relevant pre-existing cluster. Other audio cues may also be used to indicate other relationships between thumbnails.

§3. BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 1A is a personal computer on which the user interface of the present invention may be effected.

FIG. 10B is a portion of FIG. 10A, enlarged to show detail.

FIGS. 11A through 11V are various displays which depict various alternative ways of rendering implicit query information.

FIGS. 12A through 12F are various displays which depict various alternative ways of representing local clusters of objects.

FIGS. 14A and 14B are displays which depict the selection of multiple items.

Figure 19B:
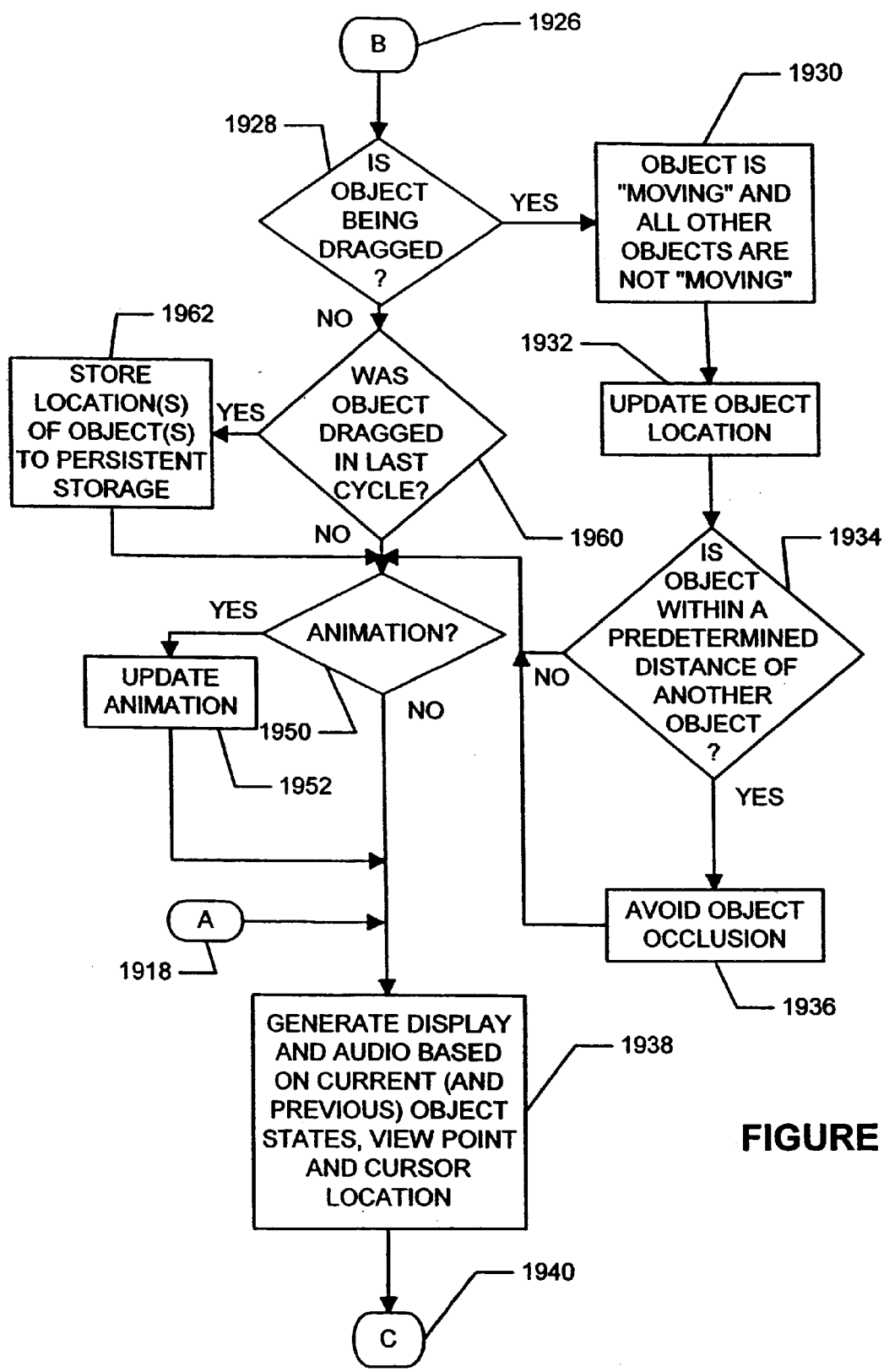

FIG. 19, which includes FIGS. 19A and 19B, is a flow diagram of an animation loop process which may be used by the user interface of the present invention.

Figure 20A:
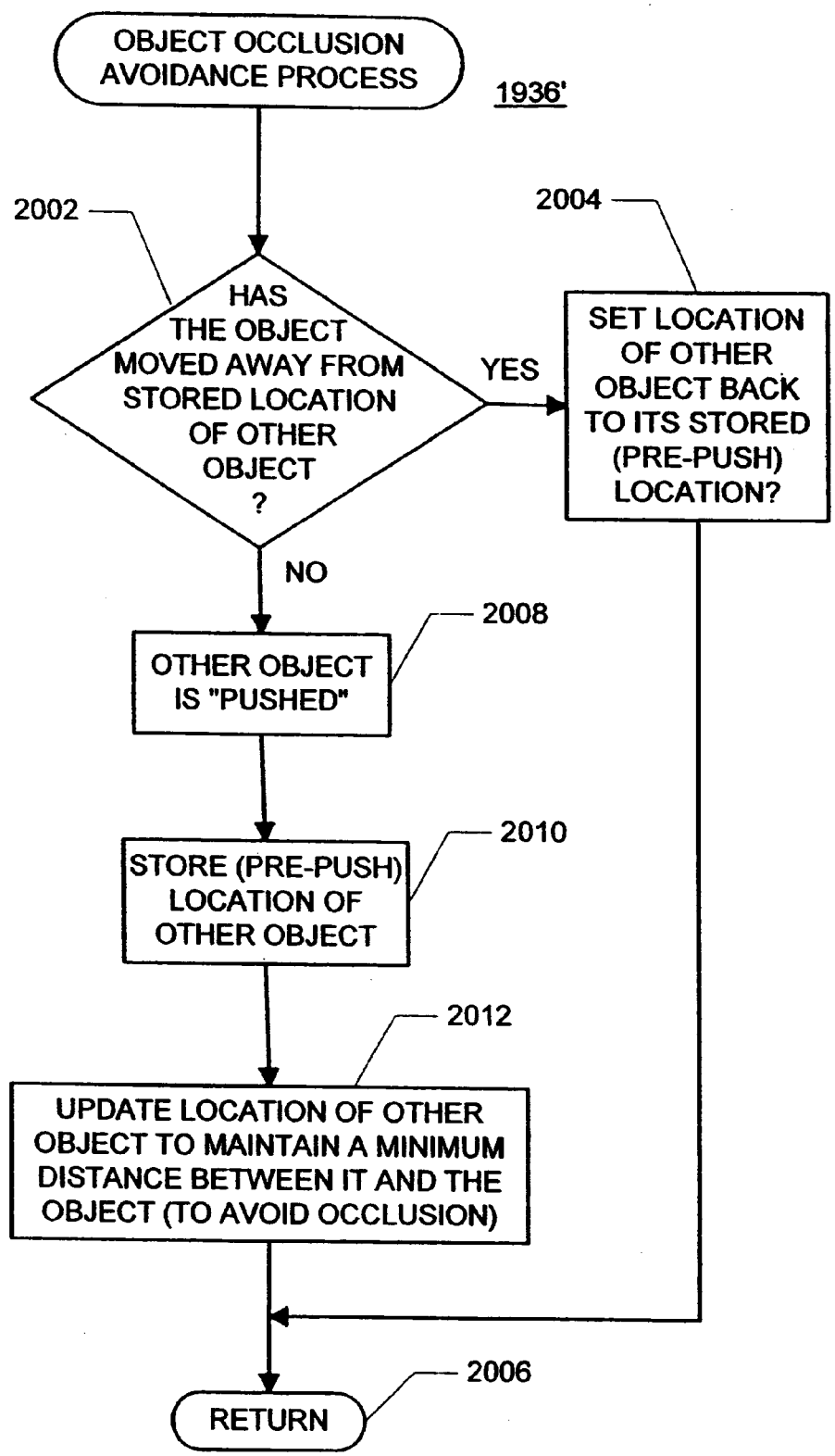
Figure 20B:
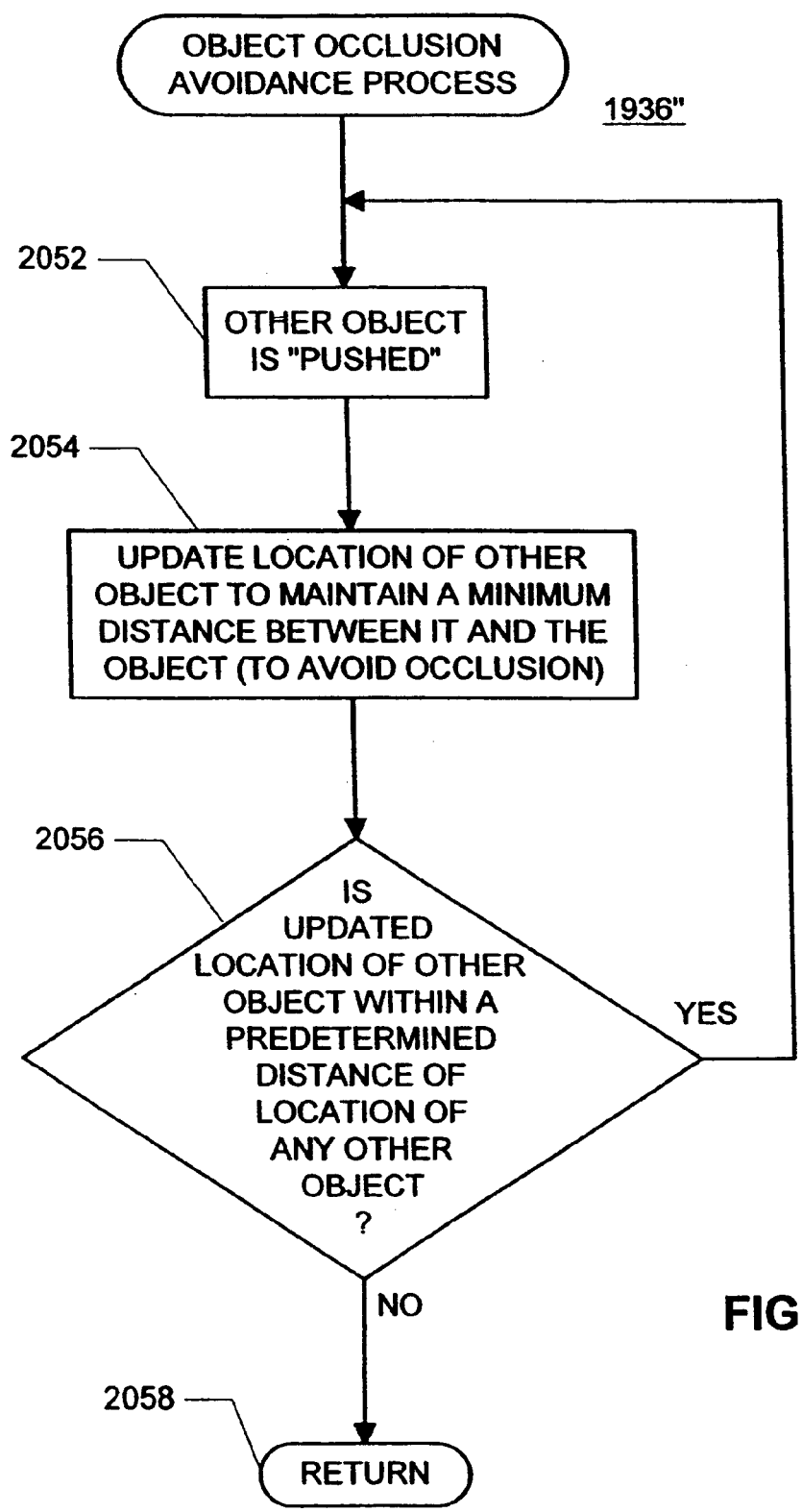

FIGS. 20A and 20B are flow diagrams of alternative object occlusion avoidance processes which may be used by the process of FIG. 19.

Figure 21B:
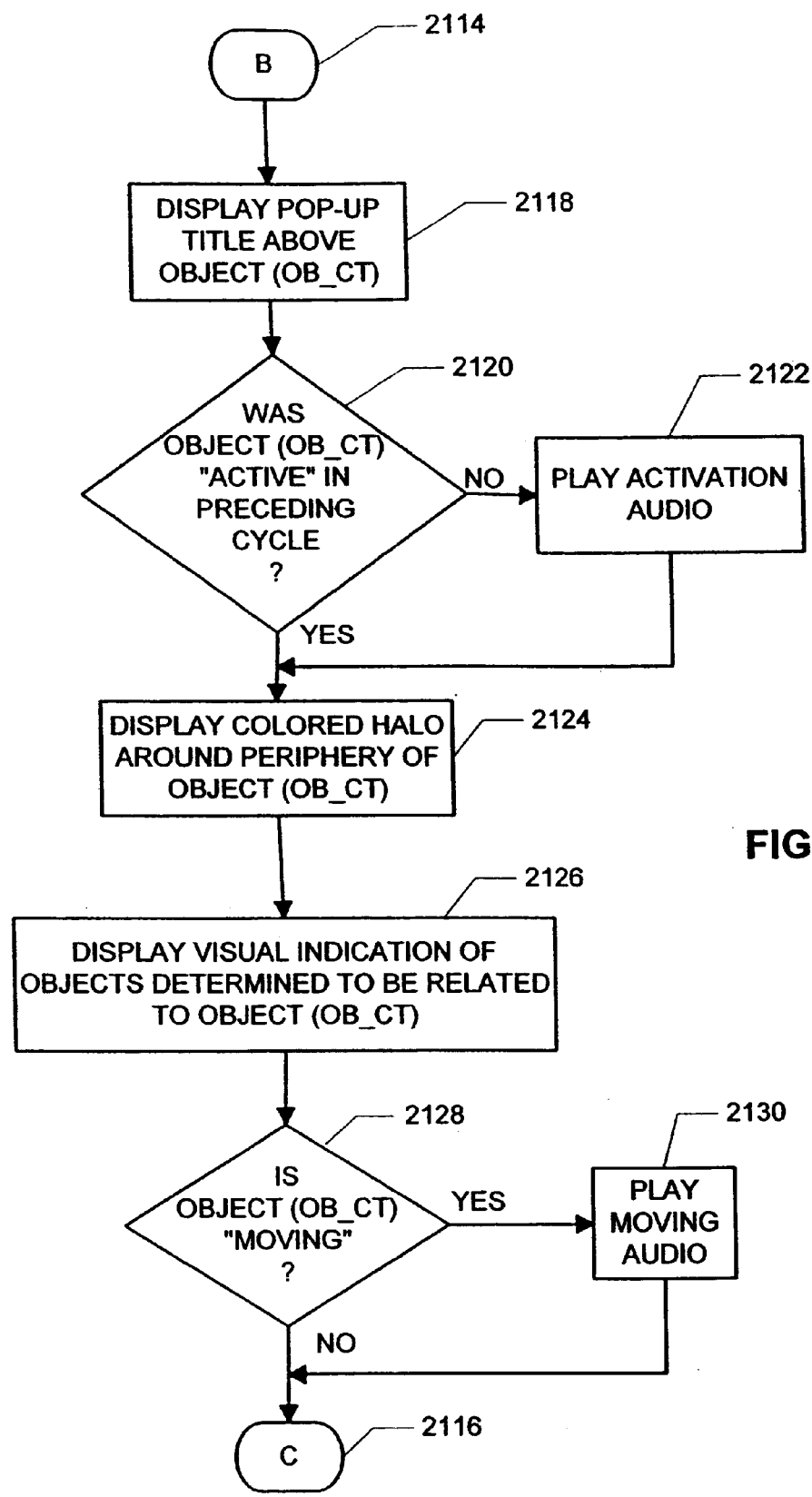
Figure 21C:
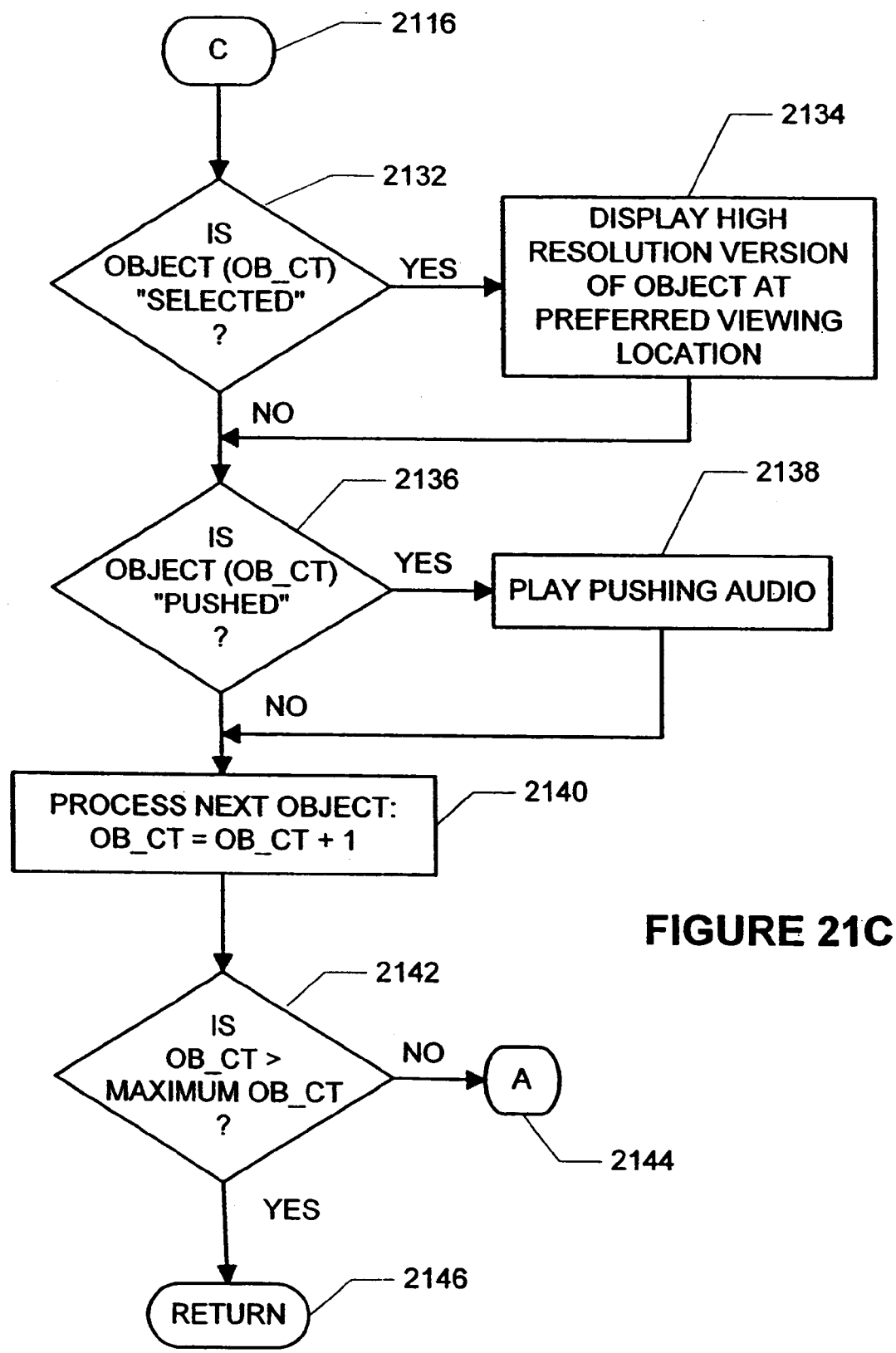

FIG. 21, which includes FIGS. 21A, 21B, and 21C, is a display and audio generation and rendering process which may be used by the process of FIG. 19.

FIG. 22 is a state diagram of states and state transitions which the user interface of the present invention may use.

FIGS. 23A and 23B are plan views which illustrate the simulation of head motion parallax.

FIG. 24 illustrates an exemplary data structure for storing animations which may be used by the present invention.

FIG. 25 illustrates the way in which perspective view may be simulated.

FIG. 26 illustrates a "bumper" shadow of an object.

§4. DETAILED DESCRIPTION

The present invention concerns novel methods, apparatus and data structures for providing a user interface. The following description is presented to enable one skilled in the art to make and use the invention and is provided in the context of particular applications and their requirements. Various modifications to the disclosed embodiment will be apparent to those skilled in the art, and the general principles set forth below may be applied to other embodiments and applications. Thus, the present invention is not intended to be limited to the embodiments shown.

Features of, and functions which may be performed by, the present invention, will first be described in §4.1 below. Then, structures, methodologies, data structures and displays of exemplary embodiments of the present invention will be described in §4.2 below.

§4.1 Functions Which May Be Performed By the Present Invention

Recall from §1.2.3 above, that there exists a need for a user interface, and in particular a graphical user interface, to information or content (also referred to as an "object"). A user should be able to view and organize all objects and to edit or otherwise work on a selected object. To achieve these goals, the present invention may represent, visually, objects (e.g., a document, a spread sheet, a business contact, a drawing, a picture or image, a web page, a resource location or directory, etc., or a representation thereof) or content with a low resolution image (e.g., a 64 pixel by 64 pixel bit map having 24 bit color) which can be added, moved, or deleted from a display rendered on a video monitor. The present invention may use pop up title bars (or other descriptive textual information) for permitting a user to discern more about the object represented by a low resolution image. The present invention may use higher resolution image (e.g., a 512 pixel by 512 pixel bit map having 24 bit color) representations of objects, or "live" objects loaded within an associated application, for editing or otherwise working on a selected object. Other visual representations of objects may be used. Any and all visual representations of objects may be referred to as "thumbnails" in the following.

Recall also from §1.2.3 above, that a user interface should exploit spatial memory. To achieve this goal, the present invention may visually simulate a plane located and oriented in three-dimensional space, or other three-dimensional landscape on which the object thumbnails may be manipulated. The simulated plane or landscape may include visual (or audio) landmarks for enhancing a user's spatial memory. As the object thumbnails are moved about the landscape, the present invention may employ perspective views (perceived image scaling with distance), partial image occlusion, shadows, and/or spatialized audio to reinforce the simulated three-dimensional plane or landscape. An ancillary advantage of using a simulated three-dimensional landscape is that more objects can be represented, at one time, on a single display screen.

Recall further from §1.2.3 above that a user interface should also be intuitive to minimize the time needed for a user to become familiar with it. For example, the user interface should not be cumbersome, nor should it require too many different types of inputs to manipulate the object thumbnails. To achieve this goal, the present invention may use inputs from a familiar input device such as a mouse or pointer to manipulate the object thumbnails. To minimize the number of different types of inputs required to manipulate the object thumbnails, the present invention may map two-dimensional inputs, such as moving a mouse on a mouse pad, to a three-dimensional movement on the simulated three-dimensional display. Alternatively, the two dimensional inputs may be translated to two-dimensional screen coordinates. The present invention may also prevent one object thumbnail (or landscape feature) from totally occluding another object thumbnail so that neither is (totally) hidden from the user or based on a property (e.g., age, storage location, etc.) of an object. It is believed that the user may become so immersed in a user interface which simulates three-dimensions, that the user may react, either intentionally or unconsciously, to the stimulus provided by the user interface. For example, a user may crane his or her head to one side of the screen or the other in an effort to "look around" (or over or under) an object thumbnail or a feature of the landscape. To further reinforce the simulated three-dimensional environment, the present invention may simulate head motion parallax. In this regard, the present invention may use a camera (or head or body mounted equipment) to detect the position of a user's head relative to a video monitor on which the user interface is rendered.

Recall finally from §1.2.3 above, that the user interface should provide intelligent help to the user. The present invention may cluster, by rendering a visual boundary for example, object thumbnails which are arranged, by the user, relatively close to one another. Further, the present invention may employ a matching (e.g., correlation or similarity) algorithm to determine whether certain objects are related. For example, an analytical similarity algorithm using feature vectors may be used. Alternatively, objects may be related by an explicit selection or designation by a user or based on a property (e.g., age, storage location, etc.) of an object. The present invention may employ some type of visual indication, such as a colored halo around thumbnails of, for example, related objects. This visual indication may be rendered continuously or, alternatively, upon an event, such as when an object thumbnail is made "active".

Having described functions which may be performed by the present invention, structures, methodologies, data structures and displays which may be used by the present invention are now described in §4.2.

§4.2 Structures, Methodologies, Data Structures, and Displays Which May Be Used By the Present Invention In the following, exemplary systems on which the present invention may operate are described in §4.2.1, exemplary displays which may be generated by the present invention are described in §4.2.2, exemplary processes and data structures which may be used to effect certain aspects of the present invention are described in §4.2.3, flow diagrams showing an operation of an exemplary methodology of the present invention are described in §4.2.4, and alternative displays which may be generated by the present invention are described in §4.2.5.

§4.2.1 Exemplary Systems

FIG. 1A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 1A, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows NT® 4.0, sold by Microsoft Corporation of Redmond, Wash.), one or more application programs 136, other program modules 137 (such as ReActor infrastructure and Microsoft Interactive Sound System, for example, both from Microsoft Corporation of Redmond, Wash.), and/or program data 138 for example. A user may enter commands and information into the personal computer 120 through input devices, such as a keyboard 140 and pointing device 142 for example. Other input devices (not shown) such as a microphone, joystick, game pad, satellite dish, scanner, or the like may also be included. A video camera, such as a charge coupled device (or "CCD") based camera 141 may also be provided and may be mounted atop the video monitor 147 for example. These and other input devices are often connected to the processing unit 121 through a serial port interface 146 coupled to the system bus. However, input devices may be connected by other interfaces, such as a parallel port, a game port or a universal serial bus (USB). For example, since the bandwidth of the output of the video camera 141 may be too great for a serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator (e.g., Intense 3D Pro 1000 or Intense 3D Pro 2200 from Intergraph Corporation of Huntsville, Ala.). One or more speakers 162 may be connected to the system bus 123 via a sound card 161 (e.g., a wave table synthesizer such as product number AWE64 Gold Card from Creative Labs of Milpitas, Calif.). In addition to the monitor 147 and speaker(s) 162, the personal computer 120 may include other peripheral output devices (not shown), such as a printer for example.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

Figure 1B:
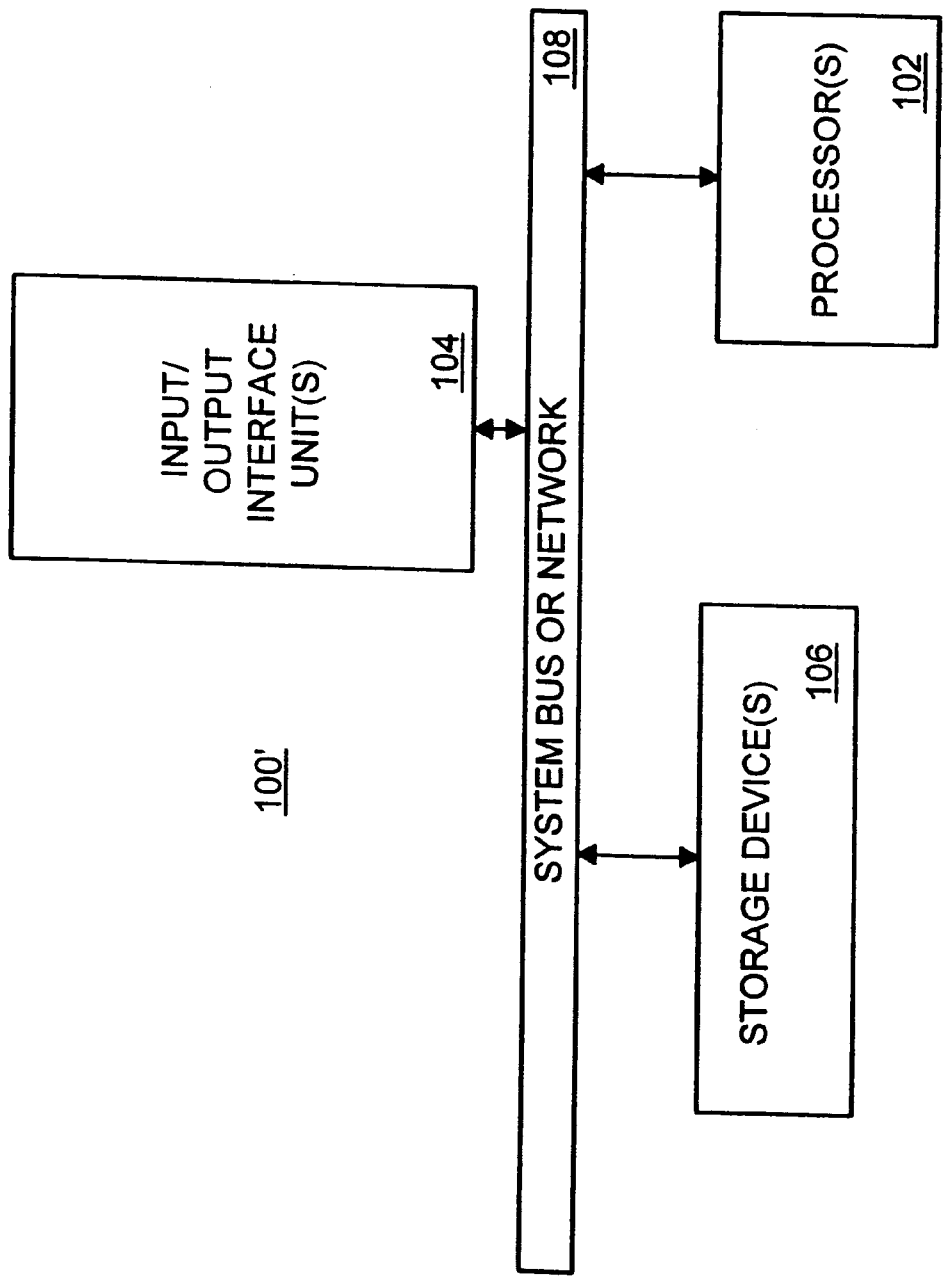
FIG. 1B is a machine on which the user interface of the present invention may be effected.

FIG. 1B is a more general machine 100' which may effect one or more of the processes discussed above. The machine 100' basically includes a processor(s) 102, an input/output interface unit(s) 104, a storage device(s) 106, and a system bus or network 108 for facilitating data and control communications among the coupled elements. The processor(s) 102 may execute machine-executable instructions to effect one or more aspects of the present invention. At least a portion of the machine executable instructions and data structures may be stored (temporarily or more permanently) on the storage devices 106 and/or may be received from an external source via an input interface unit 104.

§4.2.2 Exemplary Displays

Figure 8A:
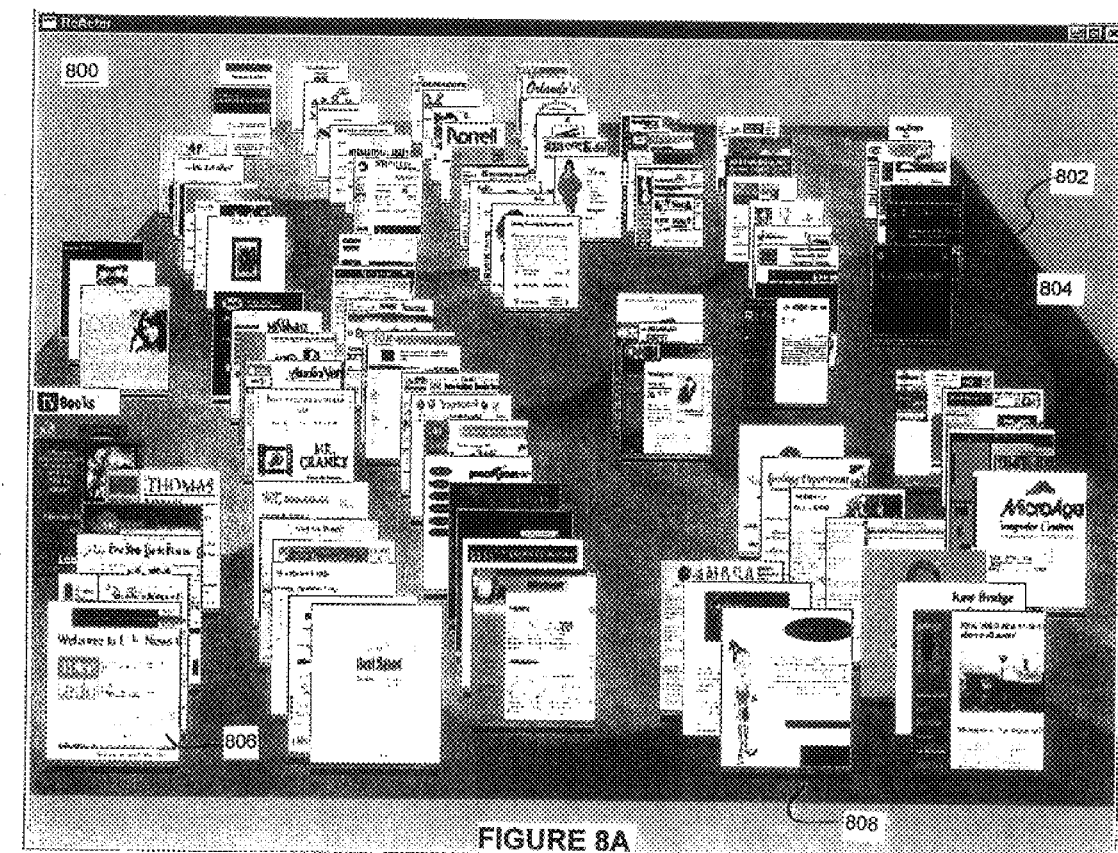
FIG. 8A is an exemplary display of web page thumbnails using the user interface of the present invention.
Figure 8B:
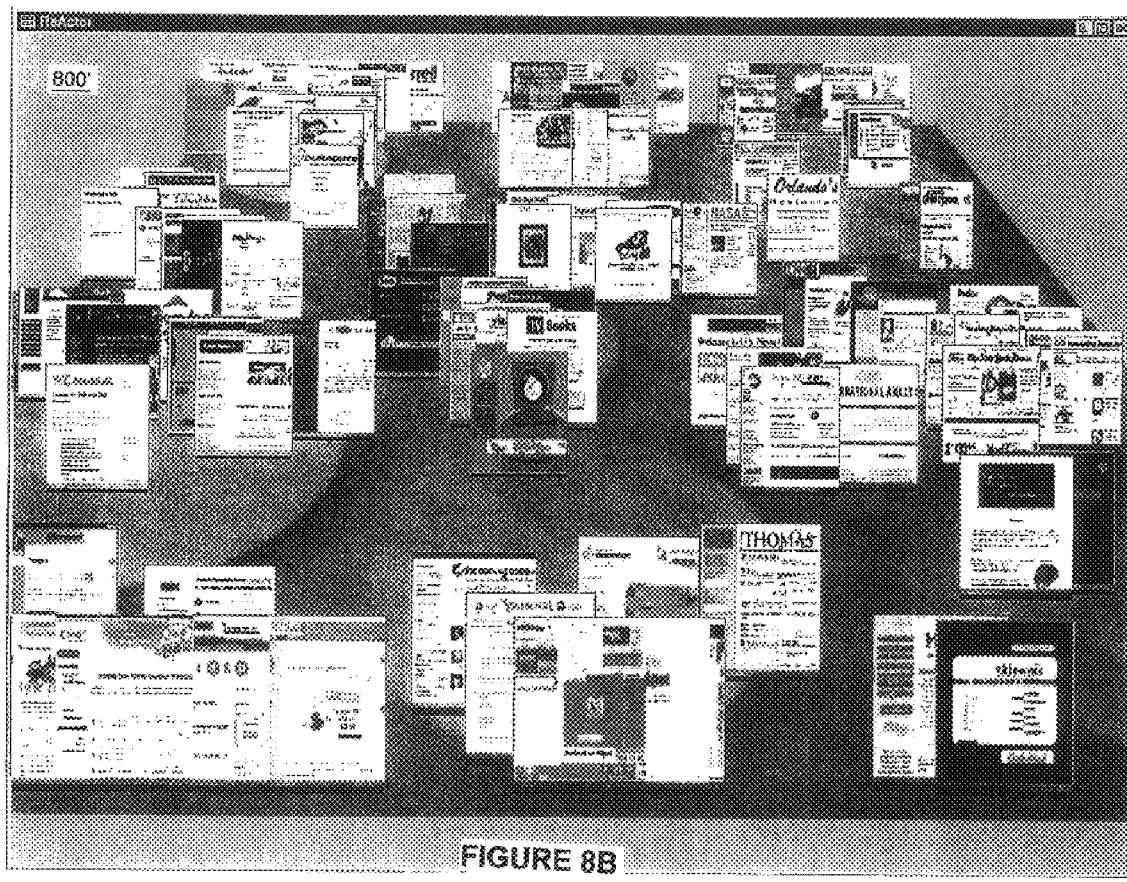
FIGS. 8B through 8D are displays which depict other possible user arrangements of web page thumbnails.
Figure 8C:
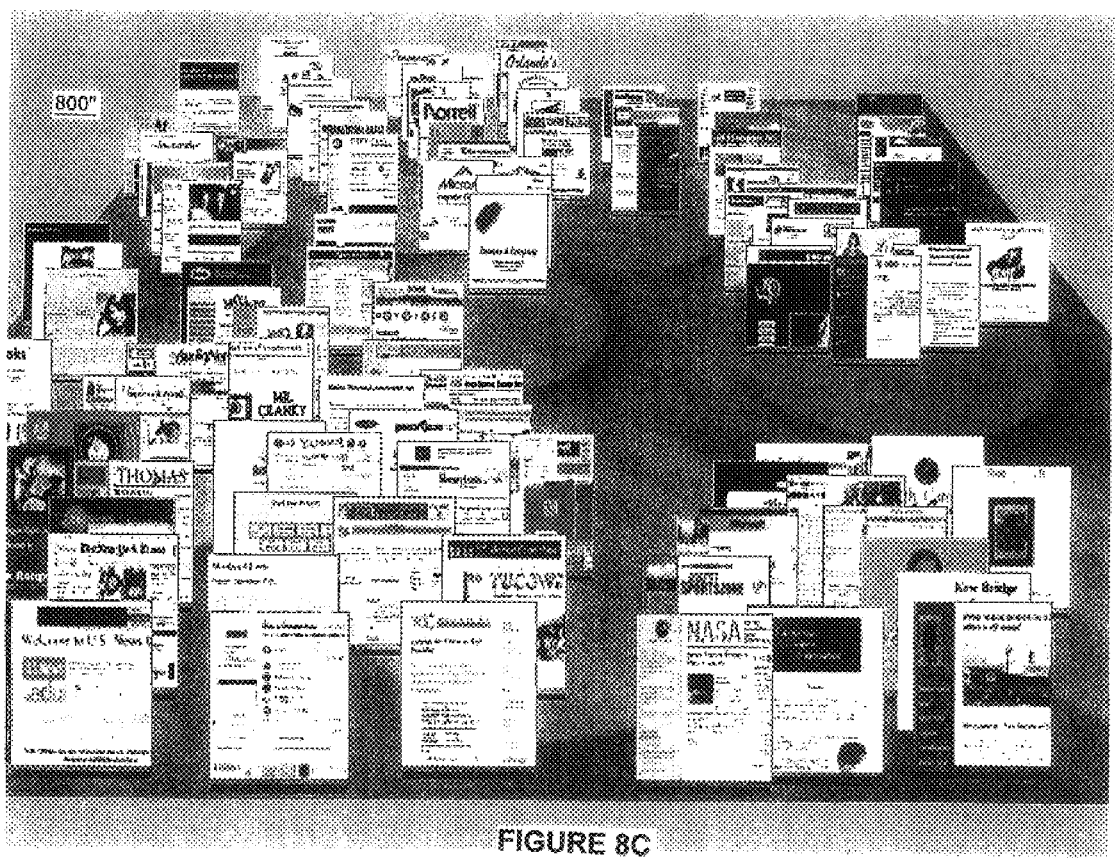
Figure 8D:
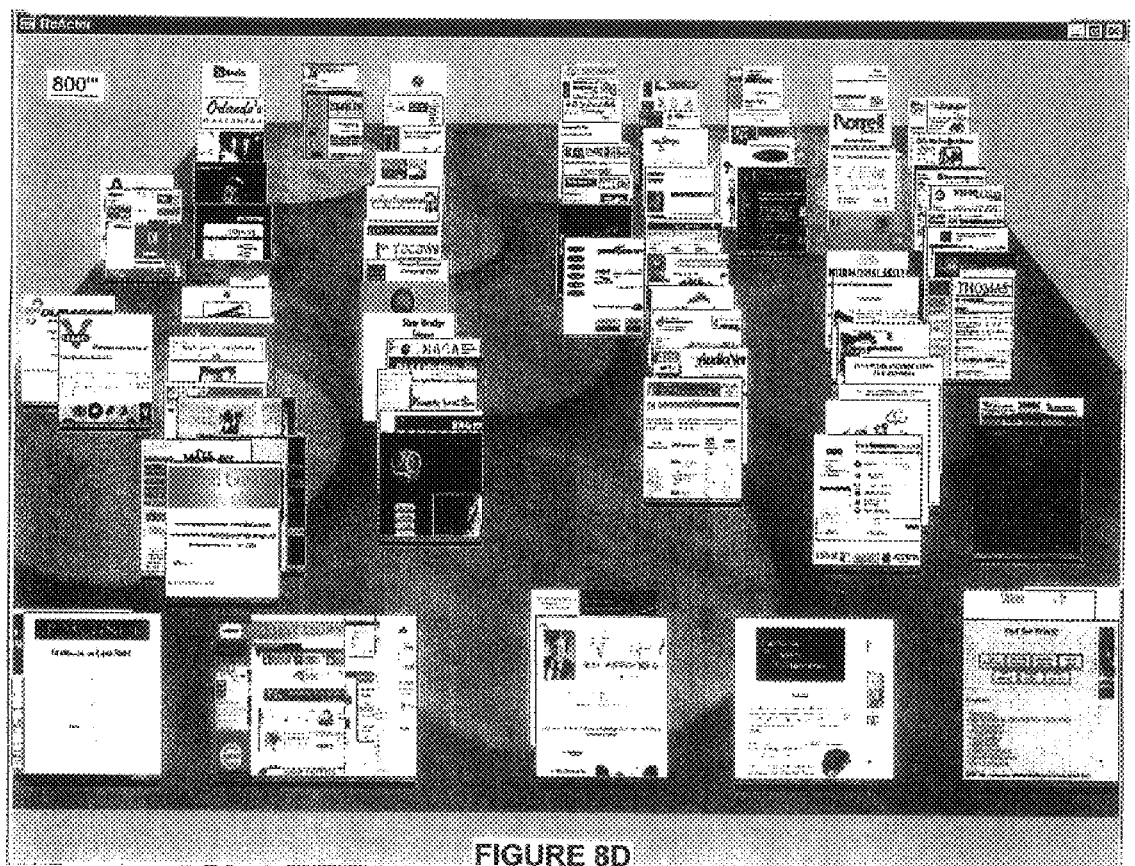

As discussed in §4.1 above, the present invention may (i) represent, visually, objects using object thumbnails and (ii) may simulate a three-dimensional plane, or other three-dimensional landscape on which the object thumbnails may be manipulated. FIG. 8A is a display 800 which illustrates an inclined (e.g., at 65 degrees) plane 802 (e.g., rendered using the Open GL 3D graphics applications programming interface from Silicon Graphics of Mountain View, Calif.) having low resolution images (e.g., 64 pixel by 64 pixel bitmaps having 24 bit color) or object thumbnails 806. In the display 800, the object thumbnails 806 represent web (or hypertext markup language or "HTML") pages. As discussed in §4.1 above, the plane 802 may include visual landmarks for enhancing a user's spatial memory. In the display 800, landmarks 804 (e.g., colored circles) are provided on the inclined plane 802. FIGS. 8B, 8C and 8D show displays 800', 800" and 800''', respectively, in which users have arranged the object thumbnails differently.

Alternative landscapes and landmarks to the inclined plane 802 are described in §4.5 below with reference to FIGS. 16–18.

As discussed in §4.1 above, the present invention may employ perspective views (perceived image scaling with distance), partial image occlusion and shadows to reinforce the simulated three-dimensional plane or landscape. These effects are all illustrated in the displays 800 through 800'''. Regarding perspective views, note that the object thumbnails in the foreground appear larger than those in the background (because they are closer in three-dimensional space). For example, referring to FIG. 25, notice that a projection 2520A from object 2510A to viewpoint 2530 onto plane 2522 is smaller than the projection 2520B from object 2510B to the viewpoint 2530 onto plane 2522. Partial object thumbnail occlusion reinforces the simulated foreground and background. Regarding shadows, the display 800 includes (scaled) rectangular shadows 808 below the object thumbnails 804. In the display 800, the fact that the shadows 808 are disconnected from the object thumbnails 806, suggests that the object thumbnails 806 float a bit above the inclined plane 802 and suggests parallel rays of light cast from above the simulated three-dimensional environment.

Figure 10A:
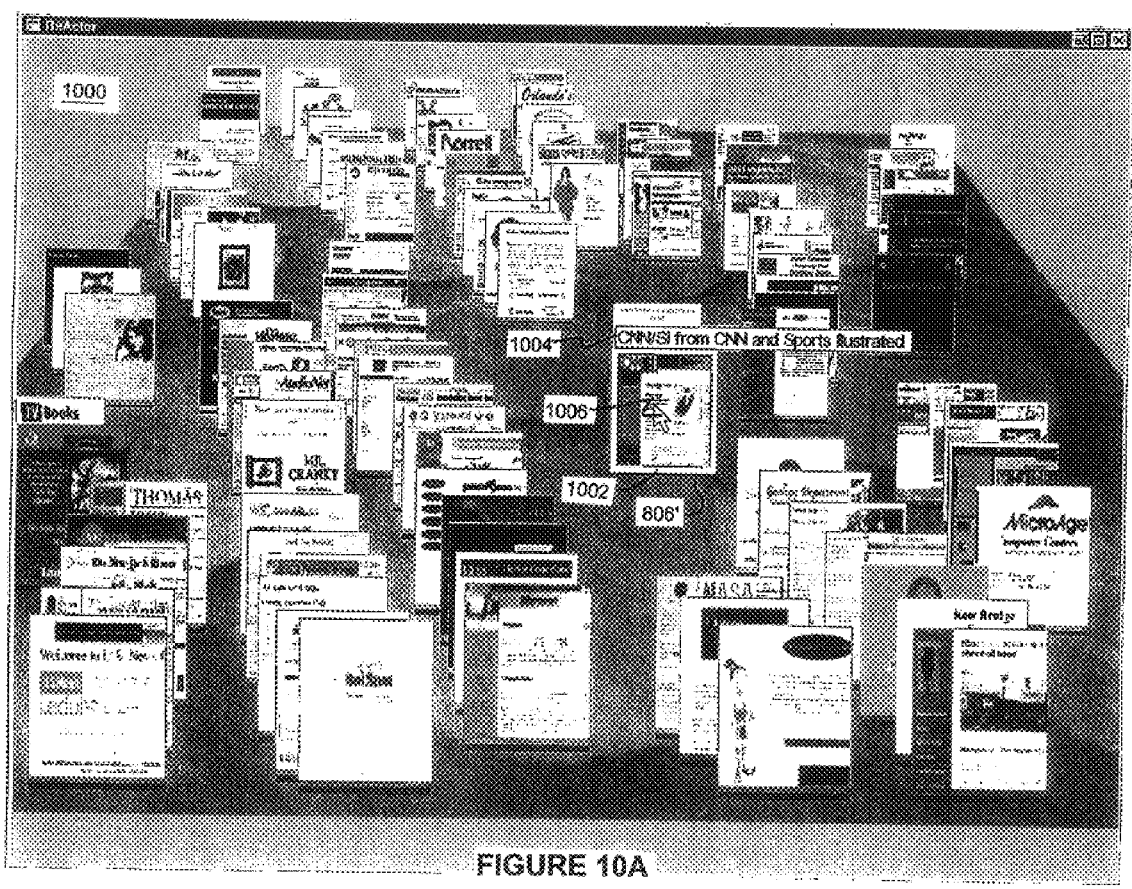
FIG. 10A is an exemplary display showing a pop-up title on a web page thumbnail using the user interface of the present invention.

As also discussed in §4.1 above, the present invention may use pop-up title (or other descriptive text) bars for permitting a user to discern more about the object represented by the object thumbnail 806. Referring to FIG. 10A, which depicts a screen 1000, when a cursor 1006, under control of a user, is on (or passes over, or hovers over) an object thumbnail 806', that object thumbnail may be considered "active". A colored halo 1002 may be provided around the active object thumbnail 806'. Further, a pop-up title bar 1004 may be provided over the active object thumbnail 806'. The pop-up title bar 1004 provides the user with more information about the underlying object, in this example, indicating that the underlying object is the "CNN/ Sports Illustrated" web page. FIG. 10B is an enlarged portion of the screen 1000 of FIG. 10A. By providing pop-up title bars 1004, a user can rifle through objects in a given area by quickly looking at their pop-up title bars. Although the pop-up title bar 1004 may be scaled, like the object thumbnails 806, such that it is larger in the foreground and smaller in the background, since the pop-up title bar 1004 is not always on and to facilitate easy reading by the user, the title bar may have a consistent size (height) and use consistently sized letters. This may be accomplished by simulating the pop-up title bars at a constant distance from a "viewing point" in the simulated three-dimensional environment. The labels in the pop-up title bar may use texture-mapped fonts or they may use vector fonts.

Figure 9:
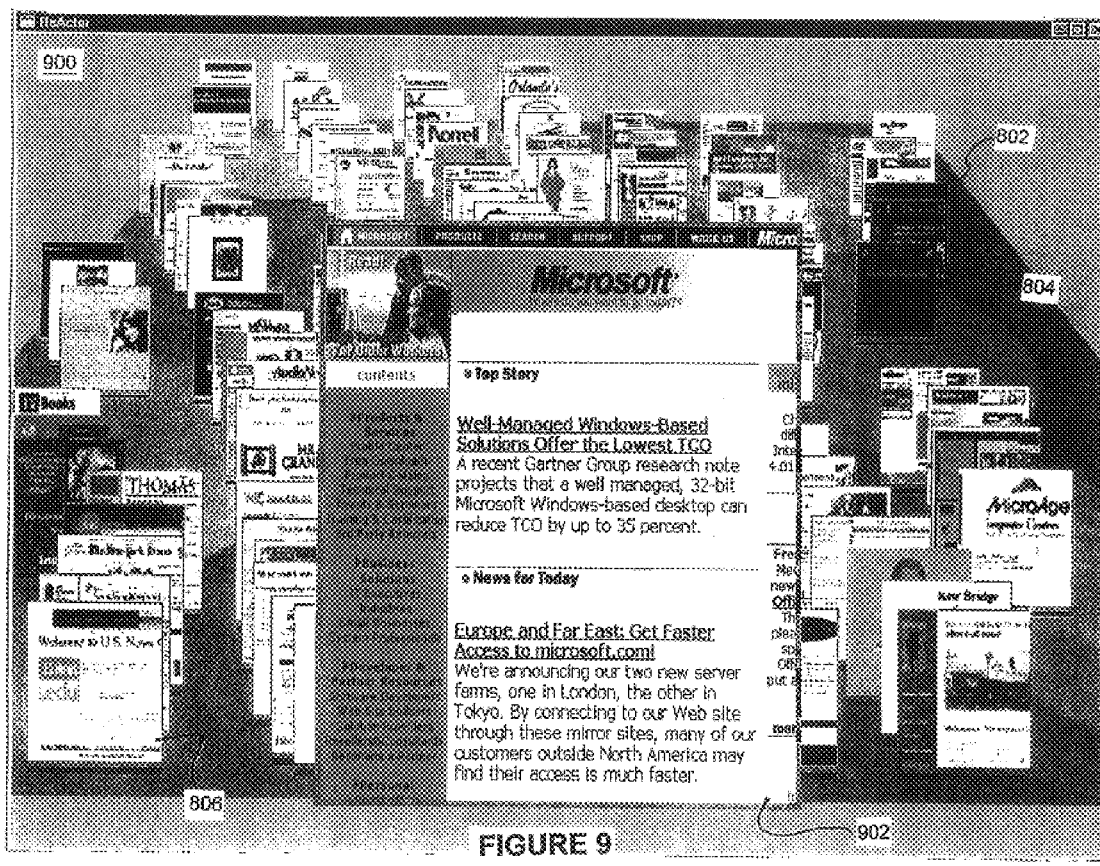
FIG. 9 is an exemplary display showing a selected web page using the user interface of the present invention.

Finally, recall from §4.1 above that the present invention may use higher resolution image representations of objects, or "live" objects within an associated application, for editing or otherwise working on a selected object. Referring to FIG. 9, a display 900 showing a "selected" object thumbnail 902 is shown. The selected object thumbnail 902 is displayed in a preferred viewing position, in this case, at the center foreground of the three-dimensional environment. In this case, the selected object thumbnail 902 is a high resolution bit map (e.g., 512 pixels by 512 pixels with 24 bit color). To reiterate, rather than merely providing a high resolution object thumbnail, the actual object, in its associated application, may be presented. In this example, the Internet Explorer™ Internet browser (part of Microsoft Windows NT® 4.0 operating system sold by Microsoft Corporation of Redmond, Wash.) may be rendering a web page, with the user interface of the present invention in the background. The application can be maximized, as is known to those skilled in the art, to substantially fill the screen of the video monitor. Further, the images may be rendered as an off-screen bitmap, which can be placed in the three-dimensional environment in the preferred viewing position when an object is selected. If the objects are HTML web pages, this may be done, for example, using techniques discussed in the article, M. Heydt, "Incorporating the Web Browser Control Into Your Program", *Microsoft Interactive Developer*, Vol. 3, No. 7, pp. 42–51 (July 1998).

In consideration of interface consistency to the user, when an object thumbnail is "selected", an animation, taking on the order of one second, may be used to move the object thumbnail from its position to a closer location and use the larger high resolution thumbnail or the application with the "live" object, so that the user perceives the object as moving towards them.

Alternative preferred viewing arrangements are discussed in §4.2.6 below with reference to FIGS. 13A through 13D.

§4.2.3 Exemplary Processes and Data Structures

Figure 2:
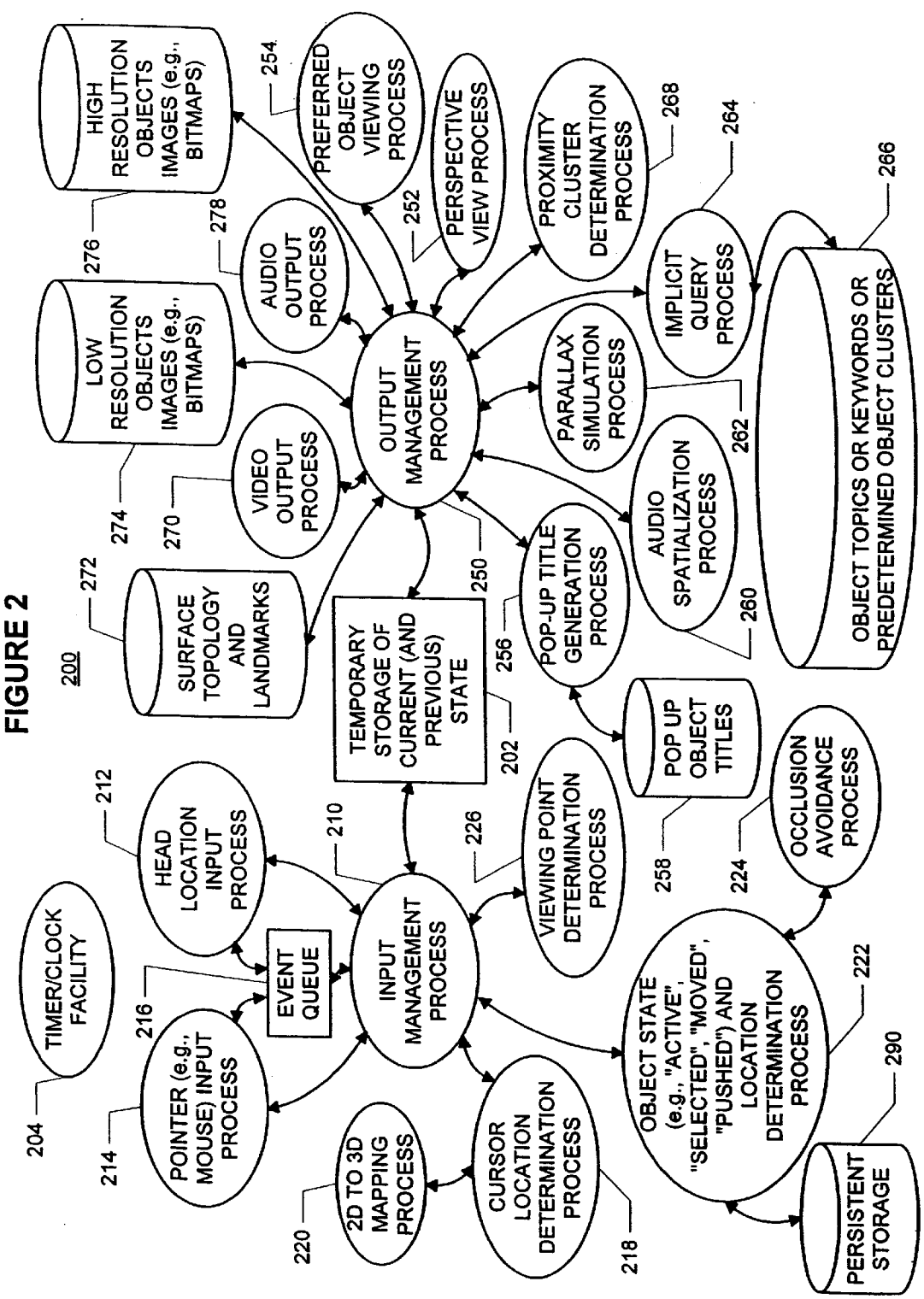
FIG. 2 is a diagram of processes and stored data which may be used to effect the user interface of the present invention.

FIG. 2 is a diagram of processes and stored data which may be used to effect, at least certain aspects of, the user interface of the present invention. Basically, the processing by the present invention may be thought of as a sequence of cycles. In each cycle, user inputs are accepted, states are updated, if necessary, based on such user inputs, and a display is rendered (and audio is output) based on the updated states. Referring to FIG. 2, user inputs are managed by an input management process (or more generally, an "input manager") 210. Information of a current state is stored at temporary storage means 202. To the extent that state changes or transitions need to be accounted for, the temporary storage means 202 may also store one (or more) preceding state. Alternatively, state change or state transition flags may be stored in the temporary storage means 202. Outputs are managed by the output management process (or more generally, an "output manager") 250.

Below, first the state information, which may be stored in the temporary storage device 202, is described. Then, processes related to the input management process 210 are described. Finally, processes related to the output management process 250 are described.

Figure 3:
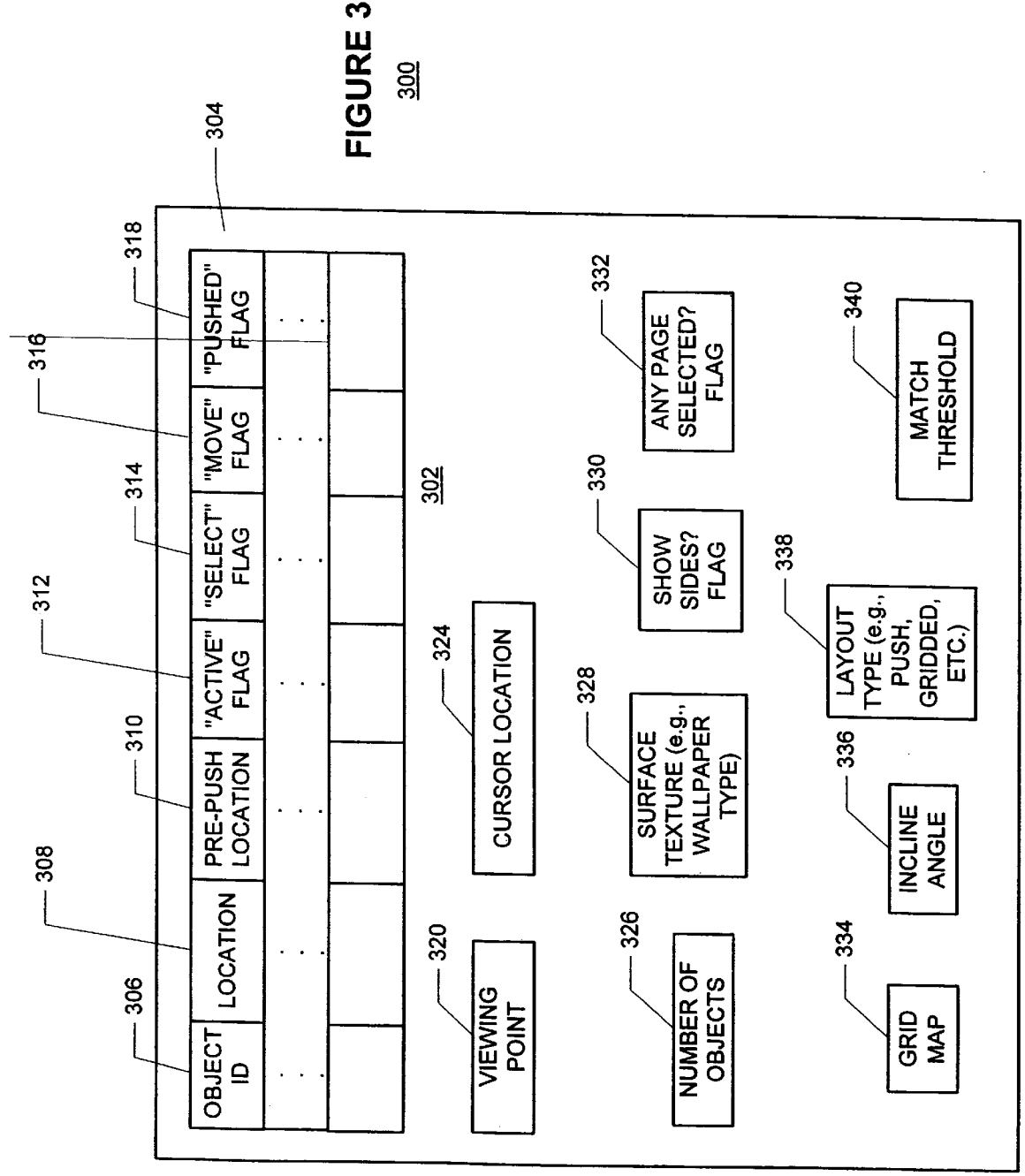
FIG. 3 is an exemplary data structure of state data which may be temporarily stored and used when effecting the user interface of the present invention.

FIG. 3 is an exemplary data structure 300 of state information which may be used by the user interface of the present invention. Object information 302 may include a record 304 corresponding to each object. As shown in FIG. 3, an object record 304 may include an object identifier field 306 which includes a value used to distinguish the object from all other objects. For example, if the object is an HTML page on the Internet, the object identifier may be a URL (or "Uniform Resource Locator"). Accordingly, each object should have a unique object identifier value in field 306. The object record 304 may also include a location field 308 which contains information about the location of the object (or object thumbnail). The location information in field 308 may include a two-dimensional screen location or a location in the simulated three-dimensional environment. In one embodiment, a grid (not displayed to the user) may be used to overlay the monitor screen or the landscape. In this case, each object will be anchored to a particular grid coordinate which will be stored in that object's location field 308. If an object thumbnail is "pushed", as will be discussed in detail below to avoid full object occlusion, in one embodiment, its pre-push location also may be stored in field 310 for reasons which will become apparent below. Each object record 304 may also include a field 312 containing a flag indicating whether or not the object is "active" (as described below), a field 314 containing a flag indicating whether or not the object is "selected" (as described below), a field 316 containing a flag indicating whether or not the object is "moving" (as described below), and a field 318 containing a flag indicating whether or not the object is being "pushed" (as described below). If any of the objects are selected, the "any page selected?" flag is set in field 332.

In addition to the object information 302, the state information 300 also includes a cursor location field 324 for storing a two-dimensional or virtual three-dimensional location of a cursor. Finally, the state information 300 may also include a viewing point field 320 for storing viewing point information. The viewing point information in field 320 is used if head motion parallax is to be simulated. The number of objects may be stored in field 326. As will be described with reference to FIGS. 15A and 15B, if head motion parallax is simulated, the side of a plane may be displayed. Otherwise, the side of the plane is not displayed. Whether or not to display the side of the plane is stored in the "show sides?" flag field 330.

Other parameters are used when rendering the display. These parameters are either fixed or may have default values which may be changed by the user. For example, a texture of the plane (e.g., a "wallpaper" type) may be fixed, or may be selected or changed by the user and stored in field 328. The incline angle of the plane may be fixed, or may be selected or changed by the user and stored in field 336. The type of layout (such as gridded or continuous with push, as will be described later) may be fixed, or may be changed or selected by the user and stored in field 338. If the layout is a gridded layout, a grid map, which defines the resolution of the grid, may be fixed, or may be changed or selected by the user and stored in field 336. Finally, if the invention is to include an implicit query function, (as will be described later), a "match threshold" value may be fixed, or may be selected or changed by a user and stored in field 340.

Having described the state information, processes related to the input management process 210 are now described.

Referring back to FIG. 2, a user may interact with the user interface of the present invention using a pointing device, such as a mouse for example. The pointer input management process (or more generally, a "2D input facility") 214 provides user inputs, from the pointing device, to the input management process 210, either directly or through an event queue 216. The input management process 210 passes this information to a cursor location determination process (or more generally, a "cursor position locator") 218. The cursor location determination process 218 may use a two dimension to virtual three dimension mapping process (or more generally, a "2D to 3D mapping facility") 220 to determine a location of the cursor in virtual three-dimensional space.

Using the virtual three-dimensional location of the cursor, as well as the locations of the objects stored in fields 308 of records 304 of the object information 302, the object state and location determination process (or more generally, an "object state update facility") 222 determines, for each object, whether the object is "active", "selected", "moving", or being "pushed". If an object is "moving" or being "pushed", its location is updated. Further, if any object is "moving", an (total) occlusion avoidance process 224 is executed. Each of the object states is now described with reference to FIG. 22.

FIG. 22 is a state diagram of states and state transitions which the user interface of the present invention may use. Starting from an initial or default state 2200, if an object is activated, the object becomes "active" at state 2210. An object may become activated, for example, when a cursor is on, or passes over, or hovers over (note timer/clock facility 204) an object thumbnail. The object may be "deactivated" when the cursor is taken off the object for example, in which case, the default state 2200 is reentered. Alternatively, if an active object is selected, for example by a mouse click, the object becomes "selected" at state 2220. In one embodiment, more than one object may be "selected" at a given time as will be discussed with reference to FIGS. 14A and 14B. If the object is deselected, for example by another mouse click, the state 2210 in which the object is "active" is reentered.

Referring to the "active" object state 2210, if the object is pulled or pushed, for example via a traditional left mouse button dragging operation, the "moving" state 2230 is entered. From the "moving" state 2230, if the pulled or pushed object is released, for example by releasing the left mouse button during a drag operation, the "active" state 2210 is reentered. When the object is in the "moving" state 2230, its location will be updated. Object occlusion may be avoided as follows.

Assuming that the layout type (Recall field 338) is "continuous with push", if the location or position of the moving object is within a predetermined distance of another object, the other object enters the "pushed" state 2240 and its location is updated so that (total) occlusion between the "moving" object and the "pushed" object is avoided. As shown in FIG. 26, the predetermined distance may be visually represented as a "bumper" shadow 2620 of the object 2610 being moved. Note that a "pushed" object may cause other objects to be pushed. In one embodiment, if the moving object is no longer within the predetermined distance of a pre-push location of the other object, the other object is no longer "pushed" and takes on its pre-push location as shown by the dashed transition lines and state 2245. An animation may be used to move a pushed object from a current location to it pre-push location. The animation may take on the order of one (1) second. In another embodiment, the distance between the current location of the "pushed" object and the moving object is used to determine whether a "pushed" object continues to be "pushed". If, while a "moving" object is pushing a "pushed" object, the "moving" object is no longer pushed or pulled, for example, by releasing the left mouse button during a drag operation, the default state 2200 is reentered and objects previously "moved" and "pushed" are no longer in those respective states, and they are rendered at their last determined locations. If the object "moving" takes on a location beyond the predetermined distance of the other object being "pushed", that other object will no longer be "pushed". The foregoing assumed that the layout type was "continuous with push". Assuming, on the other hand, that the layout type is "gridded", an object may be continuously moved about the landscape. However, when the object is released, its position assumes the nearest open (i.e., not taken by another object) grid position. To reiterate, the grid may overlay the screen or the landscape and the resolution of the grid is stored in the grid map field 334.

Referring back to FIG. 2, a camera may be used to detect the location (e.g., relative to a video monitor) of a user's head. The head location input management process (or more generally, a "head locator") 212 processes the camera inputs to determine whether the user's head is located to one side, or the other, or above or below the center of the video monitor. The position of the user's head may be determined using known techniques such as detecting a "blob" of color as a face or a "draping" technique in which an image from the camera before the user was seated before the monitor is subtracted from a current image. The head location input management process 212 then provides head location information to the input management process 210, either directly or through the event queue 216. The input management process then provides this information to a viewing point update determination process (or more generally, a "view point locator") 226 which determines a point in the virtual three-dimensional space from which a user is viewing the virtual three-dimensional environment. The information is provided to the input management process 210 which updates the information in the viewing point field 320.

Having described the stored state information 300, as well as the processes related to the input management process 210, the processes related to the output management process 250 are now described.

Figure 15A:
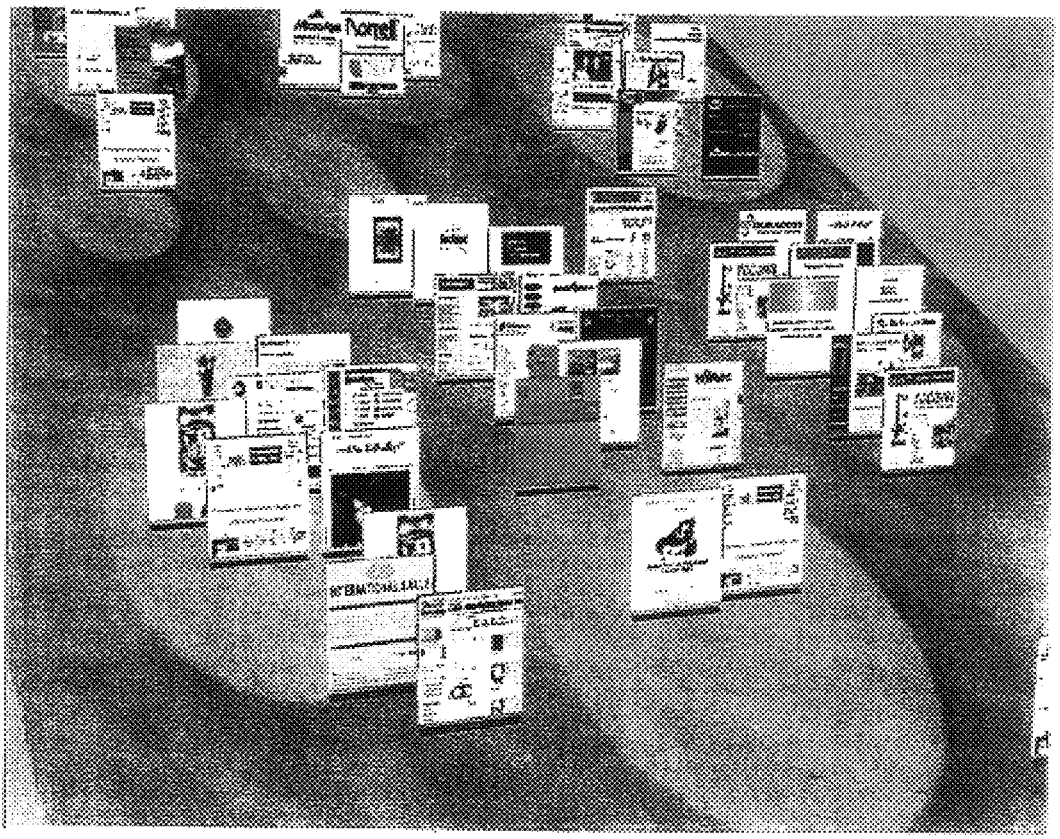
FIGS. 15A and 15B are displays which illustrate the simulation of head motion parallax in the user interface of the present invention.
Figure 15B:
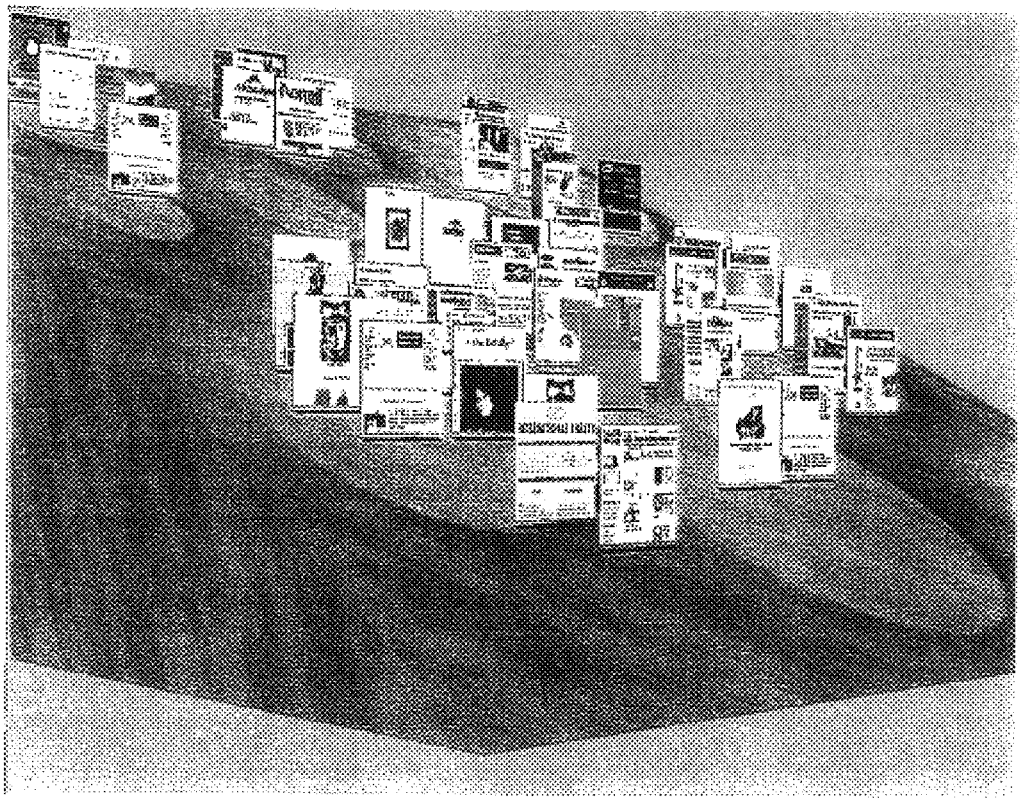

First, the output management process 250 provides the three-dimensional surface topology and landmark information to the video output process (or more generally, a "video output facility") 270 for rendering on a video monitor. If head motion parallax is to be simulated, the output management process 250 invokes the parallax simulation (or more generally, a "parallax simulator") process 262, which uses the data in the viewing point field 320 stored in temporary storage means 202 to modify the rendering of the surface topology and landmarks to a view from the viewing point. For example, FIG. 15A depicts a screen 1500 of web page object thumbnails on an inclined plane where the user's head is determined to be slightly to the left of the center of the video monitor. FIG. 15B depicts a screen 1500' of the same web page object thumbnails on the same inclined plane where the user's head is determined to be far to the left of the center of the video monitor. Note that a side of the plane is displayed. FIGS. 23A and 23B illustrate the simulation of head movement parallax. In the plan view of FIG. 23A, objects 2304 and 2306 in three-dimensional space are rendered at a display plane 2302 based on viewing point 2310. As shown, the image of object 2356 occludes the middle portion of object 2354. In FIG. 23B, the viewing point 2310' has shifted to the left. As shown, the image of object 2356' now occludes the right portion of object 2354'. Having described the rendering of the landscape and landmarks, the rendering of the objects by the output management process 250 is now described.

For each object, the output management process 250 provides the perspective view process (or more generally, a "perspective view facility") 252 with the object's location from fields 308 of the object records 304 of the object information 302 stored at temporary storage means 202. The perspective view process 252 causes the object thumbnail to appear larger if located in the foreground of the simulated three-dimensional environment and appear smaller if located in the background of the simulated three-dimensional environment. Recall from FIG. 25 that objects 2510A and 2510B in the simulated three-dimensional environment are rendered on display plane 2522 using projections to the view point 2530. The perspective view process may be implemented using the OpenGL perspective view transform, or it may be simulated by changing the scale of the individual objects. The shadows 808 may also be determined. Note that the shape of the shadow may change, for example to an oval (recall "bumper" shadow 2620), when it is "moving".

Figure 4:
FIG. 4 is an exemplary data structure of a record of low resolution image data of an object which may be used when effecting the user interface of the present invention.
Figure 5:
FIG. 5 is an exemplary data structure of a record of high resolution image data of an object which may be used when effecting the user interface of the present invention.

The output management process provides the video output process 270 with the location information, and the low resolution images in fields 404 (see FIG. 4) of the object records 400 at storage means 274 (see FIG. 2) to render the object thumbnails in the simulated three-dimensional space. If head location parallax is to be simulated, the parallax simulation process 262 processes the location information, the object thumbnails, and the viewing point in field 302 of temporary storage means 202 to simulate parallax in the simulated three-dimensional environment being rendered by video output process 270. Note that objects may become totally occluded at certain (off-center) viewing points. In an alternative embodiment, the viewing point may be considered to avoid total object occlusion.

Figure 6:
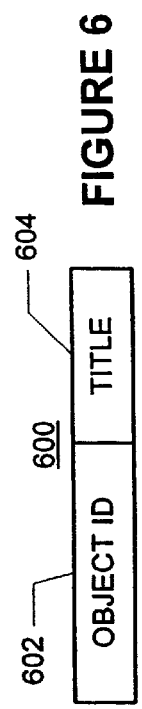
FIG. 6 is an exemplary data structure of a record of title (or other) data which may be used when effecting the user interface of the present invention.

If an object is "active", the output management process invokes the pop-up title bar generation process (or more generally, a "pop-up bar facility") 256 which accesses title (or other descriptive) information stored in fields 606 of records 600 (see FIG. 6) stored in storage means 258. This title (or other descriptive) information is provided, via the output management process 250 (see FIG. 2), to the video output process 270 so that a pop-up title bar, like that 1004 depicted in FIG. 10A, may be rendered. Recall from FIG. 10 that a colored halo 1002 may also be rendered around an active object.

Figure 7:
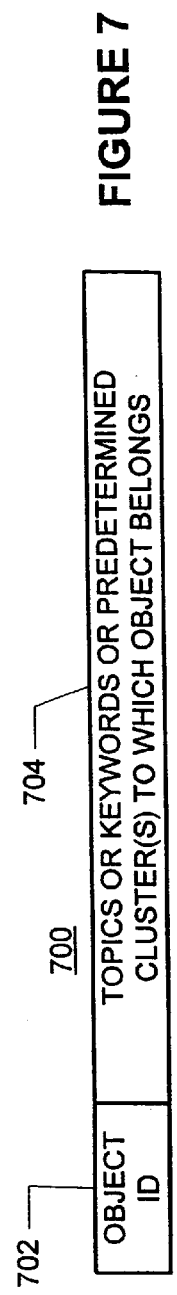
FIG. 7 is an exemplary data structure of a record of implicit query information which may be used when effecting the user interface of the present invention.

If the user interface of the present invention is to help a user to find objects related to an "active" object, the output management process invokes the implicit query process (or more generally, an "object matcher") 264, which may use matching (e.g., correlation or similarity) algorithms or heuristics, based on stored topic, or keywords, or contents of the object, or which may use predetermined object clusters, (See, e.g., field 704 of record 700 shown in FIG. 7)) to determine objects related to the "active" objects. A co-occurrence method and a content-based method, each of which may be used by the implicit query process, are briefly introduced here. The first algorithm is derived from a page-to-page co-occurrence matrix based on a number (e.g., seven) of previous users' categorizations. Thus a pair of objects may match anywhere between 0 and n(e.g., 7) times, where n is the number of previous users' categorizations. This method essentially tells the user, "Other people thought these pages were related." For the content-based similarity computations, the known feature vector space model from information retrieval may be used. Objects may be preprocessed to remove the html markup. Words on a standard stop list of common words along with web-specific words may be omitted, and white space or punctuation may be used to delimit words. Phrases may also be used. Each object may be represented as a vector of words (and/or phrases) with entries representing the frequency of occurrence of a word (or a phrase) in that object. The similarity between objects may be measured by taking the cosine between the two object vectors—that is, the dot product of the vectors divided by the lengths of the objects. Objects will be considered to be "related" if the degree to which they match exceeds a match threshold stored in field 340. The display may render a control object, such as a slider for example, for permitting the user to vary the match threshold and see the objects found to be "related" to an active object. Such related objects may be visually highlighted to the user, by providing a colored halo around such objects which matches the colored halo 1002 around the "active" object for example. Alternatively, the halo of related objects may use a different color, or a different shade of the same color, to distinguish them from the "active" object.

The degree to which objects match, as determined by the implicit query process 264, may also be depicted. Referring first to the display 1100A of FIG. 11A, the degree to which other objects match an "active" object (assuming, in this embodiment, that the degree of match exceeds the predetermined match threshold) may be depicted by rendering horizontal bar meters 1102 above (or below) the object thumbnails. FIG. 11B depicts a display 1100B in which segmented horizontal bar meters 1102' are used. FIG. 11C depicts a display 1100C in which horizontal slope bar meters 1102" are used. FIGS. 11D and 11E depict displays 1100D and 1100E, respectively, in which alternative horizontal bar meters 1102''' and 1102'''', respectively, are used to depict the degree to which other objects match an "active" object (assuming, in this embodiment, that the predetermined match threshold is exceeded). FIG. 11F is a display 1100F in which pie meters 1104 are used to depict the degree to which other objects match an "active" object (assuming, in this embodiment, that the predetermined match threshold is exceeded). FIG. 11G is a display 1100G in which dial meters 1106 are used to depict the degree to which other objects match an "active" object (assuming, in this embodiment, that the predetermined match threshold is exceeded). FIG. 11H is a display 1100H in which numbered (e.g., 1 through 10) tabs 1108 are used to indicate the degree to which other objects match an "active" object (assuming, in this embodiment, that the predetermined match threshold is exceeded). Note that in this case, the number "1" may correspond to the match threshold while the number "10" may correspond to a complete match. Alternatively, the number depicted may be directly based on the degree of match. FIGS. 11I and 11J are displays 1100I and 1100J, respectively, in which horizontal bar meters 1110 and 1110', respectively, are used to depict the degree to which other objects match an "active" object (assuming, in this embodiment, that the predetermined match threshold is exceeded). Bar coloring is used to indicate objects that were, at one time, located in close proximity to one another. This is discussed further later with reference to FIGS. 12D–12F. FIG. 11K is a display 1100K in which dial meters 1114 are used to depict the degree to which other objects match an "active" object (assuming, in this embodiment, that the predetermined match threshold is exceeded). Coloring of the dials 1114 and colored squares 1116 are used to indicate objects that were, at one time, located in close proximity to one another. FIGS. 11L and 11M are displays 1100L and 1100M, respectively, in which the heights (or angle or area) of "roofs" 1118 and 1118', respectively, above object thumbnails are used to depict the degree to which other objects match an "active" object (assuming, in this embodiment, that the predetermined match threshold is exceeded). Referring further to FIGS. 11L and 11M, coloring of the balls 1120 and the roofs themselves, respectively, is used to indicate objects there were, at one time, located in close proximity to one another. FIG. 11N is a display 1100N in which vertical bar meters 1118' are used to depict the degree to which other objects match an "active" object (assuming, in this embodiment, that the predetermined match threshold is exceeded). Colored tabs 1120' at the upper left corner (or any other corner) of the objects are used to indicate objects that were, at one time, located in close proximity to one another.

In some alternatives, the degree to which other objects match an "active" object is not depicted—only whether or not an object matches an "active" object to a degree which exceeds the predetermined match threshold is depicted. In general, objects that do not match the "active" object to the predetermined match threshold are "deformed" in some way. For example, in the display 1100O of FIG. 11O, objects which do not match an "active" object to the predetermined match threshold are darkened 1124. In the display 1100P of FIG. 11P, objects which do not match an "active" object to the predetermined match threshold are blurred 1126. In the display 1100Q of FIG. 11Q, objects which do not match an "active" object to the predetermined match threshold are made translucent 1124'. In the display 1100R of FIG. 11R, objects which do not match an "active" object to the predetermined match threshold are colored by a gradient function 1128 which darkens from the top of the object to the bottom of the object. Similarly, in the display 1100S of FIG. 11S, objects which do not match an "active" object to the predetermined match threshold are colored by a gradient function 1128' which darkens from the left of the object to the right of the object. In the display 1100T of FIG. 11T, objects which do not match an "active" object to the predetermined match threshold are skewed 1130. In the display 1100U of FIG. 11U, objects 1132 which do not match an "active" object to the predetermined match threshold have a portion (e.g., a "bite") removed. Finally, in the display 1100V of FIG. 11V, objects 1134 which do not match an "active" object to the predetermined match threshold have a corner folded. Conversely, in one embodiment, objects which match an "active" object to the predetermined matter threshold may be provided with colored halos.

Objects may also be related based on an explicit selection or designation by a user, or based on a property (e.g., age storage location, etc.) of an object. If object properties are used to relate objects, the objects may be sorted or filtered based on such properties. Visual indicators, such as those described above, may be used to indicate the results of such sorting or filtering.

Referring, once again, to FIG. 2, to provide further help to the user, it may be assumed that users will position related objects in close proximity. The output management process 250 may invoke the proximity cluster determination process (or more generally, a "proximity clustering facility") 268 to cluster object thumbnails based on proximity. When clustering object thumbnails based on proximity, the present invention may consider, inter alia, object thumbnail position, relative proximity to other object thumbnails, and/or relative separation (or "white space") from other object thumbnails. The clustering may be transitive. That is, if objects A and B are proximally clustered and objects B and C are proximally clustered, then objects A and C are proximally clustered. Note that the proximity clustering determination process 268 differs from matching (e.g., correlation) which may be done by the implicit query process 264. More specifically, the implicit query process 264 is concerned with predetermined clusters or groupings based on the subject matter, keywords, or content of the objects. On the other hand, the proximity cluster determination process 268 is only concerned with where a user has placed an object. Consequently, even seemingly unrelated objects may be clustered. Thus, the user interface of the present invention is based, in part, on the recognition that a user may have non-intuitive or non-objective reasons for grouping objects. That is, the user is not confined to a "right way" to organize objects. (Recall, e.g., FIGS. 8A through 8D.)

Figure 12A:
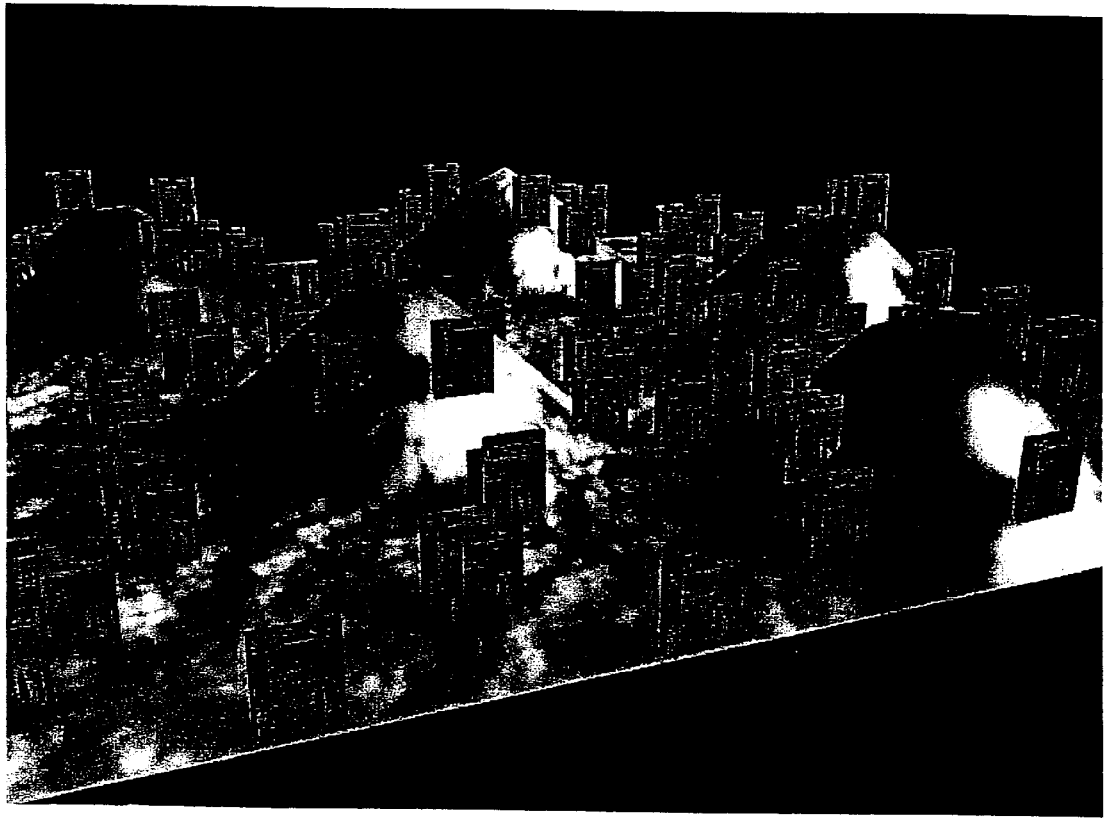
Figure 12B:
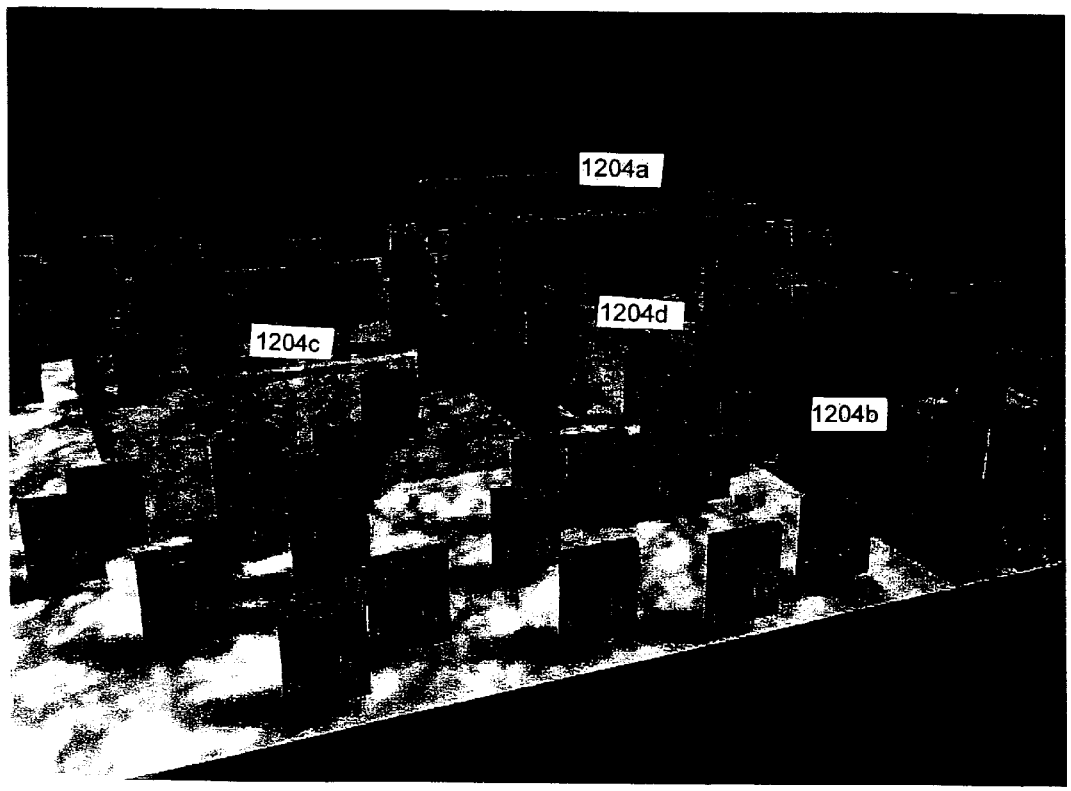
Figure 12C:
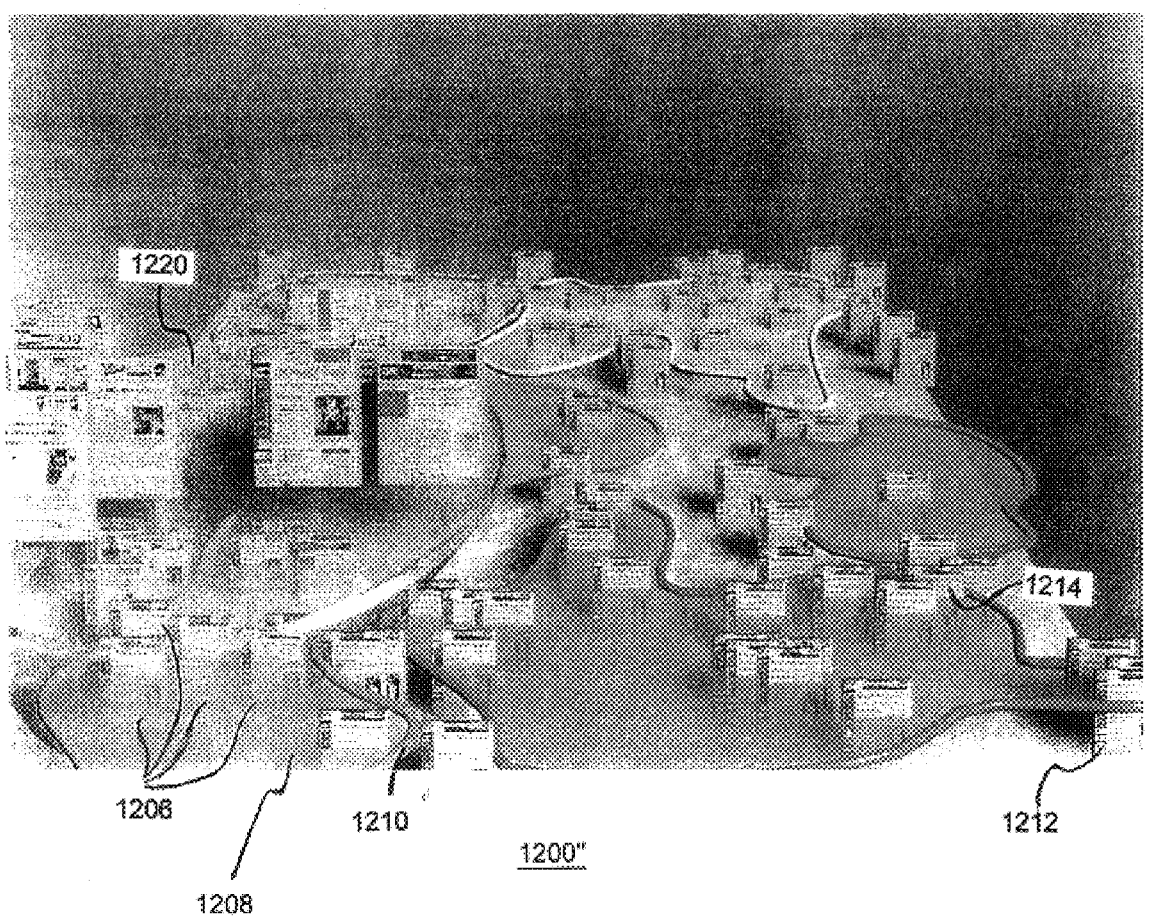
Figure 13A:
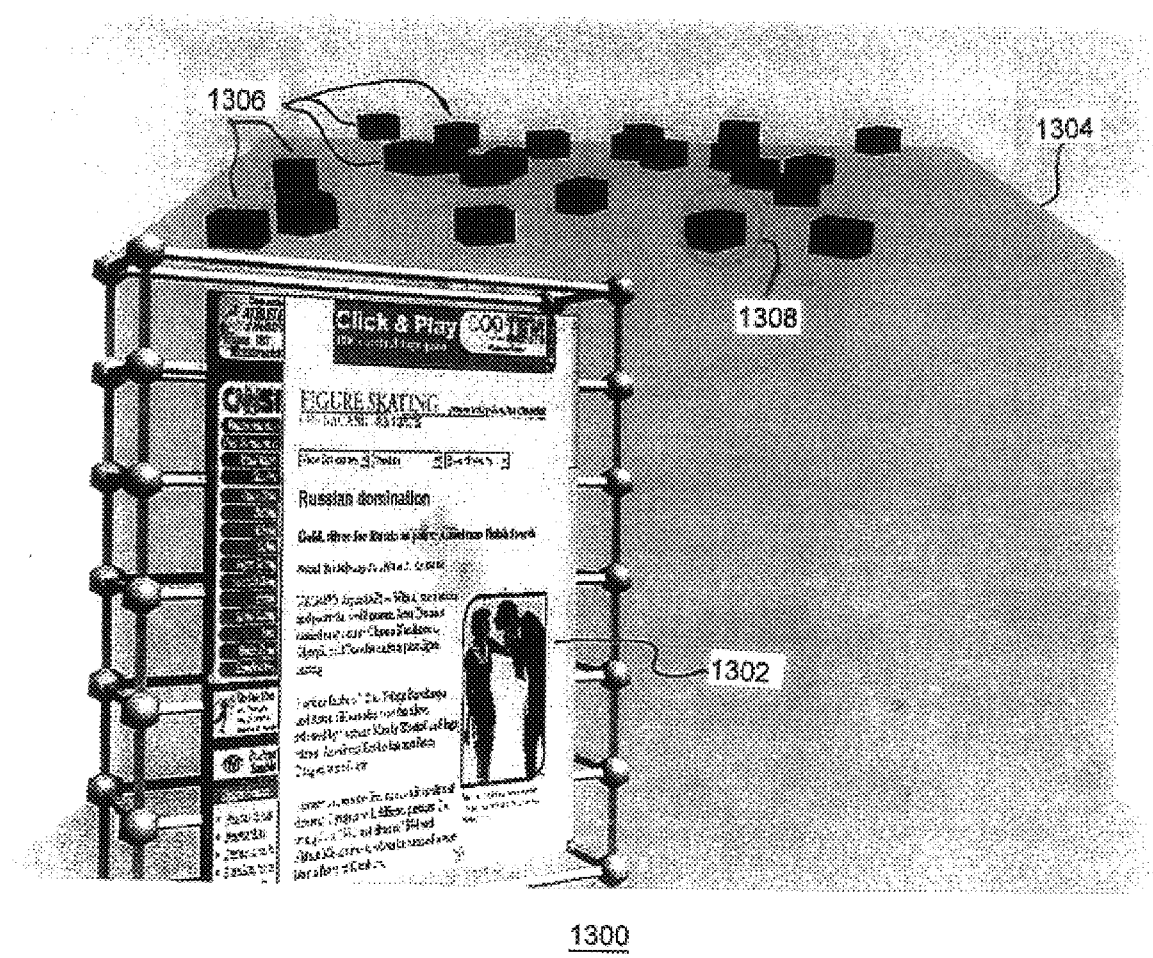
FIGS. 13A through 13D are various displays which depict various ways of rendering a selected object at a preferred viewing location.
Figure 13B:
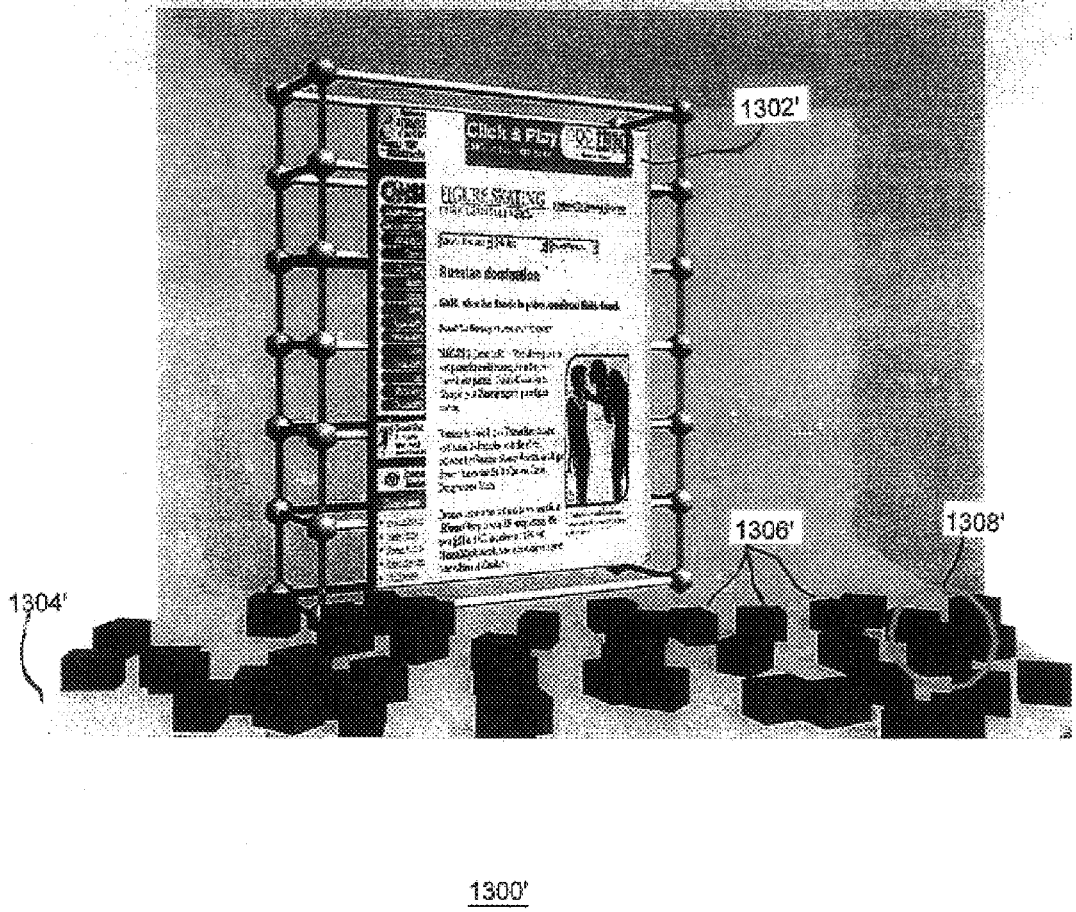
Figure 13C:
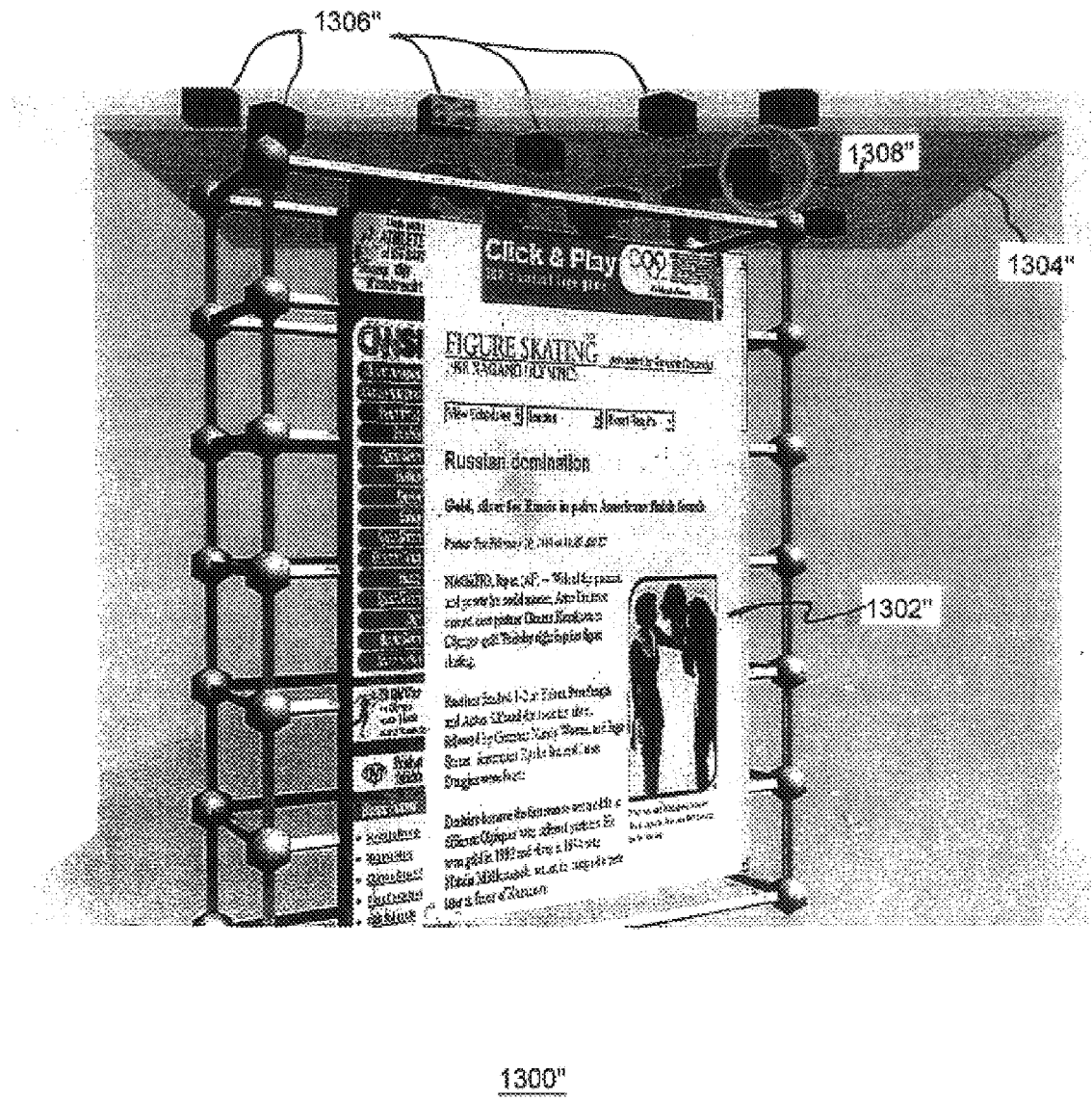
Figure 13D:
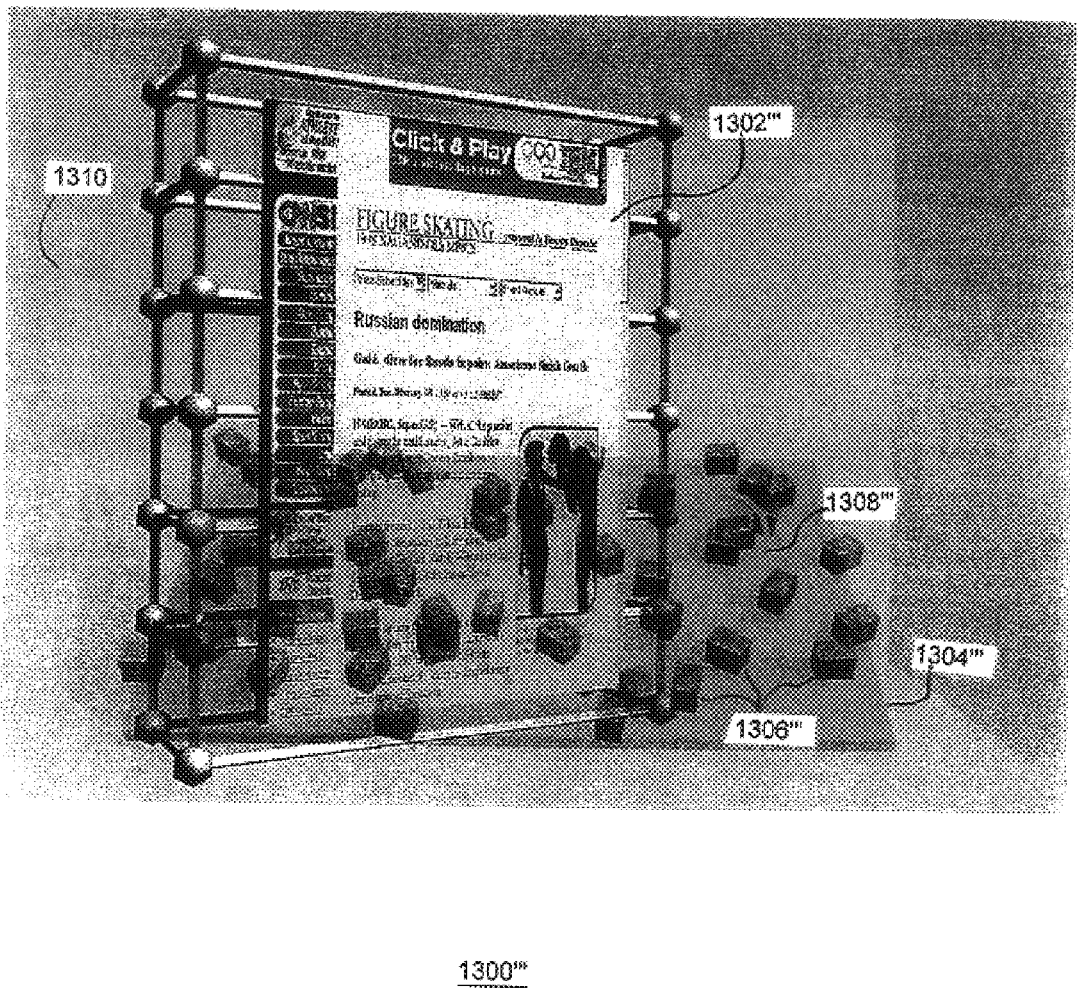

Some ways to graphically depict proximity clustering are shown in FIGS. 12A through 12F. FIG. 12A depicts a display 1200 in which proximal clusters of objects are grouped in valleys defined by mounds having objects which are spaced further apart. FIG. 12B is a display 1200' in which object thumbnails, clustered based on their proximity, are cordoned off from other object thumbnails using translucent walls 1204. Note that the translucent walls do not occlude any objects and that the object thumbnails, in turn, do not occlude the display of the translucent walls. Note also that head motion parallax is simulated in the display of FIG. 12B. FIG. 12C is a display 1200" in which object thumbnails, clustered 1206 based on their proximity, are submersed within a translucent pool or plane 1208, having a solid border 1210. Note that clusters 1206 are consistent with, and reinforce, the simulated three-dimensional environment—the solid border 1210 passes in front of object thumbnails (e.g., 1212) behind it and is hidden behind object thumbnails (e.g., 1214) in front of it. Note also that the user has a perspective, plan, view of the inclined plane and that a cluster 1220 of object thumbnails is hovering above the inclined plane. In this way, a cluster of object thumbnails can be easily discerned and can be manipulated (e.g., selected, dragged, dropped) together, as a group.

Note that a user may want the visual indication of proximally located objects to persist, even when an object is moved away from the others, until the cluster of (formerly) proximally located objects is "broken" by a user command. Referring first to FIG. 12D, three (3) groups of proximally located objects are defined by three differently colored rings 1250A–C. Next, as shown in FIGS. 12E or 12F, as objects are moved away from the (formerly) proximally located objects, the visual indicators persist as rings 1252A–C joined by links 1254A–C or, alternatively, by stretched rings 1250'A–C. In this way, the user can move (formerly) proximally located objects back together again, or, break the cluster of (formerly) proximally located objects. Referring back to FIG. 11I, recall that proximal clusters may be indicated by bars 1112 having matching colors. Referring back to FIG. 11J, recall that proximal clusters may be indicated by bars meters 1112' having matching colors. Referring back to FIG. 11K, recall that proximal clusters may be indicated by squares 1116 or dial meters 1114 having matching colors. Referring back to FIG. 11L, recall that proximal clusters may be indicated by balls 1120 having matching colors and arranged on roofs 1118. Finally, referring back to FIG. 11M, recall that proximal clusters may be indicated by roofs 1118' having matching colors. Note that in FIGS. 11I through 11M, objects that were formerly in close proximity to one another have, in some cases, been moved apart.

Figure 14B:
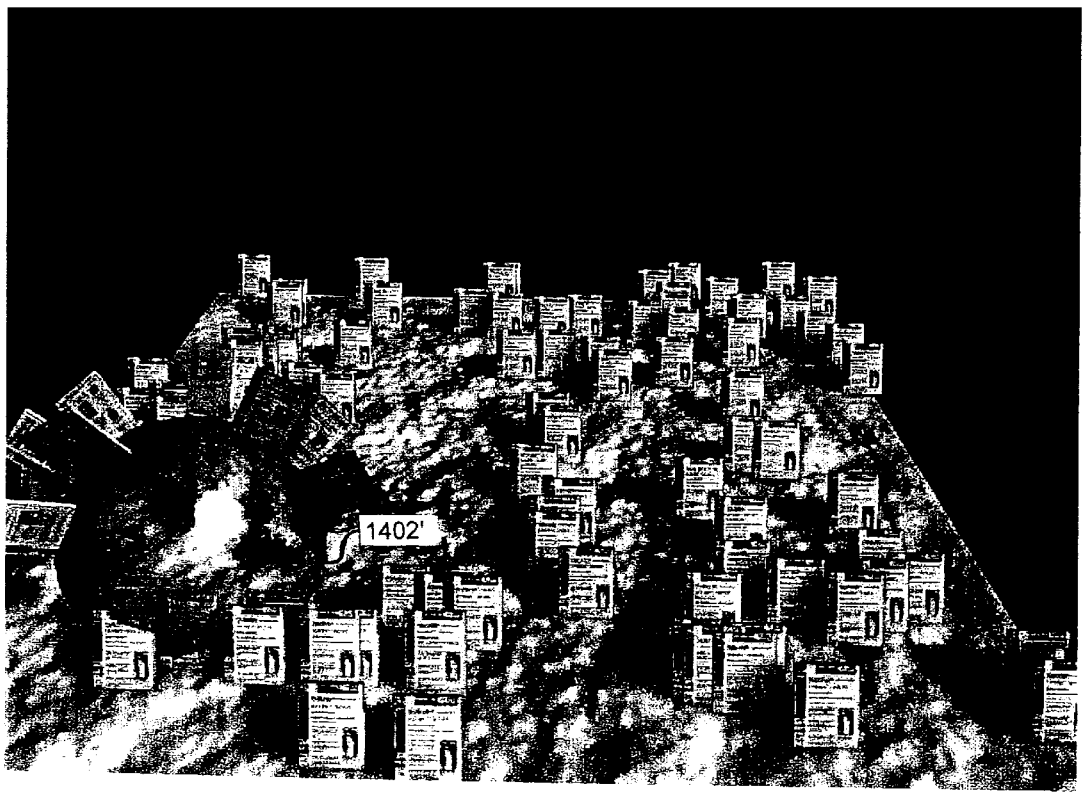

FIG. 14A is a display 1400 in which titles are displayed for multiple object thumbnails at one time. This may be initiated by the user selecting a single object thumbnail after which the application highlights object thumbnails (e.g., using the implicit query function) or by the user selecting more than one thumbnail at a given time. A single pop-up window 1410 having a list of titles (or other descriptive text) 1412 is used to indicate neighboring object thumbnails. Visual links 1414 are provided from each title 1412 to its associated object thumbnail. Note that the pop-up window 1410 may be translucent such that object thumbnails (e.g., 1416) behind it are not occluded. FIG. 14B is a display 1400' which depicts an alternative method of highlighting object thumbnails that neighbor a selected object thumbnail. In this case, neighboring object thumbnails are projected onto the surface of a displaced regions, such a spherical protrusion 1402', of the landscape. As the user's selection changes, the region of displacement moves across the landscape such that the selected object thumbnail is always within the center of the displaced region.

Referring back to FIG. 2, if an object is "selected", a preferred object viewing process (or more generally, a "preferred object viewer") 254 is invoked by the output management process. The preferred object viewing process moves the object thumbnail associated with the "selected" object to a preferred viewing location on the display. Recall from FIG. 9 that a "selected" object is rendered in the center of the foreground, closer to the user so that it appears larger. The low resolution image of the object may be replaced with the high resolution image of the object. Also recall that the thumbnail may display alternative representations of the content from a given object such as schematic or iconic views. To facilitate consistency of the user interface to the user, a movement animation may be used and may last about one second. During this enlargement, a natural transition via hardware or software supported blending may also be supported. The moved object thumbnail may, alternatively, be the actual object "live" on an associated application, such as an HTML page on an Internet browser, a text document on a word processor, a spreadsheet on an accounting application, etc. Also recall that the object thumbnail may display alternative representations of the object, such as iconic or schematic views. During a movement to the actual object, "live" in its associated application, a transition animation may employ blending or morphing. Referring to FIG. 24, each object has an animation record 2450, which may be stored collectively as animation files 2400. Each animation record 2450 may include a field 2402 for identifying the object, a field 2404 for defining an animation type (e.g., morph, blend, enlarge, shrink, etc.), a field 2406 for defining a start position (e.g., the object's location), a field 2408 for defining an end position (e.g., the center foreground), a field 2410 for defining the rate of the animation (e.g., total time=1 second), and a field 2412 for tracking the percent complete (i.e., a current state) of the animation.

FIGS. 13A through 13D are displays showing alternative preferred viewing of "selected" objects. Excluding FIG. 13C, note that the selected object will not occlude the collection of thumbnails on the information landscape. In the display 1300 of FIG. 13A, a "selected" object 1302 is displayed, in perspective view, on the left side of the display 1300, before (foreground) and below a plane 1304 having object thumbnails 1306. The thumbnail of the "selected" object is visually highlighted with a circle 1308. In the display 1300' of FIG. 13B, a "selected" object 1302' is displayed, in perspective view, behind (background) a plane 1304' having object thumbnails 1306'. The thumbnail of the "selected" object is visually highlighted with a circle 1308'. In the display 1300" of FIG. 13C, a "selected" object 1302" is displayed, in perspective view, beneath a plane 1304" having object thumbnails 1306". The thumbnail of the "selected" object is visually highlighted with a circle 1308". Finally, in the display 1300'" of FIG. 13D, a "selected" object 1302'" is displayed, in perspective view, behind a plane 1304" having object thumbnails 1306'". The thumbnail of the "selected" object is visually highlighted with a circle 1308'". Note the shadow 1310 cast by the "selected" object 1302'". Note also that the object thumbnails 1306" and the plane 1304" are translucent so that the "selected" object 1302" behind them is not occluded.

Finally, recall that audio cues may be used to reinforce the simulated three-dimensional environment of the user interface. This may be carried out by the audio output process (or more generally, an "audio cue player") 278 (see FIG. 2) which may use stored audio data (not shown). When an object is "activated", an associated audio cue is played. This may be an abstract percussive "pong" sound. When an object is "selected", the movement animation may be accompanied by an associated audio cue. This may be an abstract "whoosh" sound of increasing pitch and loudness in which the parameters of a flanger effect are changed over the duration of the sound. When a "selected" object is deselected, an animation, moving the object away from the user so that it appears smaller, may be accompanied by an associated audio cue. This may be a reversed version of the "whoosh" sound. When an object is being "pushed", an associated audio cue may be played. This may be a sound based on shuffling cards. This audio cue should be spatialized, based on the location(s) of the object(s) being pushed such that it is louder when the pushed object(s) is in the foreground and softer when the pushed object(s) is in the background of the simulated three-dimensional environment. If left and right speakers 162 are provided, the audio cue should be amplified more to the left or right depending on the position of the pushed object(s). When an object is being "moved", an associated audio cue may be played. This may be an oscillating electronic hum. The pitch of the oscillating hum may vary with the speed at which the object thumbnail is being moved. As was the case with the audio cue associated with the "pushed" object(s), this audio cue should be spatialized based on the location of the "moved" object. When an object is initially "moving", a mechanical latching sound cue may be played. When the object transitions out of a "moving" state, a mechanical unlatching sound cue may be played.

As discussed above, the sound cues may be spatialized to reinforce the simulated three-dimensional environment. In addition to manipulating volume as described above, high frequency content and a reverberation ratio parameter of the sound may also be manipulated. More specifically, the upper frequencies of the sound are attenuated by a low pass filter as the object becomes more "distant". Also, the ratio reverb to "dry" sound is increased as the object becomes more "distant".

Although true three-dimensional spatialization, such as "head related transform functions" may be used, it is believed that the above described spatialization, effected by manipulating volume, high frequency attenuation, and reverb, is more robust and will work well even when lower quality speakers are used. Furthermore, the spatialization may be limited from fully three-dimensional spatialization so as not to simulate the location of a sound behind the user (or behind the "viewing point"). In this way, users will not look away from the video monitor in (conscious or subconscious) response to sound behind them. Otherwise, if a user were to look away from the video monitor, their immersion in the simulated three-dimensional environment would be broken.

Although the processes discussed above were described as being run by input and output management processes, as is apparent to those skilled in the art, certain of the operations can be combined or can be separated out. For example, the 2D to 3D mapping process 220 and/or the viewing point determination process 226 could be done by the output management process 250 or even by the video output process 270, with appropriate changes to the data stored in the temporary storage means 202.

In the context of the personal computing environment 100 of FIG. 1, the processes discussed with reference to FIG. 2 may be carried out by the following facilities. The pointer input process 214 may be performed, at least in part, by the pointer 142, the serial port interface 146 and program modules 137. The head location input process 212 may be performed, at least in part, by the camera 141, the serial port interface 146 (or a video capture card), and program modules 137. All data may be stored on any of the storage or memory devices or may be received from a remote source. The video output process 270 may be performed, at least in part, by program modules 137, the video adapter 148, the graphics accelerator, and the video monitor 147. The audio output process 278 may be performed, at least in part, by program modules 137, the sound card 161 and the speaker(s) 162. All other process may be effected by program modules 137 and application programs 136 (which may be written in $C^{++}$) executed on the processing units 121.

§4.2.4 Exemplary Methodologies

Having described various displays and processes above, methodologies for effecting at least some of the processes are now described with reference to FIGS. 19, 20, and 21.

FIGS. 19A and 19B collectively show a flow diagram of an exemplary animation loop process in which processing is initiated at node 1900, with the correct alignment of the drawing sheets for these figures being shown in FIG. 19. First, as shown in step 1902, a next event or task is taken from an event queue. (Recall, e.g., event queue 216, shown in FIG. 2, which accepts pointer and camera inputs.) Next, as shown in decision step 1904, shown in FIGS. 19A and 19B, it is determined whether the event is from the pointer or from the camera (head location). If the event is from the camera, it deals with determining the location of the user's head relative to the video monitor, and the viewing point is determined in step 1906. (Recall, e.g., viewing point determination process 226.) Processing then continues at step 1902. If, on the other hand, the event is from the pointer, decision step 1908 is entered.

At decision step 1908, it is determined whether or not a exit command was entered by the user. If so, processing exits the process 1900 via return node 1910. If, on the other hand, no exit command was entered by the user, processing continues at step 1912. Step 1912 maps the two-dimensional pointer input to a three-dimensional location in the simulated three-dimensional display. (Alternatively, the two-dimensional pointer input may simply be mapped to a two-dimensional screen output.) Processing then continues at decision step 1914.

At decision step 1914, it is determined whether or not the cursor is located "on" (or hovers over) an object (thumbnail). (Recall timer/clock facility 204.) If not, no objects can be active, nor can any object be moving. Records (e.g., 304) of objects are updated to reflect this fact in step 1916. Processing then continues, via node A 1918, to step 1938 which generates a display and audio based on current object states, viewingpoint, and cursor location. (Recall, e.g., state information 300 and output management process 250.) Step 1938 is discussed in more detail with reference to FIG. 21. Processing then continues, via node C 1940, to step 1902.

Returning to decision step 1914, if the cursor is located on (or is hovering over) an object, the object is "active" (and therefore, other objects are not "active".) Records (e.g., 304, shown in FIG. 3) of objects are updated to reflect this fact in step 1920, shown in FIGS. 19A and 19B. Next, at decision step 1922, it is determined whether or not the "active" object is "selected". If so, then the object is "selected" (and therefore, other objects are not "selected"). Records (e.g., 304) of objects are updated to reflect this fact in step 1924. Processing continues, via node A 1918, to step 1938 introduced above.

Returning to decision step 1922, if the "active" object is not "selected", processing continues, via node B 1926, to decision step 1928. At decision step 1928, it is determined whether or not the "active", but not "selected", object is "moving" (or being dragged). If not, processing continues to decision step 1960 which determines whether or not the object just transitioned from "moving" to "not moving". That is, decision step 1960 determines whether or not the object was dragged (i.e., moving) in the last cycle. If so, as shown at step 1962, the location(s) of the object(s) is stored to a persistent storage means (See storage device 290 of FIG. 2), and processing continues at decision step 1950. Otherwise, processing continues directly to decision step 1950, shown in FIGS. 19A and 19B. At decision step 1950, it is determined whether an animation is running. If so, as shown in step 1952, the animation is updated (Recall records 2450, shown in FIG. 24) and processing continues to step 1938, shown in FIGS. 19A and 19B, introduced above. If not, processing continues directly to step 1938. Returning to decision step 1928, if the object is being "moved", then no other objects will be "moving" (though they may be "pushed" as discussed below). Records (e.g., 304) of objects are updated to reflect this fact in step 1930. The object's new location (either in the two-dimensional input plane or virtual three-dimensional environment) is determined in step 1932.

Recall that total object (thumbnail) occlusion should be avoided. In decision step 1934, it is determined whether or not the "active" and "moved" object is within a predetermined distance (in the virtual three-dimensional space, or in a two-dimensional projection of the virtual three-dimensional space) of any other object. If not, processing continues at step 1950. If, on the other hand, the "active" and "moved" object is within a predetermined distance (in the virtual three-dimensional space, or in a two-dimensional projection of the virtual three-dimensional space) of another object(s), total object (thumbnail) occlusion is avoided in step 1936 and processing continues at step 1950. Exemplary processes for avoiding object occlusion are discussed below with reference to FIGS. 20A and 20B.

FIG. 20A is a flow diagram of an exemplary process 1936' for avoiding object (thumbnail) occlusion assuming a "continuous with push" layout type. (Recall field 338 in FIG. 3) First, at decision step 2002, shown in FIG. 20A, it is determined whether or not the "active" and "moving" object has moved (a predetermined distance) away from a stored location (or, in an alternative embodiment, the present location) of the other object. If not, as shown in step 2008, the other object is "pushed" and the record (e.g., 304) of the other object is updated to reflect this fact. Further, in one embodiment, the pre-push location of the "pushed" object is stored. (Recall, e.g., field 310 of FIG. 3) Then, as shown in step 2012, in FIG. 20A, the location of the "pushed" object is updated to maintain at least a predetermined minimum distance between it and the "active" and "moving" object. (Recall location field 308) The "pushed" object may move out of the way of the "moved" object by effecting an animation, which may last about one section. Alternatively, the faster the "moved" object is moving, the faster the "pushed" objects may move aside. Thus, in this embodiment, the "moved" object is like a person walking or running through tall grass (pushed objects) which moves out of the person's way but resumes its position after the person leaves. The process 1936' is then exited via return node 2006.

Returning to decision step 2002, in this embodiment, if the "active" and "moving" object has moved away from the pre-push location (e.g., stored in field 310 of the record 304 of the "pushed" object), of the "pushed" object, then the location of the "pushed" object (e.g., location field 308) is set back to its pre-push location. This may be effected with an animation which may take about one half of a second.

FIG. 20B is a flow diagram of an alternative exemplary process 1936" for avoiding object (thumbnail) occlusion, again assuming a "continuous with push" layout type. (Recall field 338 shown in FIG. 3) First, as shown in step 2052 in FIG. 20B, the other object is indicated as being "pushed". Next, in step 2054, the location of the other object is updated to maintain at least a minimum distance between it and the "moved" object. Then, at decision step 2056, it is determined whether the updated location of the "pushed" object is within a predetermined distance of a location of any other objects. If so, those further objects must also be "pushed" to avoid total occlusion by, or to avoid totally occluding, the "pushed" object, and processing continues at step 2052. That is, the minimum distance condition is transitively propagated, if necessary, to displace neighboring object thumbnails. Otherwise, the process 1936" is exited via return node 2058.

In this alternative way of avoiding object occlusion, the pre-push position of object thumbnails need not be stored. When a moving operation ceases (e.g., when the left mouse button is released during a drag operation), all object thumbnails maintain their location at that time.

Assuming that a "gridded" layout is used instead of a "continuous with push" layout, when an active object is released, it is anchored to the nearest available (i.e., having no other anchored object) grid point. In this way, total object occlusion is avoided.

Appropriate audio cues, which may be spatialized as discussed above, may be played when an object is being moved or pushed.

FIGS. 21A through 21C collectively show a flow diagram of an exemplary process 1938' for generating an audio and video output; the correct alignment of the drawing sheets for these figures is shown in FIG. 21. First, as shown in step 2102, the cursor is displayed at its location. (Recall cursor location determination process 218, cursor location field 324, and video output process 270 collectively shown in FIGS. 2 and 3) Next, as shown in step 2104 in FIG. 21A, a landscape (e.g., an inclined plane) with landmarks is displayed. (Recall storage means 272, video output process 270, and display 800 collectively shown in FIGS. 2 and 8) Parallax may be simulated based on a determined viewing point. (Recall viewing point determination process 226, viewing point field 320, parallax simulation process 262, and displays 1500 and 1500' collectively shown in FIGS. 2, 3, 15A and 15B) Next, a loop in which all objects are processed is run. This loop (object loop) is initialized at step 2106 in FIG. 21A by initializing an object count value (OB_CT=1). Next, in step 2108, the size (or scale) of the object (thumbnail) then being processed is determined based on its location using perspective viewing. (Recall field 308 and object perspective viewing process 252 collectively shown in FIGS. 2 and 3) The object (thumbnail) is then displayed anchored at its location.

Processing continues at decision step 2112 shown in FIG. 21A where it is determined whether or not the object being processed is "active". (Recall field 312) If not, processing continues, via node C 2116, to decision step 2132 at which it is determined whether the object being processed is "selected". (Recall field 314) If so and as shown in FIG. 21C, a high resolution version of the moved object thumbnail is ultimately displayed at the preferred viewing location 2134 by progressing through the animation associated with the object (unless the animation is 100 percent complete). Recall that, in an alternative embodiment, a "live" object may be loaded into an associated application and then displayed. If the object being processed underwent a "not selected" to "selected" transition, the movement animation and associated audio cue may be played. To determine transitions, the object's previous state may be used.

From step 2134, or from decision step 2132 if the object being processed is not "selected", decision step 2136 is entered in which it is determined whether or not the object being processed is "pushed". (Recall field 318) If so, the pushing audio cue is played as shown in step 2138. Recall that the location of the "pushed" object is processed by the occlusion avoidance process 1936 of FIG. 19. From step 2138 shown in FIG. 21C, or from decision step 2136 if the object is not being pushed, the object indexing count is incremented (OB_CT=OC_CT+1) at step 2140. Then, as shown in step 2142, if all of the objects have been processed (OB_CT> MAXIMUM OB_CT; Recall field 326), then the process 1938' is exited via return node 2146. If, on the other hand, more objects need to be processed, processing continues, via node A 2144, to step 2108.

Returning to decision step 2112, shown in FIG. 21A, if the object being processed is "active", then processing continues, via node B 2114, to step 2118 in which a pop-up title bar is displayed over the object (thumbnail). Next, at decision step 2120 shown in FIG. 21B, it is determined whether the object being processed just transitioned to the "active" state from an inactive state. Recall that to determine transitions, the object's previous state may be used. If so, an activation audio cue is played as shown in step 2122. From step 2122, or from decision step 2120 if the object was already "active", step 2124 is performed. In step 2124, a colored halo is displayed around the periphery of the object (thumbnail). (Recall 1004) Next, in step 2126 if other objects are found to match the active object to a predetermined degree (Recall match threshold 340), visual indications of such a match (or non-match) are rendered. (Recall implicit query process 264 and FIGS. 11A through 11V.)

Next, as shown at decision step 2128, if the object being processed is "moving" (Recall field 316), associated audio, which may be spatialized, is played as shown in step 2130. Recall also that transitions to and from the "moving" state may be accompanied by mechanical latching and unlatching, respectively, audio cues. From step 2130, or from decision step 2128 if the object being processed in not "moving", processing continues via node C 2116 to step 2132 where processing is carried out as discussed above.

§4.2.5 Exemplary Alternative Displays

Figure 16:
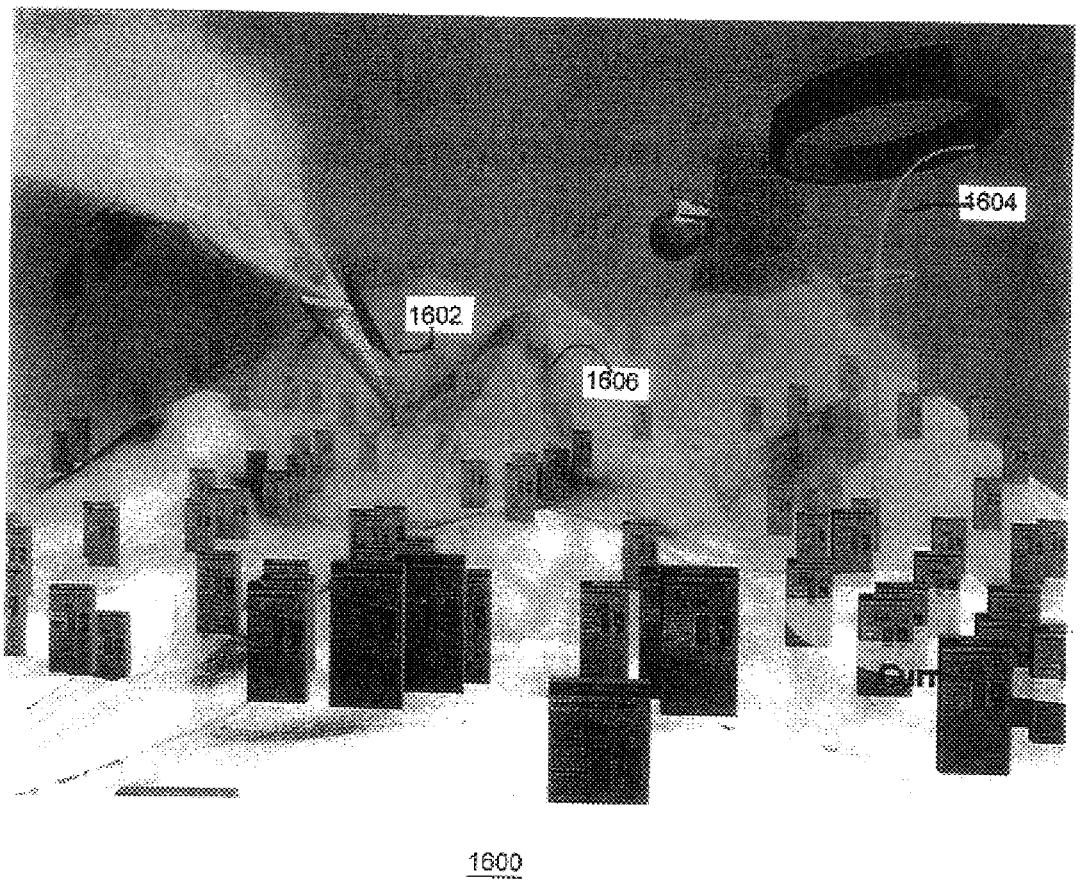
FIG. 16 is a display of an alternative landscape which supports multiple layers, local object clustering, and an animation of a dynamic appearance of new object thumbnails in the landscape.

FIGS. 15A, 15B and 16 through 18 depict alternative (to the inclined plane) landscapes. FIG. 16 is a display 1600 showing an object 1602 entering from an external information source, such as an external network, and proximity clustering rings 1606 drawn directly on the landscape. Various highlighting mechanisms and data-probes 1604 are shown above the landscape.

Figure 17:
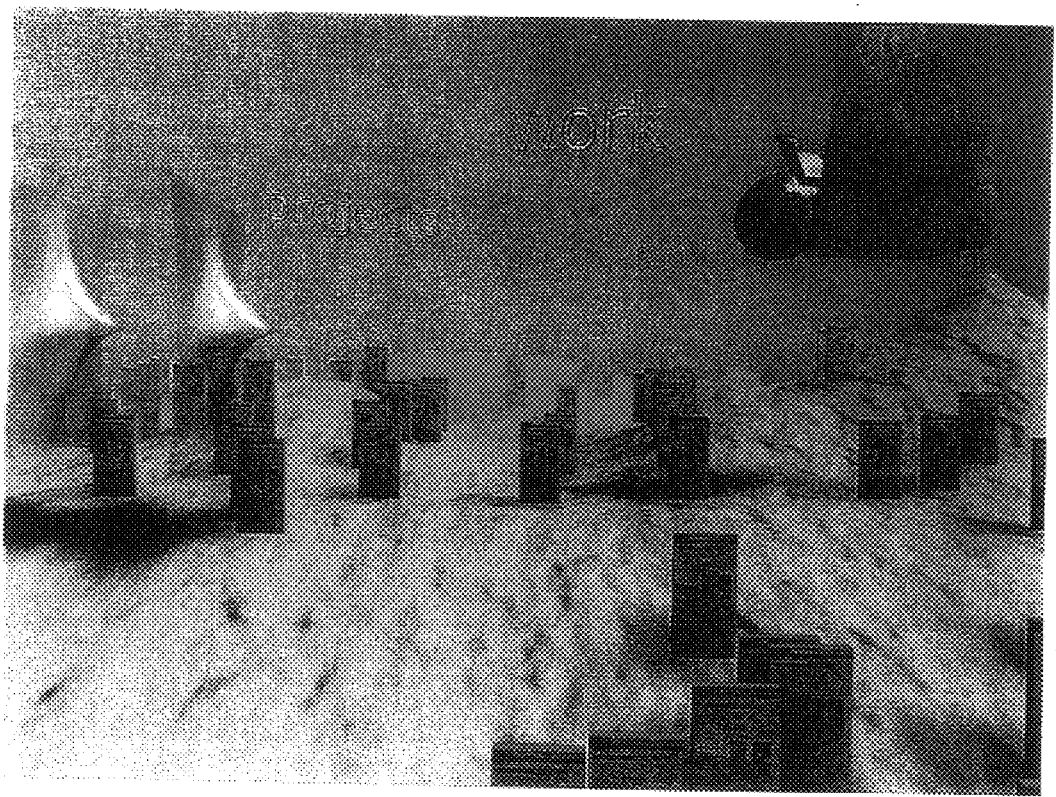
FIG. 17 is a display of an alternative landscape which supports multiple layers.
Figure 18:
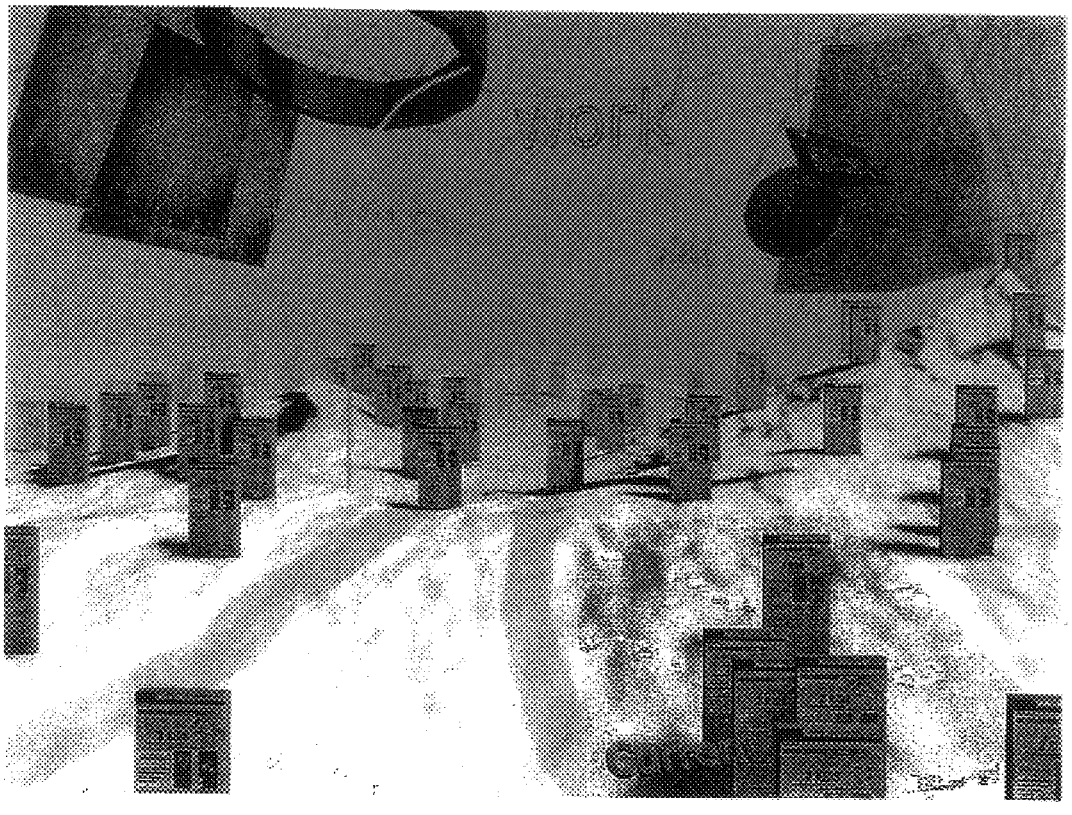
FIG. 18 is a display of another alternative landscape which supports multiple layers and where relationships are shown between items in the landscape and other data dimensions such as time or geography.

FIGS. 17 and 18 are displays 1700 and 1800, respectively, which depict visual representations of objects on a landscape, and portals to other landscapes (e.g., "work", "projects", "play") hovering over the landscape and on facets of joined planes, respectively.

Other surfaces may be used, such are surfaces that monotonically increase from the foreground (bottom of the screen) of the three-dimensional environment to the background (top of the screen) of the three-dimensional environment. Other surface topologies, including localized "hills" and "valleys" for example, may be used. However, in such topologies, no "hill" or "valley" should be able to totally occlude an object located "behind" or "in" it, respectively.

§4.3 Summary

As illustrated in the foregoing description, the present invention provides a user interface, and in particular a graphical user interface, to information or content (also referred to as an "object"). The present invention permits a user to view and organize all objects and to edit or otherwise work on a selected object by, for example, representing, graphically, objects or content with an object thumbnail which can be added, moved, or deleted from a display rendered on a video monitor. The present invention may use pop-up title bars for permitting a user to discern more about the object represented by the object thumbnail. The present invention may use higher resolution image representations of objects, or "live" objects loaded within an associated application, for editing or otherwise working on a selected object.

The user interface of the present invention exploits spatial memory by, for example, simulating a three-dimensional plane, or other three-dimensional landscape on which the object thumbnails may be manipulated. The plane or landscape may include visual (and audio) landmarks for enhancing a user's spatial memory. As the graphical representations of the objects are moved about the landscape, the present invention may employ perspective views (perceived image scaling with distance), partial image occlusion, simulated shadows, and/or spatialized audio to enhance the three-dimensional effect of the plane or landscape. An ancillary advantage of using a three-dimensional landscape is that more objects can be represented, at one time, on a single display screen.

The user interface of the present invention is intuitive and minimizes the time needed for a user to become familiar with it. The user interface of the present invention is neither cumbersome, nor does it require too many different types of inputs to manipulate the object thumbnails. For example, the present invention may use inputs from a familiar input device, such as a mouse or pointer, to manipulate the object thumbnails. To minimize the number of different types of inputs required to manipulate the object thumbnails, the present invention may map two-dimensional inputs, such as moving a mouse on a mouse pad, to a three-dimensional movement on the simulated three-dimensional display. Alternatively, the two-dimensional inputs may be translated to two-dimensional screen coordinates. The present invention may also prevent one object thumbnail (or landscape feature) from totally occluding another object thumbnail so that neither is (totally) hidden from the user. To reinforce the simulated three-dimensional environment, the present invention may simulate head motion paralax. In this regard, the present invention may use a camera (or head or body mounted sensor equipment) to detect the position of a user's head relative to a video monitor on which the user interface is rendered.

Finally, the user interface of the present invention can provide intelligent help to the user. For example, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indicator(s) of "matching" (or non-matching) objects, for example, of related objects. This visual indication may be rendered continuously or, alternatively, upon an event, such as when an object thumbnail is activated.

Thus, the present invention represents an advance in the area of user interfaces.

What is claimed is:

1. A man-machine interface method for permitting a user to act on objects, for use with a machine having a video display device and a user input device, the man-machine interface method comprising the steps, performed by the machine, of:
   a) generating a three-dimensional environment, having a three-dimensional surface, to be rendered on the video display device;
   b) determining a virtual location environment of each of the objects in the three-dimensional environment;
   c) generating visual representations of the objects, within the three-dimensional environment, at the determined locations, to be rendered on the video display device;
   d) autonomously determining, in response to predefined criteria, a cluster of corresponding ones of the visual representations of a plurality of said objects, wherein said predefined criteria comprises a degree to which individual ones of the plurality of objects are related to each other by a predefined property of each of the objects themselves or prior user selection of a predefined property of each of said plurality of objects themselves and
   e) generating a visual boundary, to be rendered on the video display device, which isolates the visual representations of said objects in the cluster from the visual representations of other ones of the objects then being displayed on the visual display device so as to visually segregate the visual representations of the objects associated with the cluster from the visual representations of the other objects.

2. The method of claim 1 wherein the cluster determining step is performed based on at least one factor selected from a group of factors consisting of:
   (a) a distance between a location of a corresponding visual representation of a first one of the objects in the environment and a location of a corresponding visual representation of a second one of the objects in the environment, and (b) distances between the location of the corresponding visual representation of the first object and locations of corresponding visual representations of all other objects in the environment.

3. The method of claim 1 wherein the visual boundary is selected from a group consisting of: (a) a translucent wall, (b) a translucent pool, (c) a border, (d) a valley and (e) an attached shape.

4. The method of claim 3 wherein the selected one of the: (a) translucent wall, (b) translucent pool, (c) border and (d) valley, and (e) the attached shape have a color based on the cluster with which the visual boundary is associated.

5. The method of claim 1 wherein if a user moves a corresponding visual representation of one of the plurality of the objects belonging to the cluster to a position outside the boundary, the visual boundary of the cluster persists.

6. The method of claim 1 wherein if a user moves a corresponding visual representation of one of the plurality of the objects belonging to the cluster to a position outside of the boundary, the visual boundary of the cluster persists until a user instruction to re-cluster the corresponding visual representations of the objects in the environment is received.

7. The method of claim 1 wherein if a user moves a corresponding visual representation of one of the objects belonging to the cluster beyond the visual boundary, the visual boundary will stretch to bound the corresponding visual representation of said one object within the cluster.

8. The method of claim 1 wherein if a user moves a corresponding visual representation of one of the objects belonging to the cluster beyond the visual boundary, the visual boundary will separately and visually encompass the corresponding visual representation of said one object so as to define a first bounded display area and corresponding visual representations of remaining ones of the objects in the cluster so as to define a second bounded display area, and visually link the first and second bounded display areas.

9. Apparatus for providing a man-machine interface which permits a user to act on objects, comprising:
   a) a processor;
   b) a memory connected to the processor and storing computer executable instructions therein; and
   c) a video display device connected to the processor; and
   d) wherein the processor, in response to execution of the instructions:
      d1) generates a three-dimensional environment, having a three-dimensional surface, to be rendered on the video display device;
      d2) determines a virtual location environment of each of the objects in the three-dimensional environment;
      d3) generates visual representations of the objects, within the three-dimensional environment, at the determined locations, to be rendered on the video display device;
      d4) autonomously determines, in response to predefined criteria, a cluster of corresponding ones of the visual representations of a plurality of said objects, wherein said predefined criteria comprises a degree to which individual ones of the plurality of objects are related to each other by a predefined property of each of the objects themselves or prior user selection of a predefined property of each of said plurality of objects themselves; and
      d5) generates a visual boundary, to be rendered on the video display device, which isolates the visual representations of said objects in the cluster from the visual representations of other ones of the objects then being displayed on the visual display device so as to visually segregate the visual representations of the objects associated with the cluster from the visual representations of the other objects.

10. The apparatus of claim 9 wherein the processor, in response to execution of the instructions, determines the cluster based on at least one factor selected from a group of factors consisting of: (a) a distance between a location of a corresponding visual representation of a first one of the objects in the environment and a location of a corresponding visual representation of a second one of the objects in the environment, and (b) distances between the location of the corresponding visual representation of the first object and locations of corresponding visual representations of all other objects in the environment.

11. The apparatus of claim 9 wherein the visual boundary is selected from a group consisting of: (a) a translucent wall, (b) a translucent pool, (c) a border, (d) a valley and (e) an attached shape.

12. The apparatus of claim 11 wherein the selected one of the: (a) translucent wall, (b) translucent pool, (c) border and (d) valley, and (e) the attached shape have a color based on the cluster with which the visual boundary is associated.

13. The apparatus of claim 9 wherein if a user moves a corresponding visual representation of one of the plurality of the objects belonging to the cluster to a position outside the boundary, the processor, in response to execution of the instructions, maintains display of the visual boundary of the cluster.

14. The apparatus of claim 9 wherein if a user moves a corresponding visual representation of one of the plurality of the objects belonging to the cluster to a position outside of the boundary, the visual boundary of the cluster persists until the processor receives a user instruction to re-cluster the corresponding visual representations of the objects in the environment.

15. The apparatus of claim 9 wherein if a user moves a corresponding visual representation of one of the objects belonging to the cluster beyond the visual boundary, the processor, in response to execution of the instructions, stretches the visual boundary to bound the corresponding visual representation of said one object within the cluster.

16. The apparatus of claim 9 wherein if a user moves a corresponding visual representation of one of the objects belonging to the cluster beyond the visual boundary, the processor, in response to execution of the stored instructions, manipulates the visual boundary in order as to separately and visually encompass the corresponding visual representation of said one object so as to define a first bounded display area and corresponding visual representations of remaining ones of the objects in the cluster so as to define a second bounded display area, and visually link the first and second bounded display areas.

17. A computer readable medium having computer executable instructions stored therein, said instructions being executed by a computer, for performing the steps of claim 1.

\* \* \* \* \*